(12) United States Patent
Oh

(10) Patent No.: US 11,818,190 B2
(45) Date of Patent: Nov. 14, 2023

(54) POINT CLOUD DATA TRANSMISSION DEVICE, POINT CLOUD DATA TRANSMISSION METHOD, POINT CLOUD DATA RECEPTION DEVICE, AND POINT CLOUD DATA RECEPTION METHOD

(71) Applicant: LG Electronics Inc., Seoul (KR)

(72) Inventor: Sejin Oh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/226,748

(22) Filed: Apr. 9, 2021

(65) Prior Publication Data

US 2021/0320962 A1   Oct. 14, 2021

Related U.S. Application Data

(60) Provisional application No. 63/008,735, filed on Apr. 11, 2020.

(51) Int. Cl.
| | | |
|---|---|---|
| *H04L 65/70* | (2022.01) | |
| *G06T 9/00* | (2006.01) | |
| *H04L 67/06* | (2022.01) | |
| *H04L 65/75* | (2022.01) | |

(52) U.S. Cl.
CPC .............. *H04L 65/70* (2022.05); *G06T 9/001* (2013.01); *H04L 65/75* (2022.05); *H04L 67/06* (2013.01)

(58) Field of Classification Search
CPC ..... H04L 65/607; H04L 65/601; H04L 67/06; G06T 9/001
See application file for complete search history.

(56) References Cited

U.S. PATENT DOCUMENTS

| | | | |
|---|---|---|---|
| 10,964,089 B1* | 3/2021 | Graziosi | G06T 7/75 |
| 2014/0195651 A1* | 7/2014 | Stockhammer | H04N 21/23439 |
| | | | 709/219 |
| 2018/0199071 A1* | 7/2018 | Wang | H04N 21/2353 |
| 2018/0278964 A1* | 9/2018 | Wang | H04N 21/85406 |
| 2019/0087979 A1* | 3/2019 | Mammou | H04N 19/597 |
| 2019/0114830 A1* | 4/2019 | Bouazizi | G06F 3/013 |
| 2021/0006833 A1* | 1/2021 | Tourapis | G06T 9/001 |
| 2021/0021664 A1* | 1/2021 | Oyman | H04N 19/597 |
| 2021/0092430 A1* | 3/2021 | Schwarz | H04N 19/176 |
| 2021/0110577 A1* | 4/2021 | Graziosi | H04N 19/597 |
| 2021/0218947 A1* | 7/2021 | Oh | H04N 13/178 |

(Continued)

FOREIGN PATENT DOCUMENTS

| | | |
|---|---|---|
| CN | 106464891 | 2/2017 |
| CN | 106664099 | 5/2017 |

(Continued)

OTHER PUBLICATIONS

ISO/IEC JTC 1/SC 29/WG 11 N19066, Feb. 21, 2020, pp. 1-46 (Year: 2020).*

(Continued)

*Primary Examiner* — Dhairya A Patel
(74) *Attorney, Agent, or Firm* — Fish & Richardson P.C.

(57) ABSTRACT

Disclosed herein are a point cloud data transmission method including encoding point cloud data, and transmitting point cloud data, and a point cloud data reception method including receiving point cloud data, decoding the point cloud data, and rendering the point cloud data.

4 Claims, 50 Drawing Sheets

(56) References Cited

U.S. PATENT DOCUMENTS

| | | | | |
|---|---|---|---|---|
| 2021/0218999 A1* | 7/2021 | Schwarz | ................ | H04N 19/70 |
| 2021/0281879 A1* | 9/2021 | Roimela | ................ | G06T 9/001 |
| 2021/0354728 A1* | 11/2021 | Kaku | ................... | G05D 1/0221 |
| 2022/0124359 A1* | 4/2022 | Wang | ............... | H04N 21/23614 |
| 2023/0129875 A1* | 4/2023 | Kondrad | ................ | H04N 19/70 |
| | | | | 375/240.26 |

FOREIGN PATENT DOCUMENTS

| | | |
|---|---|---|
| CN | 110419223 | 11/2019 |
| EP | 3474562 | 4/2019 |
| KR | 1020190122867 | 10/2019 |
| KR | 1020200006918 | 1/2020 |
| WO | WO2019079032 | 4/2019 |
| WO | WO2020005365 | 1/2020 |

OTHER PUBLICATIONS

International Search Report in Appln. No. PCT/KR2021/003755, dated Jul. 21, 2021, 22 pages (with English translation).
Office Action in Chinese Appln. No. 202180027786.4, dated Jun. 14, 2023, 17 pages (with English translation).

* cited by examiner

FIG. 2
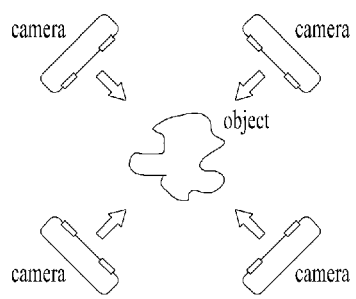
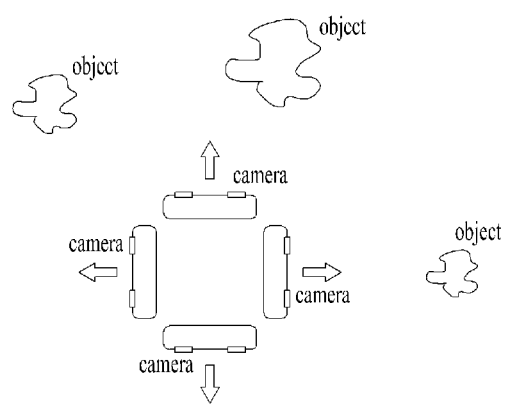

FIG. 26

| vpcc_unit_header( ) { | Descriptor |
|---|---|
| vpcc_unit_type | u(5) |
| if( vpcc_unit_type == VPCC_AVD  \| vpcc_unit_type == VPCC_GVD \|\| vuh_unit_type == VPCC_OVD \|\| vuh_unit_type == VPCC_AD ) { | |
| vpcc_sequence_parameter_set_id | u(4) |
| vuh_atlas_id | u(6) |
| } | |
| if( vuh_unit_type == VPCC_AVD ) { | |
| vuh_attribute_index | u(7) |
| vuh_attribute_partition_index | u(5) |
| vuh_map_index | u(4) |
| vuh_auxiliary_video_flag | u(1) |
| } else if( vuh_unit_type == VPCC_GVD ) { | |
| vuh_map_index | u(4) |
| vuh_auxiliary_video_flag | u(1) |
| vuh_reserved_zero_12bits | u(12) |
| } else if( vuh_unit_type == VPCC_OVD  \| vuh_unit_type == VPCC_AD ) | |
| vuh_reserved_zero_17bits | u(17) |
| else | |
| vuh_reserved_zero_27bits | u(27) |
| } | |

26000

| vpcc_unit_payload( ) { | Descriptor |
|---|---|
| if( vuh_unit_type == VPCC_VPS ) | |
| vpcc_parameter_set( ) | |
| else if( vuh_unit_type == VPCC_AD ) | |
| atlas_sub_bitstream( ) | |
| else if( vuh_unit_type == VPCC_OVD \|\| vuh_unit_type == VPCC_GVD \|\| vuh_unit_type == VPCC_AVD) | |
| video_sub_bitstream( ) | |
| } | |

| vpcc_parameter_set( ) { | Descriptor |
|---|---|
|    profile_tier_level() | u(5) |
|    vps_vpcc_parameter_set_id | |
|    vps_atlas_count_minus1 | |
|    for( j = 0; j < vps_atlas_count_minus1 + 1; j++ ) { | u(4) |
|       vps_frame_width[ j ] | u(6) |
|       vps_frame_height[ j ] | |
|       vps_map_count_minus1[ j ] | |
|       if( vps_map_count_minus1[ j ] > 0 ) | u(7) |
|          vps_multiple_map_streams_present_flag[ j ] | u(5) |
|       vps_map_absolute_coding_enabled_flag[ j ][ 0 ] = 1 | u(4) |
|       for( i = 1; i <= vps_map_count_minus1[ j ]; i++ ) { | u(1) |
|          if( vps_multiple_map_streams_present_flag[ j ] ) | |
|             vps_map_absolute_coding_enabled_flag[ j ][ i ] | u(4) |
|          else | u(1) |
|             vps_map_absolute_coding_enabled_flag[ j ][ i ] = 1 | u(12) |
|          if( vps_map_absolute_coding_enabled_flag[ j ][ i ] == 0 ) { | |
|             if( i > 0) | u(17) |
|                vps_map_predictor_index_diff[ j ][ i ] | |
|             else | u(27) |
|                vps_map_predictor_index_diff[ j ][ i ] = 0 | |
|          } | |
|       } | |
|       vps_auxiliary_video_present_flag[ j ] | |
|       occupancy_information( j ) | |
|       geometry_information( j ) | |
|       attribute_information( j ) | |
|    } | |
|    vps_extension_present_flag | |
|    if(vps_extension_present_flag) { | |
|       vps_extension_length_minus1 | |
|       for( j = 0; j < vps_extension_length_minus1 - 1; j++ ) { | |
|          vps_extension_data_byte | |
|       } | |
|    } | |
|    byte_alignment( ) | |
| } | |

FIG. 30

| atlas_sequence_parameter_set_rbsp( ) { | Descriptor |
|---|---|
| asps_atlas_sequence_parameter_set_id | ue(v) |
| asps_frame_width | u(16) |
| asps_frame_height | u(16) |
| asps_log2_patch_packing_block_size | u(3) |
| asps_log2_max_atlas_frame_order_cnt_lsb_minus4 | u(v) |
| asps_max_dec_atlas_frame_buffering_minus1 | u(v) |
| asps_long_term_ref_atlas_frames_flag | u(1) |
| asps_num_ref_atlas_frame_lists_in_asps | u(v) |
| for( i = 0; i < asps_num_ref_atlas_frame_lists_in_asps; i++ ) | |
|     ref_list_struct( i ) | |
| asps_use_eight_orientations_flag | u(1) |
| asps_extended_projection_enabled_flag | u(1) |
| asps_normal_axis_limits_quantization_enabled_flag | u(1) |
| asps_normal_axis_max_delta_value_enabled_flag | u(1) |
| asps_remove_duplicate_point_enabled_flag | u(1) |
| asps_pixel_deinterleaving_enabled_flag | u(1) |
| asps_patch_precedence_order_flag | u(1) |
| asps_patch_size_quantizer_present_flag | u(1) |
| asps_raw_patch_enabled_flag | u(1) |
| asps_eom_patch_enabled_flag | u(1) |
| if (asps_raw_patch_enabled_flag || asps_eom_patch_enabled_flag ) | |
|     asps_auxiliary_video_enabled_flag | u(1) |
| asps_point_local_reconstruction_enabled_flag | u(1) |
| asps_map_count_minus1 | u(4) |
| if( asps_pixel_deinterleaving_enabled_flag ) | |
|     for( j = 0; j <= asps_map_count_minus1; j++ ) | |
|         asps_pixel_deinterleaving_map_flag[ j ] | u(1) |
| if( asps_eom_patch_enabled_flag && asps_map_count_minus1 == 0 ) | |
|     asps_eom_fix_bit_count_minus1 | u(4) |
| if( asps_point_local_reconstruction_enabled_flag ) | |
|     asps_point_local_reconstruction_information( asps_map_count_minus1 ) | |
| if( asps_pixel_deinterleaving_enabled_flag || asps_point_local_reconstruction_enabled_flag ) | |
|     asps_surface_thickness_minus1 | u(8) |
| asps_vui_parameters_present_flag | u(1) |
| if( asps_vui_parameters_present_flag ) | |
|     vui_parameters( ) | |
| asps_extension_flag | u(1) |
| if( asps_extension_flag ) | |
|     while( more_rbsp_data( ) ) | |
|         asps_extension_data_flag | u(1) |
| rbsp_trailing_bits( ) | |
| } | |

FIG. 31

| atlas_frame_parameter_set_rbsp( ) { | Descriptor |
|---|---|
| afps_atlas_frame_parameter_set_id | ue(v) |
| afps_atlas_sequence_parameter_set_id | ue(v) |
| atlas_frame_tile_information( ) | |
| afps_output_flag_present_flag_block_size | u(1) |
| afps_num_ref_idx_default_active_minus1 | ue(v) |
| afps_additional_lt_afoc_lsb_len | ue(v) |
| afps_3d_pos_x_bit_count_minus1 | u(5) |
| afps_3d_pos_y_bit_count_minus1 | u(5) |
| afps_lod_mode_enabled_flag | u(1) |
| afps_override_eom_for_depth_flag | u(1) |
| if( afps_override_eom_for_depth_flag ) { | |
|     afps_eom_number_of_patch_bit_count_minus1 | u(4) |
|     afps_eom_max_bit_count_minus1 | u(4) |
| } | |
| afps_raw_3d_pos_bit_count_explicit_mode_flag | u(1) |
| afps_fixed_camera_model_flag | u(1) |
| afps_extension_flag_flag | u(1) |
| if( afps_extension_flag )_flag | |
|     while( more_rbsp_data( ) ) | |
|         afps_extension_data_flag | u(1) |
| rbsp_trailing_bits( ) | |
| } | |

FIG. 32

| atlas_frame_tile_information( ) { | Descriptor |
|---|---|
|     afti_single_tile_in_atlas_frame_flag | u(1) |
|     if( !afti_single_tile_in_atlas_frame_flag ) { | |
|         afti_uniform_tile_spacing_flag | u(1) |
|         if( afti_uniform_tile_spacing_flag ) { | |
|             afti_tile_cols_width_minus1 | ue(v) |
|             afti_tile_rows_height_minus1 | ue(v) |
|         } else { | |
|             afti_num_tile_columns_minus1 | ue(v) |
|             afti_num_tile_rows_minus1 | ue(v) |
|             for( i = 0; i < afti_num_tile_columns_minus1; i++ ) | |
|                 afti_tile_column_width_minus1[ i ] | ue(v) |
|             for( i = 0; i < afti_num_tile_rows_minus1; i++ ) _rows_minus1 | |
|                 afti_tile_row_height_minus1[ i ] | ue(v) |
|         } | |
|         afti_single_tile_per_tile_group_flag | u(1) |
|         if( !afti_single_tile_per_tile_group_flag ) { ; i++ ) | |
|         afti_num_tile_groups_in_atlas_frame_minus1 | ue(v) |
|         for( i = 0; i < afti_num_tile_groups_in_atlas_frame_minus1 + 1; i++ ) { | |
|             if( i > 0 ) | |
|                 afti_top_left_tile_idx[ i ] | u(v) |
|             afti_bottom_right_tile_idx_delta[ i ] | u(v) |
|         } | |
|         } | |
|         afti_signalled_tile_group_id_flag | u(1) |
|         if( afti_signalled_tile_group_id_flag ) { | |
|         afti_signalled_tile_group_id_length_minus1 | ue(v) |
|         for( i = 0; i < afti_num_tile_groups_in_atlas_frame_minus1 + 1; i++ ) | |
|             afti_tile_group_id[ i ] | u(v) |
|         } | |
|     } | |
| } | |

FIG. 33

| atlas_adaptation_parameter_set_rbsp() { | Descriptor |
|---|---|
| aaps_atlas_adaptation_parameter_set_id | ue(v) |
| aaps_camera_parameters_present_flag | u(1) |
| if ( aaps_camera_parameters_present_flag ) | |
|     atlas_camera_parameters( )_flag_present_flag_block_size | |
| aaps_extension_flag | u(1) |
| if( aaps_extension_flag ) | |
|     while( more_rbsp_data( ) ) | |
|         aaps_extension_data_flag | u(1) |
| rbsp_trailing_bits( ) | |
| } | |

| atlas_camera_parameters() { | Descriptor |
|---|---|
| acp_camera_model | u(8) |
| if( acp_camera_model == 1 ) { | |
|     acp_scale_enabled_flag | u(1) |
|     acp_offset_enabled_flag | u(1) |
|     acp_rotation_enabled_flag | u(1) |
|     if( acp_scale_enabled_flag ) | |
|         for( d = 0; d < 3; d++ ) | |
|             acp_scale_on_axis[ d ] | u(32) |
|     if( acp_offset_enabled_flag ) | |
|         for( d = 0; d < 3; d++ ) | |
|             acp_offset_on_axis[ d ] | i(32) |
|     if( acp_offset_enabled_flag ) | |
|         acp_rotation_qx | i(16) |
|         acp_rotation_qy | i(16) |
|         acp_rotation_qz | i(16) |
|     } | |
| } | |
| } | |

FIG. 34

| atlas_tile_group_layer_rbsp( ) { | Descriptor |
|---|---|
| atlas_tile_group_header( ) | |
| if( atgh_type != SKIP_TILE_GRP ) | |
| atlas_tile_group_data_unit( ) | |
| rbsp_trailing_bits( ) | |
| } | |

| atlas_tile_group_header( ) { | Descriptor |
|---|---|
| atgh_atlas_frame_parameter_set_id | ue(v) |
| atgh_atlas_adaptation_parameter_set_id | ue(v) |
| atgh_address | u(v) |
| atgh_type | ue(v) |
| if( afps_output_flag_present_flag ) | |
| atgh_atlas_output_flag | u(1) |
| atgh_atlas_frm_order_cnt_lsb | u(v) |
| if( asps_num_ref_atlas_frame_lists_in_asps > 0 ) | |
| atgh_ref_atlas_frame_list_sps_flag | u(1) |
| if( atgh_ref_atlas_frame_list_sps_flag == 0) | |
| ref_list_struct( asps_num_ref_atlas_frame_lists_in_asps ) | |
| else if( asps_num_ref_atlas_frame_lists_in_asps > 1 ) | |
| atgh_ref_atlas_frame_list_idx | u(v) |
| for( j = 0; j < NumLtrAtlasFrmEntries; j++ ) { | |
| atgh_additional_afoc_lsb_present_flag[ j ] | u(1) |
| if( atgh_additional_afoc_lsb_present_flag[ j ] ) | |
| atgh_additional_afoc_lsb_val[ j ] | u(v) |
| } | |
| if( atgh_type != SKIP_TILE_GRP ) { | Descriptor |
| if( asps_normal_axis_limits_quantization_enabled_flag ) { | ue(v) |
| atgh_pos_min_z_quantizer | u(1) |
| if( asps_normal_axis_max_delta_value_enabled_flag ) | |
| atgh_pos_delta_max_z_quantizer | |
| } | u(1) |
| if( asps_patch_size_quantizer_present_flag ) { | |
| atgh_patch_size_x_info_quantizer | |
| atgh_patch_size_y_info_quantizer | u(1) |
| } | |
| if( afps_raw_3d_pos_bit_count_explicit_mode_flag ) | |
| atgh_raw_3d_pos_axis_bit_count_minus1 | |
| if( atgh_type == P_TILE_GRP && num_ref_entries[ RlsIdx ] > 1 ) { | |
| atgh_num_ref_idx_active_override_flag | |
| if( atgh_num_ref_idx_active_override_flag ) | |
| atgh_num_ref_idx_active_minus1 | |
| } | |
| } | |
| } | |

FIG. 35

| ref_list_struct( rlsIdx ) { | Descriptor |
|---|---|
| num_ref_entries[ rlsIdx ] | ue(v) |
| for( i = 0; i < num_ref_entries[ rlsIdx ]; i++ ) { | |
| if( asps_long_term_ref_atlas_frames_flag ) | |
| st_ref_atlas_frame_flag[ rlsIdx ][ i ] | u(1) |
| if( st_ref_atlas_frame_flag[ rlsIdx ][ i ] ) { | |
| abs_delta_afoc_st[ rlsIdx ][ i ] | ue(v) |
| if( abs_delta_afoc_st[ rlsIdx ][ i ] > 0 ) | |
| strpf_entry_sign_flag[ rlsIdx ][ i ] | u(1) |
| } else | |
| afoc_lsb_lt[ rlsIdx ][ i ] | u(v) |
| } | |
| } | |

FIG. 36

| atlas_tile_group_data_unit( ) { | Descriptor |
|---|---|
| p = 0 | |
| atgdu_patch_mode[ p ] | ue(v) |
| while( atgdu_patch_mode[ p ] != I_END && atgdu_patch_mode[ p ] != P_END ){ | |
|     patch_information_data( p, atgdu_patch_mode[ p ] ) | |
|     p++ | |
|     atgdu_patch_mode[ p ] | ue(v) |
| } | |
| AtgduTotalNumberOfPatches = p } | |
| } | |

FIG. 37

| patch_data_unit( patchIdx ) { | Descriptor |
|---|---|
| pdu_2d_pos_x[ patchIdx ] | ue(v) |
| pdu_2d_pos_y[ patchIdx ] | ue(v) |
| pdu_2d_size_x_minus1[ patchIdx ] | ue(v) |
| pdu_2d_size_y_minus1[ patchIdx ] | ue(v) |
| pdu_3d_pos_x[ patchIdx ] | u(v) |
| pdu_3d_pos_y[ patchIdx ] | u(v) |
| pdu_3d_pos_min_z[ patchIdx ] | u(v) |
| if( asps_normal_axis_max_delta_value_enabled_flag ) | |
|     pdu_3d_pos_delta_max_z[ patchIdx ] | u(v) |
| pdu_projection_id[ patchIdx ] | u(v) |
| pdu_orientation_index[ patchIdx ] | u(v) |
| if( afps_lod_mode_enabled_flag ) { | |
|     pdu_lod_enabled_flag[ patchIndex ] | u(1) |
|     if( pdu_lod_enabled_flag[ patchIndex ] > 0 ) { | |
|         pdu_lod_scale_x_minus1[ patchIndex ] | ue(v) |
|         pdu_lod_scale_y[ patchIndex ] | ue(v) |
|     } | |
| } | u(v) |
| if( asps_point_local_reconstruction_enabled_flag ) | |
|     point_local_reconstruction_data( patchIdx ) | |
| } | |

FIG. 41

| sei_rbsp( ) { | Descriptor |
|---|---|
|    do | |
|       sei_message( ) | |
|    while( more_rbsp_data( ) ) | |
| } | |

— 41000

| sei_payload( payloadType, payloadSize ) { | Descriptor |
|---|---|
|   if(( nal_unit_type == NAL_PREFIX_NSEI ) \|\| ( nal_unit_type == NAL_PREFIX_ESEI )) { | |
|     if( payloadType == XX ) | |
|       sei( payloadSize ) | |
|     else | |
|       reserved_sei_message( payloadSize ) | |
|   } | |
|   else { /*( nal_unit_type == NAL_SUFFIX_NSEI ) \|\| ( nal_unit_type == NAL_SUFFIX_ESEI )*/ | |
|     if( payloadType == XX) | |
|       sei( payloadSize ) | |
|     else | |
|       reserved_sei_message( payloadSize ) | |
|   } | |
| } | |

```
V-PCC SEI information structure
aligned(8) class VPCCSEIInfoStruct (){
        unsigned int(16) numEssentialSEIs;
        for (i = 0; i < numEssentialSEIs; i++) {
                unsigned int(16)   ESEI_type;
                unsigned int(16)   ESEI_length
                nal_unit(ESEI_length) ESEI_byte;

}
        unsigned int(16) numNonEssentialSEIs;
        for (i = 0; i < numNonEssentialSEIs; i++) {
                unsigned int(16)   NSEI_type;
                unsigned int(16)   NSEI_length
                nal_unit(NSEI_length)      NSEI_byte;
        }
}
```
—42000

```
V-PCC atlas parameter set information structure
aligned(8) class VPCCAPSStruct (){
        unsigned int(8) numOfAPSArrays;
                for (j=0; j < numOfAPSArrays; j++) {
        unsigned int(8) aps_id;
                        unsigned int(6) aps_NAL_unit_type;
                        unsigned int(8) aps_numNALUnits;
                        for (i=0; i < aps_numNALUnits; i++) {
                                unsigned int(16) apsLength;
                                nal_unit(APSLength) apsUnit;
                        }
                }
}
```
—42001

FIG. 43

```
Sample Group with grouping type – 'vaps' aligned(8) class VPCCAtlasParamSampleGroupDescriptionEntry() extends SampleGroupDescriptionEntry('vaps') {
        unsigned int(8) numOfSetupUnits;
        for (i=0; i < numOfSetupUnits; i++) {
                unsigned int(16) setupUnitLength;
                nal_unit(setupUnitLength) setupUnit;
}
```
~4200

```
Sample Group with grouping type = 'vsei' aligned(8) class VPCCAtlasParamSampleGroupDescriptionEntry() extends SampleGroupDescriptionEntry('vaps') {
        VPCCAPSStruct();
}
```
~4201

FIG. 44

```
SEI track group aligned(8) class VPCCSEISampleGroupDescriptionEntry() extends SampleGroupDescriptionEntry('vsei') {
        VPCCSEIInfoStruct();
}
```
— 43000

```
SEI entity grouping aligned(8) class PlayoutEntityGroupBox (version, flags) extends EntityToGroupBox ('vpse', version, flags) {
        for(i=0; i<num_entities_in_group; i++) {
                VPCCSEIInfoStruct ();
        }
}
```
— 43001

FIG. 45

```
Atlas parameter set track group aligned(8) class SpatialRegionGroupBox extends TrackGroupTypeBox('vpap') {
        VPCCAPSStruct ();
}
```
~44000

```
Atlas parameter set entity grouping aligned(8) class PlayoutEntityGroupBox (version, flags) extends EntityToGroupBox ('vpap', version, flags) {
        for(i=0; i<num_entities_in_group; i++) {
                VPCCAPSStruct ();
        }
}
```
~44000

FIG. 46

```
aligned(8) class VPCCSampleEntry() extends VolumetricVisualSampleEntry ('vpc1') {
        VPCCConfigurationBox config;
        VPCCUnitHeaderBox unit_header;
        VPCCSEIInfoBox vpcc_sei;
        VPCCAPSBox vpcc_aps;
}
```
— 45000

```
aligned(8) class VPCCBitStreamSampleEntry() extends VolumetricVisualSampleEntry ('vpe1'){
        VPCCConfigurationBox config;
        VPCCSEIInfoBox vpcc_sei;
        VPCCAPSBox vpcc_aps;
}
```
— 45001

FIG. 47

```
aligned(8) class VPCCSEISampleEntry extends MetadataSampleEntry('dyse') {
    VPCCSEIInfoStruct ();
}
```
— 46000a

```
aligned(8) class Valigned(8) class VPCCSEISample {
    unsigned int(14) num_active_sei;
    unsigned int(1) addl_active_sei;
    for (i = 0; i < num_active_sei; i--){
        unsigned int(1) essential_flag;
        unsigned int(16) active_sei_type;
    }
    if(addl_active_sei)
        VPCCSEIInfoStruct();
}
```
— 46000b

```
aligned(8) class VPCCAPSSampleEntry extends MetadataSampleEntry('dyap') {
    VPCCAPSStruct ();
}
```
— 46001a

```
aligned(8) class VPCCAPSSample {
    unsigned int(14) num_active_aps;
    unsigned int(1) addl_active_aps;
    for (i = 0; i < num_active_aps; i++){
        unsigned int(8) active_aps_id;
        unsigned int(16) active_sei_type;
    }
    if(addl_active_aps)
        VPCCAPSStruct ();
}
```
— 46001b

FIG. 48

```
V-PCC SEI item property aligned(8) class VPCCSEIItemProperty () extends ItemFullProperty('vsei', version=0, 0) {
        VPCCSEIInfoStruct ();
}
```
—47000

```
V-PCC APS item property aligned(8) class VPCCAPSItemProperty () extends ItemFullProperty('vpap', version=0, 0) {
        VPCCAPSStruct ();
}
```
—47001

POINT CLOUD DATA TRANSMISSION DEVICE, POINT CLOUD DATA TRANSMISSION METHOD, POINT CLOUD DATA RECEPTION DEVICE, AND POINT CLOUD DATA RECEPTION METHOD

CROSS-REFERENCE TO RELATED APPLICATION

This application claims the benefit of U.S. Provisional Application No. 63/008,735, filed on Apr. 11, 2020, which is hereby incorporated by reference as if fully set forth herein.

TECHNICAL FIELD

Embodiments provide a method for providing point cloud content to provide a user with various services such as virtual reality (VR), augmented reality (AR), mixed reality (MR), and self-driving services.

BACKGROUND

A point cloud is a set of points in a three-dimensional (3D) space. It is difficult to generate point cloud data because the number of points in the 3D space is large.

A large throughput is required to transmit and receive data of a point cloud.

SUMMARY

An object of the present disclosure is to provide a point cloud data transmission device, a point cloud data transmission method, a point cloud data reception device, and a point cloud data reception method for efficiently transmitting and receiving a point cloud.

Another object of the present disclosure is to provide a point cloud data transmission device, a point cloud data transmission method, a point cloud data reception device, and a point cloud data reception method for addressing latency and encoding/decoding complexity.

Embodiments are not limited to the above-described objects, and the scope of the embodiments may be extended to other objects that can be inferred by those skilled in the art based on the entire contents of the present disclosure.

To achieve these objects and other advantages and in accordance with the purpose of the disclosure, as embodied and broadly described herein, a method for transmitting point cloud data may include encoding point cloud data, encapsulating the point cloud data, and transmitting the point cloud data.

In another aspect of the present disclosure, a method for receiving point cloud data may include receiving point cloud data, decapsulating the point cloud data, and decoding the point cloud data.

The point cloud data transmission method, the point cloud data transmission device, the point cloud data reception method, and the point cloud data reception apparatus according to the embodiments may provide a good-quality point cloud service.

The point cloud data transmission method, the point cloud data transmission device, the point cloud data reception method, and the point cloud data reception apparatus according to the embodiments may achieve various video codec methods.

The point cloud data transmission method, the point cloud data transmission device, the point cloud data reception method, and the point cloud data reception apparatus according to the embodiments may provide universal point cloud content such as a self-driving service.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIG. 2 illustrates capture of point cloud data according to embodiments;

FIG. 26 shows a V-PCC unit and a V-PCC unit header according to embodiments;

FIG. 27 shows exemplary syntax of a V-PCC parameter set according to embodiments;

FIG. 30 shows exemplary syntax of an atlas sequence parameter set according to embodiments;

FIG. 31 shows exemplary syntax of an atlas frame parameter set according to embodiments;

FIG. 32 shows exemplary syntax of atlas frame tile information according to embodiments;

FIG. 33 shows exemplary syntax of an atlas adaptation parameter set and atlas camera parameters according to embodiments;

FIG. 34 shows atlas tile group layer information according to embodiments;

FIG. 35 shows reference list structure information according to embodiments;

FIG. 36 shows an atlas tile group data unit according to embodiments;

FIG. 37 shows exemplary syntax of a patch data unit according to embodiments;

FIG. 41 shows an exemplary SEI message structure according to embodiments;

FIG. 42 shows VPCC SEI message structure information and atlas a parameter set structure according to embodiments;

FIG. 43 shows VPCC SEI message structure information and atlas a parameter set structure according to embodiments;

FIG. 44 illustrates a method for an SEI track group and SEI entity grouping according to embodiments;

FIG. 45 illustrates a method for atlas parameter set track grouping (SEI track group) and atlas parameter set entity grouping (SEI entity grouping) according to embodiments;

FIG. 46 shows an example of a V-PCC sample entry and a V-PCC bitstream sample entry (VPCCBitstreamSampleEntry) according to embodiments;

FIG. 47 shows syntax of a V-PCC SEI sample and/or a V-PCC APS sample by a timed metadata track according to embodiments;

FIG. 48 shows exemplary syntax of a V-PCC SEI item property and a V-PCC APS item property according to embodiments;

DETAILED DESCRIPTION

Best Mode

Reference will now be made in detail to the preferred embodiments of the present disclosure, examples of which are illustrated in the accompanying drawings. The detailed description, which will be given below with reference to the accompanying drawings, is intended to explain exemplary embodiments of the present disclosure, rather than to show the only embodiments that can be implemented according to the present disclosure. The following detailed description includes specific details in order to provide a thorough understanding of the present disclosure. However, it will be apparent to those skilled in the art that the present disclosure may be practiced without such specific details.

Although most terms used in the present disclosure have been selected from general ones widely used in the art, some terms have been arbitrarily selected by the applicant and their meanings are explained in detail in the following description as needed. Thus, the present disclosure should be understood based upon the intended meanings of the terms rather than their simple names or meanings.

Figure 1:
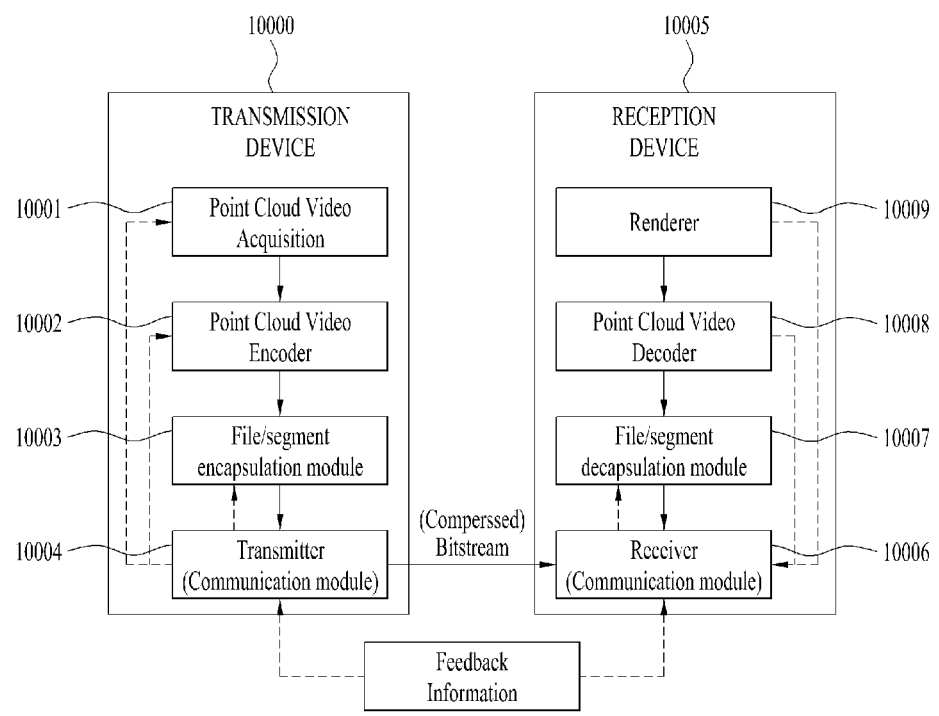
FIG. 1 illustrates an exemplary structure of a transmission/reception system for providing point cloud content according to embodiments.

FIG. 1 illustrates an exemplary structure of a transmission/reception system for providing point cloud content according to embodiments.

The present disclosure provides a method of providing point cloud content to provide a user with various services such as virtual reality (VR), augmented reality (AR), mixed reality (MR), and autonomous driving. The point cloud content according to the embodiments represent data representing objects as points, and may be referred to as a point cloud, point cloud data, point cloud video data, point cloud image data, or the like.

A point cloud data transmission device 10000 according to embodiment may include a point cloud video acquirer 10001, a point cloud video encoder 10002, a file/segment encapsulation module 10003, and/or a transmitter (or communication module) 10004. The transmission device according to the embodiments may secure and process point cloud video (or point cloud content) and transmit the same. According to embodiments, the transmission device may include a fixed station, a base transceiver system (BTS), a network, an artificial intelligence (AI) device and/or system, a robot, and an AR/VR/XR device and/or a server. According to embodiments, the transmission device 10000 may include a device robot, a vehicle, AR/VR/XR devices, a portable device, a home appliance, an Internet of Thing (IoT) device, and an AI device/server which are configured to perform communication with a base station and/or other wireless devices using a radio access technology (e.g., 5G New RAT (NR), Long Term Evolution (LTE)).

The point cloud video acquirer 10001 according to the embodiments acquires a point cloud video through a process of capturing, synthesizing, or generating a point cloud video.

The point cloud video encoder 10002 according to the embodiments encodes the point cloud video data. According to embodiments, the point cloud video encoder 10002 may be referred to as a point cloud encoder, a point cloud data encoder, an encoder, or the like. The point cloud compression coding (encoding) according to the embodiments is not limited to the above-described embodiment. The point cloud video encoder may output a bitstream containing the encoded point cloud video data. The bitstream may include not only the encoded point cloud video data, but also signaling information related to encoding of the point cloud video data.

The encoder according to the embodiments may support both the geometry-based point cloud compression (G-PCC) encoding scheme and/or the video-based point cloud compression (V-PCC) encoding scheme. In addition, the encoder may encode a point cloud (referring to either point cloud data or points) and/or signaling data related to the point cloud. The specific operation of encoding according to embodiments will be described below.

As used herein, the term V-PCC may stand for Video-based Point Cloud Compression (V-PCC). The term V-PCC may be the same as Visual Volumetric Video-based Coding (V3C). These terms may be complementarily used.

The file/segment encapsulation module 10003 according to the embodiments encapsulates the point cloud data in the form of a file and/or segment form. The point cloud data transmission method/device according to the embodiments may transmit the point cloud data in a file and/or segment form.

The transmitter (or communication module) 10004 according to the embodiments transmits the encoded point cloud video data in the form of a bitstream. According to embodiments, the file or segment may be transmitted to a reception device over a network, or stored in a digital storage medium (e.g., USB, SD, CD, DVD, Blu-ray, HDD, SSD, etc.). The transmitter according to the embodiments is capable of wired/wireless communication with the reception device (or the receiver) over a network of 4G, 5G, 6G, etc. In addition, the transmitter may perform necessary data processing operation according to the network system (e.g., a 4G, 5G or 6G communication network system). The transmission device may transmit the encapsulated data in an on-demand manner.

A point cloud data reception device 10005 according to the embodiments may include a receiver 10006, a file/segment decapsulation module 10007, a point cloud video decoder 10008, and/or a renderer 10009. According to embodiments, the reception device may include a device robot, a vehicle, AR/VR/XR devices, a portable device, a home appliance, an Internet of Thing (IoT) device, and an AI device/server which are configured to perform communication with a base station and/or other wireless devices using a radio access technology (e.g., 5G New RAT (NR), Long Term Evolution (LTE)).

The receiver 10006 according to the embodiments receives a bitstream containing point cloud video data. According to embodiments, the receiver 10006 may transmit feedback information to the point cloud data transmission device 10000.

The file/segment decapsulation module 10007 decapsulates a file and/or a segment containing point cloud data. The decapsulation module according to the embodiments may perform an reverse process of the encapsulation process according to the embodiments.

The point cloud video decoder 10007 decodes the received point cloud video data. The decoder according to the embodiments may perform a reverse process of encoding according to the embodiments.

The renderer 10009 renders the decoded point cloud video data. According to embodiments, the renderer 10009 may transmit the feedback information obtained at the reception side to the point cloud video decoder 10008. The point cloud video data according to the embodiments may carry feedback information to the receiver. According to embodiments, the feedback information received by the point cloud transmission device may be provided to the point cloud video encoder.

The arrows indicated by dotted lines in the drawing represent a transmission path of feedback information acquired by the reception device 10005. The feedback information is information for reflecting interactivity with a user who consumes point cloud content, and includes user information (e.g., head orientation information), viewport information, and the like). In particular, when the point cloud content is content for a service (e.g., autonomous driving service, etc.) that requires interaction with a user, the feedback information may be provided to the content transmitting side (e.g., the transmission device 10000) and/or the service provider. According to embodiments, the feedback information may be used in the reception device 10005 as well as the transmission device 10000, and may not be provided.

The head orientation information according to embodiments is information about a user's head position, orientation, angle, motion, and the like. The reception device 10005 according to the embodiments may calculate viewport information based on the head orientation information. The viewport information may be information about a region of the point cloud video that the user is viewing. A viewpoint is a point where a user is viewing a point cloud video, and may refer to a center point of the viewport region. That is, the viewport is a region centered on the viewpoint, and the size and shape of the region may be determined by a field of view (FOV). Accordingly, the reception device 10005 may extract the viewport information based on a vertical or horizontal FOV supported by the device in addition to the head orientation information. In addition, the reception device 10005 performs gaze analysis to check how the user consumes a point cloud, a region that the user gazes at in the point cloud video, a gaze time, and the like. According to embodiments, the reception device 10005 may transmit feedback information including the result of the gaze analysis to the transmission device 10000. The feedback information according to the embodiments may be acquired in the rendering and/or display process. The feedback information according to the embodiments may be secured by one or more sensors included in the reception device 10005. In addition, according to embodiments, the feedback information may be secured by the renderer 10009 or a separate external element (or device, component, etc.). The dotted lines in FIG. 1 represent a process of transmitting the feedback information secured by the renderer 10009. The point cloud content providing system may process (encode/decode) point cloud data based on the feedback information. Accordingly, the point cloud video data decoder 10008 may perform a decoding operation based on the feedback information. The reception device 10005 may transmit the feedback information to the transmission device. The transmission device (or the point cloud video data encoder 10002) may perform an encoding operation based on the feedback information. Accordingly, the point cloud content providing system may efficiently process necessary data (e.g., point cloud data corresponding to the user's head position) based on the feedback information rather than processing (encoding/decoding) all point cloud data, and provide point cloud content to the user.

According to embodiments, the transmission device 10000 may be called an encoder, a transmission device, a transmitter, or the like, and the reception device 10004 may be called a decoder, a reception device, a receiver, or the like.

The point cloud data processed in the point cloud content providing system of FIG. 1 according to embodiments (through a series of processes of acquisition/encoding/transmission/decoding/rendering) may be referred to as point cloud content data or point cloud video data. According to embodiments, the point cloud content data may be used as a concept covering metadata or signaling information related to point cloud data.

The elements of the point cloud content providing system illustrated in FIG. 1 may be implemented by hardware, software, a processor, and/or combinations thereof.

Embodiments may provide a method of providing point cloud content to provide a user with various services such as virtual reality (VR), augmented reality (AR), mixed reality (MR), and autonomous driving.

In order to provide a point cloud content service, a point cloud video may be acquired first. The acquired point cloud video may be transmitted through a series of processes, and the reception side may process the received data back into the original point cloud video and render the processed point cloud video. Thereby, the point cloud video may be provided to the user. Embodiments provide a method of effectively performing this series of processes.

The entire processes for providing a point cloud content service (the point cloud data transmission method and/or point cloud data reception method) may include an acquisition process, an encoding process, a transmission process, a decoding process, a rendering process, and/or a feedback process.

According to embodiments, the process of providing point cloud content (or point cloud data) may be referred to as a point cloud compression process. According to embodiments, the point cloud compression process may represent a geometry-based point cloud compression process.

Each element of the point cloud data transmission device and the point cloud data reception device according to the embodiments may be hardware, software, a processor, and/or a combination thereof.

In order to provide a point cloud content service, a point cloud video may be acquired. The acquired point cloud video is transmitted through a series of processes, and the reception side may process the received data back into the original point cloud video and render the processed point cloud video. Thereby, the point cloud video may be provided to the user. Embodiments provide a method of effectively performing this series of processes.

The entire processes for providing a point cloud content service may include an acquisition process, an encoding process, a transmission process, a decoding process, a rendering process, and/or a feedback process.

The point cloud compression system may include a transmission device and a reception device. The transmission device may output a bitstream by encoding a point cloud video, and deliver the same to the reception device through a digital storage medium or a network in the form of a file or a stream (streaming segment). The digital storage medium may include various storage media such as a USB, SD, CD, DVD, Blu-ray, HDD, and SSD.

The transmission device may include a point cloud video acquirer, a point cloud video encoder, a file/segment encapsulator, and a transmitter. The reception device may include a receiver, a file/segment decapsulator, a point cloud video decoder, and a renderer. The encoder may be referred to as a point cloud video/picture/picture/frame encoder, and the decoder may be referred to as a point cloud video/picture/picture/frame decoding device. The transmitter may be included in the point cloud video encoder. The receiver may be included in the point cloud video decoder. The renderer may include a display. The renderer and/or the display may be configured as separate devices or external components. The transmission device and the reception device may further include a separate internal or external module/unit/component for the feedback process.

According to embodiments, the operation of the reception device may be the reverse process of the operation of the transmission device.

The point cloud video acquirer may perform the process of acquiring point cloud video through a process of capturing, composing, or generating point cloud video. In the acquisition process, data of 3D positions (x, y, z)/attributes (color, reflectance, transparency, etc.) of multiple points, for example, a polygon file format (PLY) (or the stanford triangle format) file may be generated. For a video having multiple frames, one or more files may be acquired. During the capture process, point cloud related metadata (e.g., capture related metadata) may be generated.

A point cloud data transmission device according to embodiments may include an encoder configured to encode point cloud data, and a transmitter configured to transmit the point cloud data. The data may be transmitted in the form of a bitstream containing a point cloud.

A point cloud data reception device according to embodiments may include a receiver configured to receive point cloud data, a decoder configured to decode the point cloud data, and a renderer configured to render the point cloud data.

The method/device according to the embodiments represents the point cloud data transmission device and/or the point cloud data reception device.

FIG. 2 illustrates capture of point cloud data according to embodiments.

Point cloud data according to embodiments may be acquired by a camera or the like. A capturing technique according to embodiments may include, for example, inward-facing and/or outward-facing.

In the inward-facing according to the embodiments, one or more cameras inwardly facing an object of point cloud data may photograph the object from the outside of the object.

In the outward-facing according to the embodiments, one or more cameras outwardly facing an object of point cloud data may photograph the object. For example, according to embodiments, there may be four cameras.

The point cloud data or the point cloud content according to the embodiments may be a video or a still image of an object/environment represented in various types of 3D spaces. According to embodiments, the point cloud content may include video/audio/an image of an object.

For capture of point cloud content, a combination of camera equipment (a combination of an infrared pattern projector and an infrared camera) capable of acquiring depth and RGB cameras capable of extracting color information corresponding to the depth information may be configured. Alternatively, the depth information may be extracted through LiDAR, which uses a radar system that measures the location coordinates of a reflector by emitting a laser pulse and measuring the return time. A shape of the geometry consisting of points in a 3D space may be extracted from the depth information, and an attribute representing the color/reflectance of each point may be extracted from the RGB information. The point cloud content may include information about the positions (x, y, z) and color (YCbCr or RGB) or reflectance (r) of the points. For the point cloud content, the outward-facing technique of capturing an external environment and the inward-facing technique of capturing a central object may be used. In the VR/AR environment, when an object (e.g., a core object such as a character, a player, a thing, or an actor) is configured into point cloud content that may be viewed by the user in any direction (360 degrees), the configuration of the capture camera may be based on the inward-facing technique. When the current surrounding environment is configured into point cloud content in a mode of a vehicle, such as autonomous driving, the configuration of the capture camera may be based on the outward-facing technique. Because the point cloud content may be captured by multiple cameras, a camera calibration process may need to be performed before the content is captured to configure a global coordinate system for the cameras.

The point cloud content may be a video or still image of an object/environment presented in various types of 3D spaces.

Additionally, in the point cloud content acquisition method, any point cloud video may be composed based on the captured point cloud video. Alternatively, when a point cloud video for a computer-generated virtual space is to be provided, capturing with an actual camera may not be performed. In this case, the capture process may be replaced simply by a process of generating related data.

Post-processing may be needed for the captured point cloud video to improve the quality of the content. In the video capture process, the maximum/minimum depth may be adjusted within a range provided by the camera equipment. Even after the adjustment, point data of an unwanted area may still be present. Accordingly, post-processing of removing the unwanted area (e.g., the background) or recognizing a connected space and filling the spatial holes may be performed. In addition, point clouds extracted from the cameras sharing a spatial coordinate system may be integrated into one piece of content through the process of transforming each point into a global coordinate system based on the coordinates of the location of each camera acquired through a calibration process. Thereby, one piece of point cloud content having a wide range may be generated, or point cloud content with a high density of points may be acquired.

The point cloud video encoder may encode the input point cloud video into one or more video streams. One video may include a plurality of frames, each of which may correspond to a still image/picture. In this specification, a point cloud video may include a point cloud image/frame/picture/video/audio. In addition, the term "point cloud video" may be used interchangeably with a point cloud image/frame/picture. The point cloud video encoder may perform a video-based point cloud compression (V-PCC) procedure. The point cloud video encoder may perform a series of procedures such as prediction, transformation, quantization, and entropy coding for compression and encoding efficiency. The encoded data (encoded video/image information) may be output in the form of a bitstream. Based on the V-PCC procedure, the point cloud video encoder may encode point cloud video by dividing the same into a geometry video, an attribute video, an occupancy map video, and auxiliary information, which will be described later. The geometry video may include a geometry image, the attribute video may include an attribute image, and the occupancy map video may include an occupancy map image. The auxiliary information may include auxiliary patch information. The attribute video/image may include a texture video/image.

The encapsulation processor (file/segment encapsulation module) 1003 may encapsulate the encoded point cloud video data and/or metadata related to the point cloud video in the form of, for example, a file. Here, the metadata related to the point cloud video may be received from the metadata processor. The metadata processor may be included in the point cloud video encoder or may be configured as a separate component/module. The encapsulation processor may encapsulate the data in a file format such as ISOBMFF or process the same in the form of a DASH segment or the like. According to an embodiment, the encapsulation processor may include the point cloud video-related metadata in the file format. The point cloud video metadata may be included, for example, in boxes at various levels on the ISOBMFF file format or as data in a separate track within the file. According to an embodiment, the encapsulation processor may encapsulate the point cloud video-related metadata into a file. The transmission processor may perform processing for transmission on the point cloud video data encapsulated according to the file format. The transmission processor may be included in the transmitter or may be configured as a separate component/module. The transmission processor may process the point cloud video data according to a transmission protocol. The processing for transmission may include processing for delivery over a broadcast network and processing for delivery through a broadband. According to an embodiment, the transmission processor may receive point cloud video-related metadata from the metadata processor alown with the point cloud video data, and perform processing of the point cloud video data for transmission.

The transmitter 1004 may transmit the encoded video/image information or data that is output in the form of a bitstream to the receiver of the reception device through a digital storage medium or a network in the form of a file or streaming. The digital storage medium may include various storage media such as USB, SD, CD, DVD, Blu-ray, HDD, and SSD. The transmitter may include an element for generating a media file in a predetermined file format, and may include an element for transmission over a broadcast/communication network. The receiver may extract the bitstream and transmit the extracted bitstream to the decoding device.

The receiver 1003 may receive point cloud video data transmitted by the point cloud video transmission device according to the present disclosure. Depending on the transmission channel, the receiver may receive the point cloud video data over a broadcast network or through a broadband. Alternatively, the point cloud video data may be received through a digital storage medium.

The reception processor may process the received point cloud video data according to the transmission protocol. The reception processor may be included in the receiver or may be configured as a separate component/module. The reception processor may reversely perform the above-described process of the transmission processor such that the processing corresponds to the processing for transmission performed at the transmission side. The reception processor may deliver the acquired point cloud video data to the decapsulation processor, and the acquired point cloud video-related metadata to the metadata parser. The point cloud video-related metadata acquired by the reception processor may take the form of a signaling table.

The decapsulation processor (file/segment decapsulation module) 1007 may decapsulate the point cloud video data received in the form of a file from the reception processor. The decapsulation processor may decapsulate the files according to ISOBMFF or the like, and may acquire a point cloud video bitstream or point cloud video-related metadata (a metadata bitstream). The acquired point cloud video bitstream may be delivered to the point cloud video decoder, and the acquired point cloud video-related metadata (metadata bitstream) may be delivered to the metadata processor. The point cloud video bitstream may include the metadata (metadata bitstream). The metadata processor may be included in the point cloud video decoder or may be configured as a separate component/module. The point cloud video-related metadata acquired by the decapsulation processor may take the form of a box or a track in the file format. The decapsulation processor may receive metadata necessary for decapsulation from the metadata processor, when necessary. The point cloud video-related metadata may be delivered to the point cloud video decoder and used in a point cloud video decoding procedure, or may be transferred to the renderer and used in a point cloud video rendering procedure.

The point cloud video decoder may receive the bitstream and decode the video/image by performing an operation corresponding to the operation of the point cloud video encoder. In this case, the point cloud video decoder may decode the point cloud video by dividing the same into a geometry video, an attribute video, an occupancy map video, and auxiliary information as described below. The geometry video may include a geometry image, and the attribute video may include an attribute image. The occupancy map video may include an occupancy map image. The auxiliary information may include auxiliary patch information. The attribute video/image may include a texture video/image.

The 3D geometry may be reconstructed based on the decoded geometry image, the occupancy map, and auxiliary patch information, and then may be subjected to a smoothing process. A color point cloud image/picture may be reconstructed by assigning color values to the smoothed 3D geometry based on the texture image. The renderer may render the reconstructed geometry and the color point cloud image/picture. The rendered video/image may be displayed through the display. The user may view all or part of the rendered result through a VR/AR display or a typical display.

The feedback process may include transferring various kinds of feedback information that may be acquired in the rendering/displaying process to the transmission side or to the decoder of the reception side. Interactivity may be provided through the feedback process in consuming point cloud video. According to an embodiment, head orientation information, viewport information indicating a region currently viewed by a user, and the like may be delivered to the transmission side in the feedback process. According to an embodiment, the user may interact with things implemented in the VR/AR/MR/autonomous driving environment. In this case, information related to the interaction may be delivered to the transmission side or a service provider during the feedback process. According to an embodiment, the feedback process may be skipped.

The head orientation information may represent information about the location, angle and motion of a user's head. On the basis of this information, information about a region of the point cloud video currently viewed by the user, that is, viewport information, may be calculated.

The viewport information may be information about a region of the point cloud video currently viewed by the user. Gaze analysis may be performed using the viewport information to check the way the user consumes the point cloud video, a region of the point cloud video at which the user gazes, and how long the user gazes at the region. The gaze analysis may be performed at the reception side and the result of the analysis may be delivered to the transmission side on a feedback channel. A device such as a VR/AR/MR display may extract a viewport region based on the location/direction of the user's head, vertical or horizontal FOV supported by the device, and the like.

According to an embodiment, the aforementioned feedback information may not only be delivered to the transmission side, but also be consumed at the reception side. That is, decoding and rendering processes at the reception side may be performed based on the aforementioned feedback information. For example, only the point cloud video for the region currently viewed by the user may be preferentially decoded and rendered based on the head orientation information and/or the viewport information.

Here, the viewport or viewport region may represent a region of the point cloud video currently viewed by the user. A viewpoint is a point which is viewed by the user in the point cloud video and may represent a center point of the viewport region. That is, a viewport is a region around a viewpoint, and the size and form of the region may be determined by the field of view (FOV).

The present disclosure relates to point cloud video compression as described above. For example, the methods/embodiments disclosed in the present disclosure may be applied to the point cloud compression or point cloud coding (PCC) standard of the moving picture experts group (MPEG) or the next generation video/image coding standard.

As used herein, a picture/frame may generally represent a unit representing one image in a specific time interval.

A pixel or a pel may be the smallest unit constituting one picture (or image). Also, "sample" may be used as a term corresponding to a pixel. A sample may generally represent a pixel or a pixel value. It may represent only a pixel/pixel value of a luma component, only a pixel/pixel value of a chroma component, or only a pixel/pixel value of a depth component.

A unit may represent a basic unit of image processing. The unit may include at least one of a specific region of the picture and information related to the region. The unit may be used interchangeably with term such as block or area in some cases. In a general case, an M×N block may include samples (or a sample array) or a set (or array) of transform coefficients configured in M columns and N rows.

Figure 3:
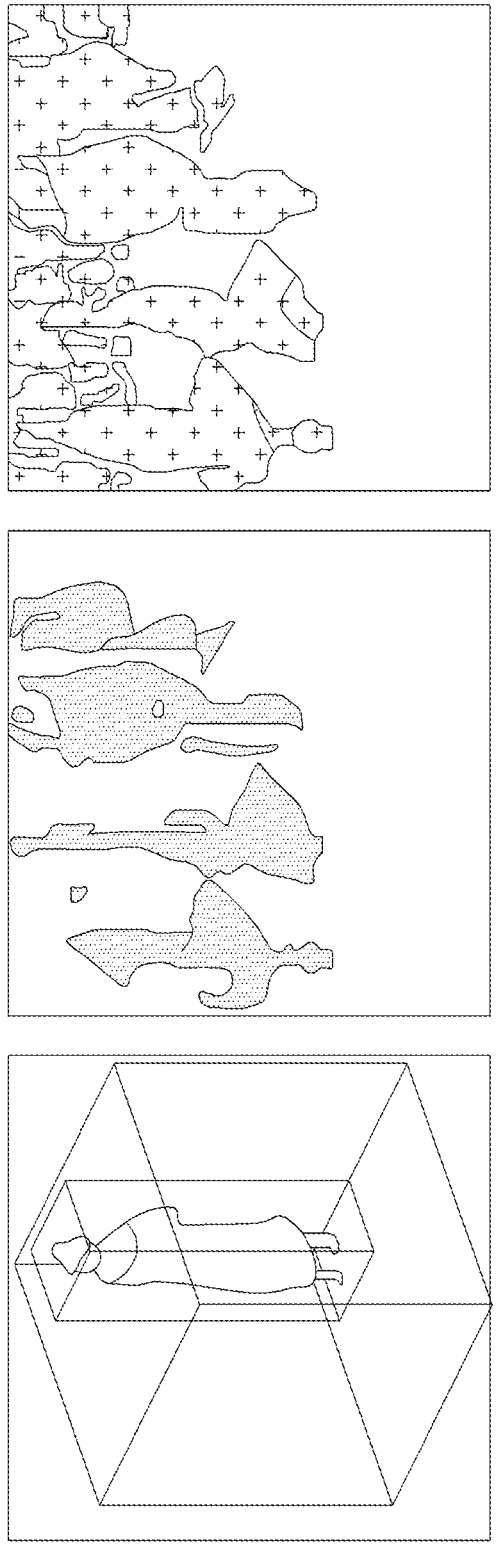
FIG. 3 illustrates an exemplary point cloud, geometry, and texture image according to embodiments.

FIG. 3 illustrates an example of a point cloud, a geometry image, and a texture image according to embodiments.

A point cloud according to the embodiments may be input to the V-PCC encoding process of FIG. 4, which will be described later, to generate a geometry image and a texture image. According to embodiments, a point cloud may have the same meaning as point cloud data.

As shown in the figure, the left part shows a point cloud, in which an object is positioned in a 3D space and may be represented by a bounding box or the like. The middle part shows the geometry, and the right part shows a texture image (non-padded image).

Video-based point cloud compression (V-PCC) according to embodiments may provide a method of compressing 3D point cloud data based on a 2D video codec such as HEVC or VVC. Data and information that may be generated in the V-PCC compression process are as follows:

Occupancy map: this is a binary map indicating whether there is data at a corresponding position in a 2D plane, using a value of 0 or 1 in dividing the points constituting a point cloud into patches and mapping the same to the 2D plane. The occupancy map may represent a 2D array corresponding to ATLAS, and the values of the occupancy map may indicate whether each sample position in the atlas corresponds to a 3D point. ATLAS means an object including information about 2D patches for each point cloud frame. For example, ATLAS may include 2D arrangement and size of patches, the position of a corresponding 3D region within a 3D point, a projection plan, and a level of detail parameters.

An atlas is a collection of 2D bounding boxes positioned in a rectangular frame that correspond to a 3D bounding box in a 3D space in which volumetric data is rendered and information related thereto.

The atlas bitstream is a bitstream for one or more atlas frames constituting an atlas and related data.

The atlas frame is a 2D rectangular array of atlas samples onto which patches are projected. An atlas sample is a position of a rectangular frame onto which patches associated with the atlas are projected.

An atlas frame may be partitioned into tiles. A tile is a unit in which a 2D frame is partitioned. That is, a tile is a unit for partitioning signaling information of point cloud data called an atlas.

Patch: A set of points constituting a point cloud, which indicates that points belonging to the same patch are adjacent to each other in 3D space and are mapped in the same direction among 6-face bounding box planes in the process of mapping to a 2D image.

A patch is a unit in which a tile partitioned. The patch is signaling information on the configuration of point cloud data.

The reception device according to the embodiments may restore attribute video data, geometry video data, and occupancy video data, which are actual video data having the same presentation time, based on an atlas (tile, patch).

Geometry image: this is an image in the form of a depth map that presents position information (geometry) about each point constituting a point cloud on a patch-by-patch basis. The geometry image may be composed of pixel values of one channel. Geometry represents a set of coordinates associated with a point cloud frame.

Texture image: this is an image representing the color information about each point constituting a point cloud on a patch-by-patch basis. A texture image may be composed of pixel values of a plurality of channels (e.g., three channels of R, G, and B). The texture is included in an attribute. According to embodiments, a texture and/or attribute may be interpreted as the same object and/or having an inclusive relationship.

Auxiliary patch info: this indicates metadata needed to reconstruct a point cloud with individual patches. Auxiliary patch info may include information about the position, size, and the like of a patch in a 2D/3D space.

Point cloud data according to the embodiments, for example, V-PCC components may include an atlas, an accuancy map, geometry, and attributes.

Atlas represents a set of 2D bounding boxes. It may be patches, for example, patches projected onto a rectangular frame. Atlas may correspond to a 3D bounding box in a 3D space, and may represent a subset of a point cloud.

An attribute may represent a scalar or vector associated with each point in the point cloud. For example, the attributes may include color, reflectance, surface normal, time stamps, material ID.

The point cloud data according to the embodiments represents PCC data according to video-based point cloud compression (V-PCC) scheme. The point cloud data may include a plurality of components. For example, it may include an occupancy map, a patch, geometry and/or texture.

Figure 4:
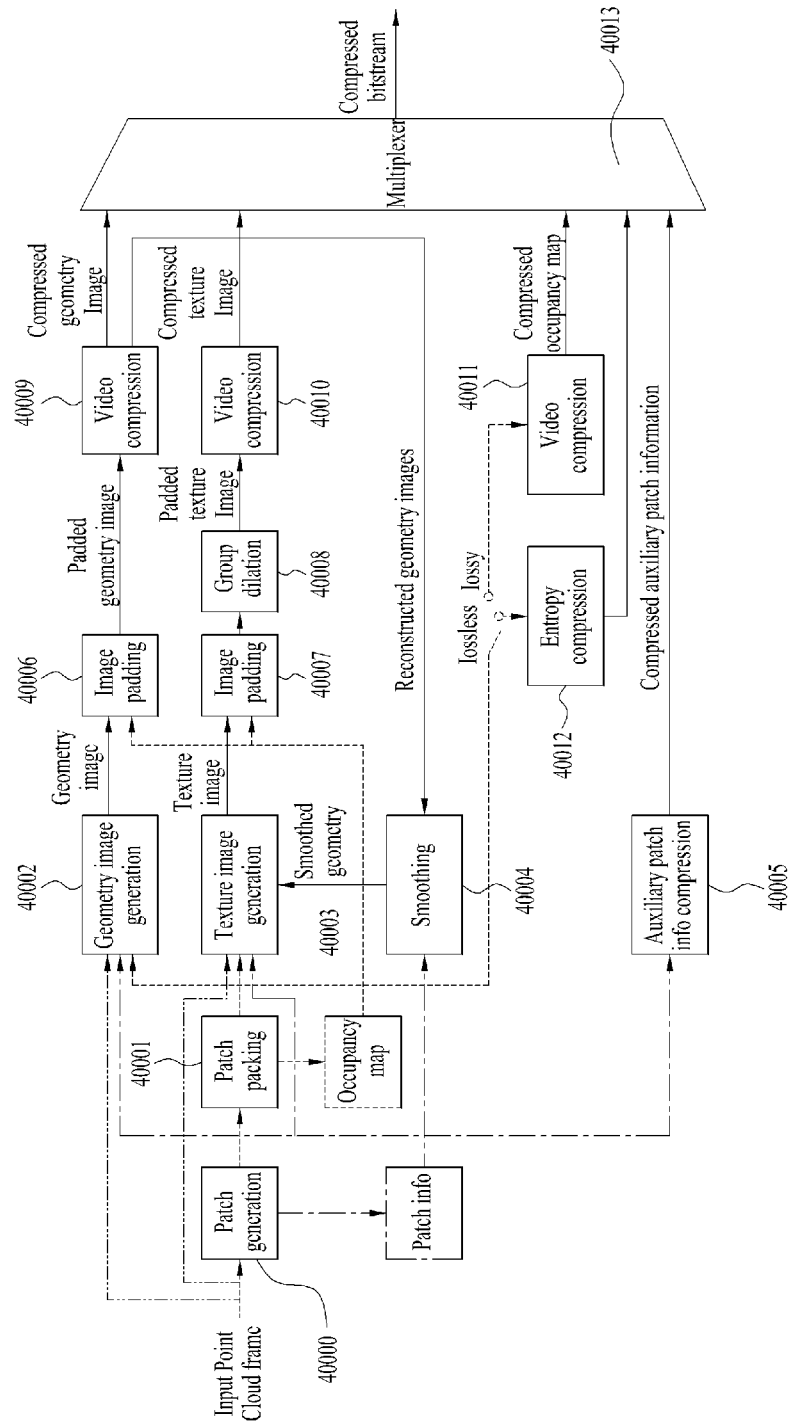
FIG. 4 illustrates an exemplary V-PCC encoding process according to embodiments.

FIG. 4 illustrates a V-PCC encoding process according to embodiments.

The figure illustrates a V-PCC encoding process for generating and compressing an occupancy map, a geometry image, a texture image, and auxiliary patch information. The V-PCC encoding process of FIG. 4 may be processed by the point cloud video encoder 10002 of FIG. 1. Each element of FIG. 4 may be performed by software, hardware, processor and/or a combination thereof.

The patch generation or patch generator 40000 receives a point cloud frame (which may be in the form of a bitstream containing point cloud data). The patch generator 40000 generates a patch from the point cloud data. In addition, patch information including information about patch generation is generated.

The patch packing or patch packer 40001 packs patches for point cloud data. For example, one or more patches may be packed. In addition, the patch packer generates an occupancy map containing information about patch packing.

The geometry image generation or geometry image generator 40002 generates a geometry image based on the point cloud data, patches, and/or packed patches. The geometry image refers to data containing geometry related to the point cloud data.

The texture image generation or texture image generator 40003 generates a texture image based on the point cloud data, patches, and/or packed patches. In addition, the texture image may be generated further based on smoothed geometry generated by smoothing processing of smoothing based on the patch information.

The smoothing or smoother 40004 may mitigate or eliminate errors contained in the image data. For example, based on the patched reconstructed geometry image, portions that may cause errors between data may be smoothly filtered out to generate smoothed geometry.

The auxiliary patch info compression or auxiliary patch info compressor 40005, auxiliary patch information related to the patch information generated in the patch generation is compressed. In addition, the compressed auxiliary patch information may be transmitted to the multiplexer. The auxiliary patch information may be used in the geometry image generation 40002.

The image padding or image padder 40006, 40007 may pad the geometry image and the texture image, respectively. The padding data may be padded to the geometry image and the texture image.

The group dilation or group dilator 40008 may add data to the texture image in a similar manner to image padding. The added data may be inserted into the texture image.

The video compression or video compressor 40009, 40010, 40011 may compress the padded geometry image, the padded texture image, and/or the occupancy map, respectively. The compression may encode geometry information, texture information, occupancy information, and the like.

The entropy compression or entropy compressor 40012 may compress (e.g., encode) the occupancy map based on an entropy scheme.

According to embodiments, the entropy compression and/or video compression may be performed, respectively depending on whether the point cloud data is lossless and/or lossy.

The multiplexer 40013 multiplexes the compressed geometry image, the compressed texture image, and the compressed occupancy map into a bitstream.

The specific operations in the respective processes of FIG. 4 are described below.

Patch Generation 40000

The patch generation process refers to a process of dividing a point cloud into patches, which are mapping units, in order to map the point cloud to the 2D image. The patch generation process may be divided into three steps: normal value calculation, segmentation, and patch segmentation.

The normal value calculation process will be described in detail with reference to FIG. 5.

Figure 5:
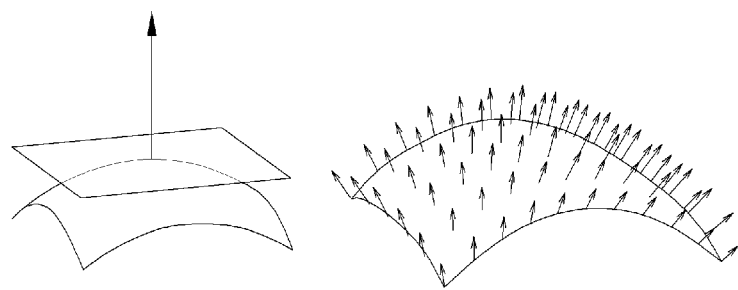
FIG. 5 illustrates an example of a tangent plane and a normal vector of a surface according to embodiments.

FIG. 5 illustrates an example of a tangent plane and a normal vector of a surface according to embodiments.

The surface of FIG. 5 is used in the patch generation process 40000 of the V-PCC encoding process of FIG. 4 as follows.

Normal Calculation Related to Patch Generation:

Each point of a point cloud has its own direction, which is represented by a 3D vector called a normal vector. Using the neighbors of each point obtained using a K-D tree or the like, a tangent plane and a normal vector of each point constituting the surface of the point cloud as shown in the figure may be obtained. The search range applied to the process of searching for neighbors may be defined by the user.

The tangent plane refers to a plane that passes through a point on the surface and completely includes a tangent line to the curve on the surface.

Figure 6:
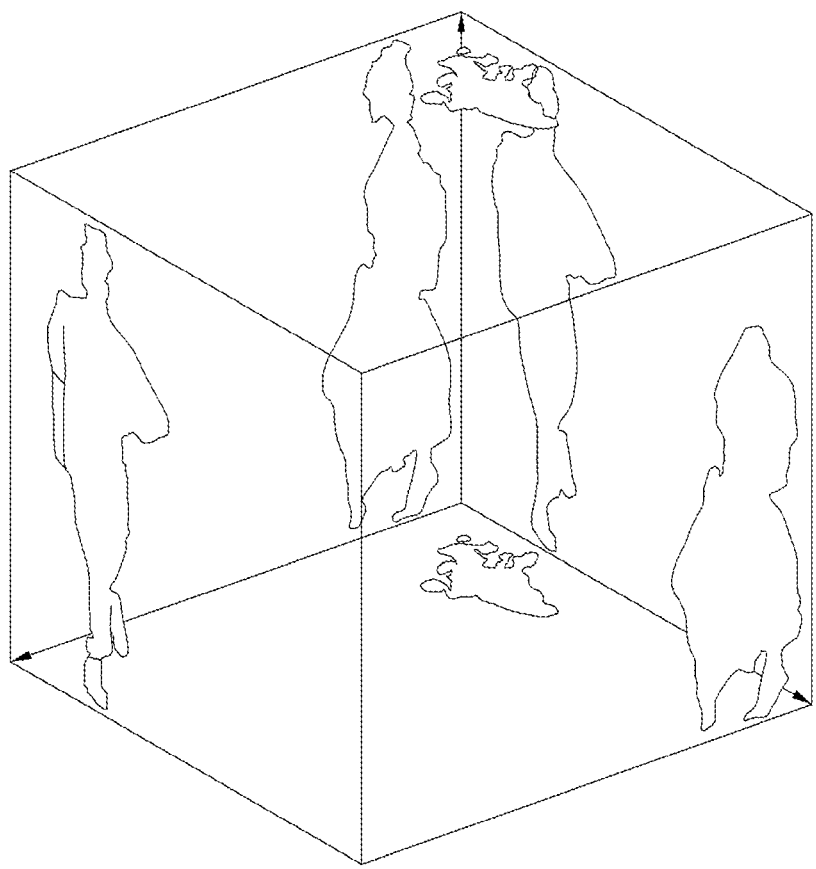
FIG. 6 illustrates an exemplary bounding box of a point cloud according to embodiments.

FIG. 6 illustrates an exemplary bounding box of a point cloud according to embodiments.

A method/device according to embodiments, for example, patch generation, may employ a bounding box in generating a patch from point cloud data.

The bounding box according to the embodiments refers to a box of a unit for dividing point cloud data based on a hexahedron in a 3D space.

The bounding box may be used in the process of projecting a target object of the point cloud data onto a plane of each planar face of a hexahedron in a 3D space. The bounding box may be generated and processed by the point cloud video acquirer 10000 and the point cloud video encoder 10002 of FIG. 1. Further, based on the bounding box, the patch generation 40000, patch packing 40001, geometry image generation 40002, and texture image generation 40003 of the V-PCC encoding process of FIG. 2 may be performed.

Segmentation Related to Patch Generation

Segmentation is divided into two processes: initial segmentation and refine segmentation.

The point cloud encoder 10002 according to the embodiments projects a point onto one face of a bounding box. Specifically, each point constituting a point cloud is projected onto one of the six faces of a bounding box surrounding the point cloud as shown in the figure. Initial segmentation is a process of determining one of the planar faces of the bounding box onto which each point is to be projected.

$\vec{n}_{p_{idx}}$, which is a normal value corresponding to each of the six planar faces, is defined as follows:

(1.0, 0.0, 0.0), (0.0, 1.0, 0.0), (0.0, 0.0, 1.0), (−1.0, 0.0, 0.0), (0.0, −1.0, 0.0), (0.0, 0.0, −1.0).

As shown in the equation below, a face that yields the maximum value of dot product of the normal vector $\vec{n}_{p_i}$ of each point, which is obtained in the normal value calculation process, and $\vec{n}_{p_{idx}}$ is determined as a projection plane of the corresponding point. That is, a plane whose normal vector is most similar to the direction of the normal vector of a point is determined as the projection plane of the point.

$$\max_{p_{idx}} \{\vec{n}_{p_i} \cdot \vec{n}_{p_{idx}}\}$$

The determined plane may be identified by one cluster index, which is one of 0 to 5.

Refine segmentation is a process of enhancing the projection plane of each point constituting the point cloud determined in the initial segmentation process in consideration of the projection planes of neighboring points. In this process, a score normal, which represents the degree of similarity between the normal vector of each point and the normal of each planar face of the bounding box which are considered in determining the projection plane in the initial segmentation process, and score smooth, which indicates the degree of similarity between the projection plane of the current point and the projection planes of neighboring points, may be considered together.

Score smooth may be considered by assigning a weight to the score normal. In this case, the weight value may be defined by the user. The refine segmentation may be performed repeatedly, and the number of repetitions may also be defined by the user.

Patch Segmentation Related to Patch Generation

Patch segmentation is a process of dividing the entire point cloud into patches, which are sets of neighboring points, based on the projection plane information about each point constituting the point cloud obtained in the initial/refine segmentation process. The patch segmentation may include the following steps:

1) Calculate neighboring points of each point constituting the point cloud, using the K-D tree or the like. The maximum number of neighbors may be defined by the user;

2) When the neighboring points are projected onto the same plane as the current point (when they have the same cluster index), extract the current point and the neighboring points as one patch;

3) Calculate geometry values of the extracted patch. The details are described below; and 4) Repeat operations 2) to 4) until there is no unextracted point.

The occupancy map, geometry image and texture image for each patch as well as the size of each patch are determined through the patch segmentation process.

Figure 7:
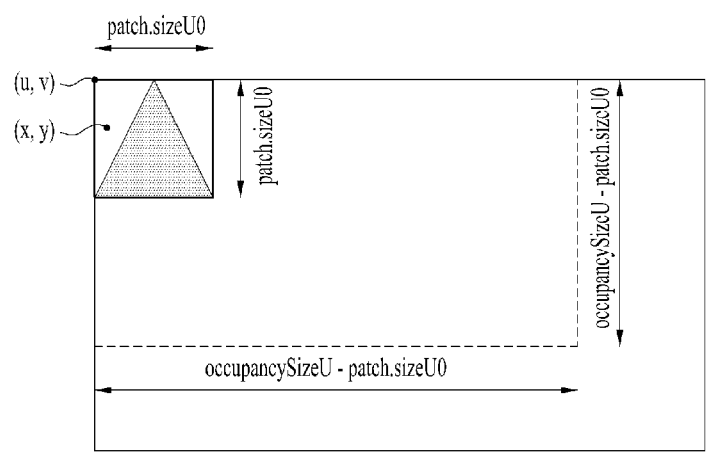
FIG. 7 illustrates an example of determination of individual patch positions on an occupancy map according to embodiments.

FIG. 7 illustrates an example of determination of individual patch positions on an occupancy map according to embodiments.

The point cloud encoder 10002 according to the embodiments may perform patch packing and generate an accuancy map.

Patch Packing & Occupancy Map Generation (40001)

This is a process of determining the positions of individual patches in a 2D image to map the segmented patches to the 2D image. The occupancy map, which is a kind of 2D image, is a binary map that indicates whether there is data at a corresponding position, using a value of 0 or 1. The occupancy map is composed of blocks and the resolution thereof may be determined by the size of the block. For example, when the block is 1*1 block, a pixel-level resolution is obtained. The occupancy packing block size may be determined by the user.

The process of determining the positions of individual patches on the occupancy map may be configured as follows:

1) Set all positions on the occupancy map to 0;

2) Place a patch at a point (u, v) having a horizontal coordinate within the range of (0, occupancySizeU-patch.sizeU0) and a vertical coordinate within the range of (0, occupancySizeV-patch.sizeV0) in the occupancy map plane;

3) Set a point (x, y) having a horizontal coordinate within the range of (0, patch.sizeU0) and a vertical coordinate within the range of (0, patch.sizeV0) in the patch plane as a current point;

4) Change the position of point (x, y) in raster order and repeat operations 3) and 4) if the value of coordinate (x, y) on the patch occupancy map is 1 (there is data at the point in the patch) and the value of coordinate (u+x, v+y) on the global occupancy map is 1 (the occupancy map is filled with the previous patch). Otherwise, proceed to operation 6);

5) Change the position of (u, v) in raster order and repeat operations 3) to 5);

6) Determine (u, v) as the position of the patch and copy the occupancy map data about the patch onto the corresponding portion on the global occupancy map; and 7) Repeat operations 2) to 7) for the next patch.

occupancySizeU: indicates the width of the occupancy map. The unit thereof is occupancy packing block size.

occupancySizeV: indicates the height of the occupancy map. The unit thereof is occupancy packing block size.

patch.sizeU0: indicates the width of the occupancy map. The unit thereof is occupancy packing block size.

patch.sizeV0: indicates the height of the occupancy map. The unit thereof is occupancy packing block size.

For example, as shown in FIG. 7, there is a box corresponding to a patch having a patch size in a box corresponding to an occupancy packing size block, and a point (x, y) may be located in the box.

Figure 8:
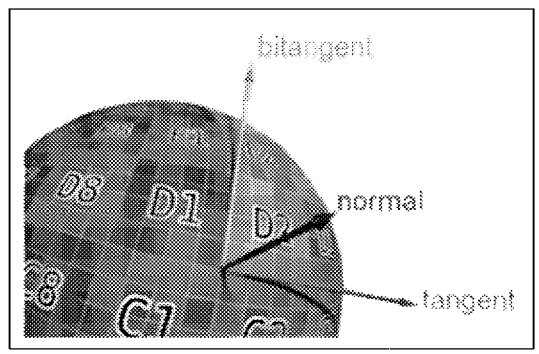
FIG. 8 shows an exemplary relationship among normal, tangent, and bitangent axes according to embodiments.

FIG. 8 shows an exemplary relationship among normal, tangent, and bitangent axes according to embodiments.

The point cloud encoder 10002 according to embodiments may generate a geometry image. The geometry image refers to image data including geometry information about a point cloud. The geometry image generation process may employ three axes (normal, tangent, and bitangent) of a patch in FIG. 8.

Geometry Image Generation (40002)

In this process, the depth values constituting the geometry images of individual patches are determined, and the entire geometry image is generated based on the positions of the patches determined in the patch packing process described above. The process of determining the depth values constituting the geometry images of individual patches may be configured as follows.

1) Calculate parameters related to the position and size of an individual patch. The parameters may include the following information.

A normal index indicating the normal axis is obtained in the previous patch generation process. The tangent axis is an axis coincident with the horizontal axis u of the patch image among the axes perpendicular to the normal axis, and the bitangent axis is an axis coincident with the vertical axis v of the patch image among the axes perpendicular to the normal axis. The three axes may be expressed as shown in the figure.

Figure 9:
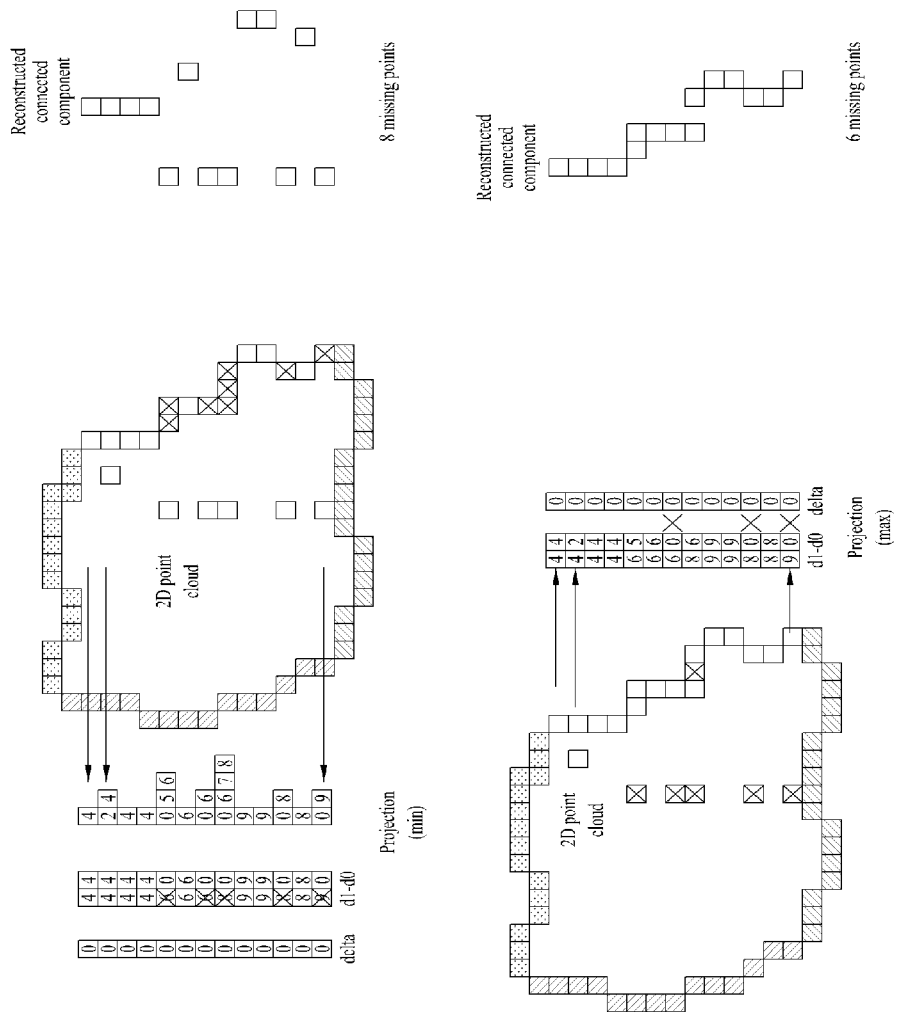
FIG. 9 shows an exemplary configuration of the minimum mode and maximum mode of a projection mode according to embodiments.

FIG. 9 shows an exemplary configuration of the minimum mode and maximum mode of a projection mode according to embodiments.

The point cloud encoder 10002 according to embodiments may perform patch-based projection to generate a geometry image, and the projection mode according to the embodiments includes a minimum mode and a maximum mode.

3D spatial coordinates of a patch may be calculated based on the bounding box of the minimum size surrounding the patch. For example, the 3D spatial coordinates may include the minimum tangent value of the patch (on the patch 3d shift tangent axis) of the patch, the minimum bitangent value of the patch (on the patch 3d shift bitangent axis), and the minimum normal value of the patch (on the patch 3d shift normal axis).

2D size of a patch indicates the horizontal and vertical sizes of the patch when the patch is packed into a 2D image. The horizontal size (patch 2d size u) may be obtained as a difference between the maximum and minimum tangent values of the bounding box, and the vertical size (patch 2d size v) may be obtained as a difference between the maximum and minimum bitangent values of the bounding box.

2) Determine a projection mode of the patch. The projection mode may be either the min mode or the max mode. The geometry information about the patch is expressed with a depth value. When each point constituting the patch is projected in the normal direction of the patch, two layers of images, an image constructed with the maximum depth value and an image constructed with the minimum depth value, may be generated.

In the min mode, in generating the two layers of images d0 and d1, the minimum depth may be configured for d0, and the maximum depth within the surface thickness from the minimum depth may be configured for d1, as shown in the figure.

For example, when a point cloud is located in 2D as illustrated in the figure, there may be a plurality of patches including a plurality of points. As shown in the figure, it is indicated that points marked with the same style of shadow may belong to the same patch. The figure illustrates the process of projecting a patch of points marked with blanks.

When projecting points marked with blanks to the left/right, the depth may be incremented by 1 as 0, 1, 2, . . . , 6, 7, 8, 9 with respect to the left side, and the number for calculating the depths of the points may be marked on the right side.

The same projection mode may be applied to all point clouds or different projection modes may be applied to respective frames or patches according to user definition. When different projection modes are applied to the respective frames or patches, a projection mode that may enhance compression efficiency or minimize missed points may be adaptively selected.

3) Calculate the depth values of the individual points.

In the min mode, image d0 is constructed with depth0 which is a value obtained by subtracting the minimum normal value of the patch (on the patch 3d shift normal axis) calculated in operation 1) from the minimum normal value of the patch (on the patch 3d shift normal axis) for the minimum normal value of each point. If there is another depth value within the range between depth0 and the surface thickness at the same position, this value is set to depth1. Otherwise, the value of depth0 is assigned to depth1. Image d1 is constructed with the value of depth1.

For example, a minimum value may be calculated in determining the depth of points of image d0 (4 2 4 4 0 6 0 0 9 9 0 8 0). In determining the depth of points of image d1, a greater value among two or more points may be calculated. When only one point is present, the value thereof may be calculated (4 4 4 4 6 6 6 8 9 9 8 8 9). In the process of encoding and reconstructing the points of the patch, some points may be lost (For example, in the figure, eight points are lost).

In the max mode, image d0 is constructed with depth0 which is a value obtained by subtracting the minimum normal value of the patch (on the patch 3d shift normal axis) calculated in operation 1) from the minimum normal value of the patch (on the patch 3d shift normal axis) for the maximum normal value of each point. If there is another depth value within the range between depth0 and the surface thickness at the same position, this value is set to depth1. Otherwise, the value of depth0 is assigned to depth1. Image d1 is constructed with the value of depth1.

For example, a maximum value may be calculated in determining the depth of points of d0 (4 4 4 4 6 6 6 8 9 9 8 8 9). In addition, in determining the depth of points of d1, a lower value among two or more points may be calculated. When only one point is present, the value thereof may be calculated (4 2 4 4 5 6 0 6 9 9 0 8 0). In the process of encoding and reconstructing the points of the patch, some points may be lost (For example, in the figure, six points are lost).

The entire geometry image may be generated by placing the geometry images of the individual patches generated through the above-described processes onto the entire geometry image based on the patch position information determined in the patch packing process.

Layer d1 of the generated entire geometry image may be encoded using various methods. A first method (absolute d1 method) is to encode the depth values of the previously generated image d1. A second method (differential method) is to encode a difference between the depth values of previously generated image d1 and the depth values of image d0.

In the encoding method using the depth values of the two layers, d0 and d1 as described above, if there is another point between the two depths, the geometry information about the point is lost in the encoding process, and therefore an enhanced-delta-depth (EDD) code may be used for lossless coding.

Hereinafter, the EDD code will be described in detail with reference to FIG. 10.

Figure 10:
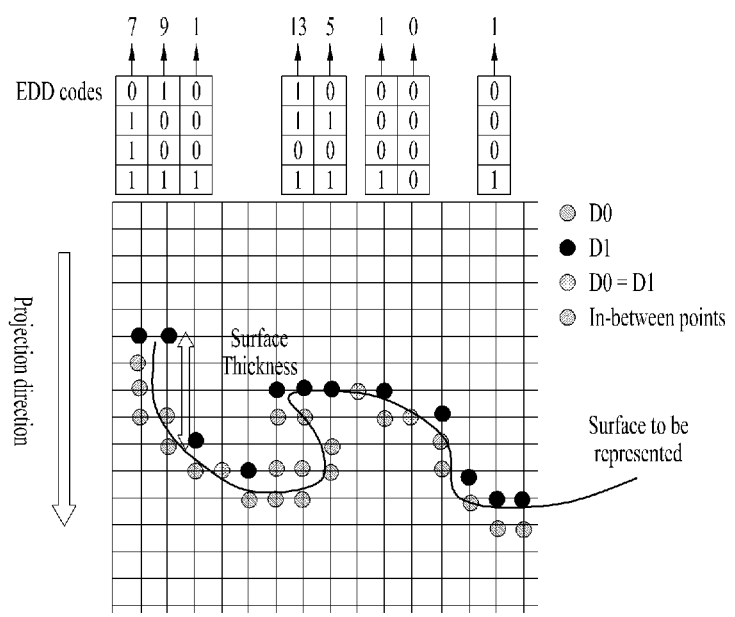
FIG. 10 illustrates an exemplary EDD code according to embodiments.

FIG. 10 illustrates an exemplary EDD code according to embodiments.

In some/all processes of the point cloud encoder 10002 and/or V-PCC encoding (e.g., video compression 40009), the geometry information about points may be encoded based on the EOD code.

As shown in the figure, the EDD code is used for binary encoding of the positions of all points within the range of surface thickness including d1. For example, in the figure, the points included in the second left column may be represented by an EDD code of 0b1001 (=9) because the points are present at the first and fourth positions over DO and the second and third positions are empty. When the EDD code is encoded together with DO and transmitted, a reception terminal may restore the geometry information about all points without loss.

For example, when there is a point present above a reference point, the value is 1. When there is no point, the value is 0. Thus, the code may be expressed based on 4 bits.

Smoothing (40004)

Smoothing is an operation for eliminating discontinuity that may occur on the patch boundary due to deterioration of the image quality occurring during the compression process. Smoothing may be performed by the point cloud encoder or smoother:

1) Reconstruct the point cloud from the geometry image. This operation may be the reverse of the geometry image generation described above. For example, the reverse process of encoding may be reconstructed;
2) Calculate neighboring points of each point constituting the reconstructed point cloud using the K-D tree or the like;
3) Determine whether each of the points is positioned on the patch boundary. For example, when there is a neighboring point having a different projection plane (cluster index) from the current point, it may be determined that the point is positioned on the patch boundary;
4) If there is a point present on the patch boundary, move the point to the center of mass of the neighboring points (positioned at the average x, y, z coordinates of the neighboring points). That is, change the geometry value. Otherwise, maintain the previous geometry value.

Figure 11:
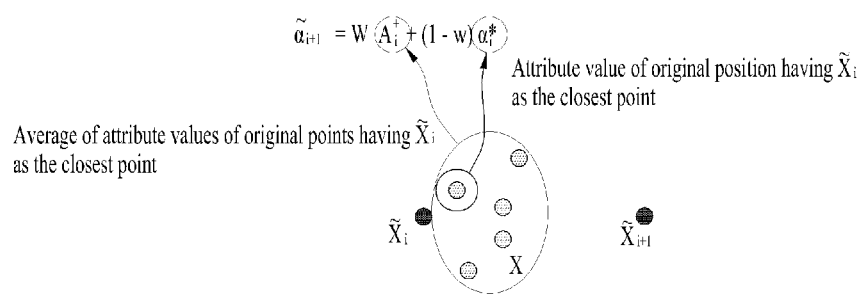
FIG. 11 illustrates an example of recoloring based on color values of neighboring points according to embodiments.

FIG. 11 illustrates an example of recoloring based on color values of neighboring points according to embodiments.

The point cloud encoder or the texture image generator 40003 according to the embodiments may generate a texture image based on recoloring.

Texture Image Generation (40003)

The texture image generation process, which is similar to the geometry image generation process described above, includes generating texture images of individual patches and generating an entire texture image by arranging the texture images at determined positions. However, in the operation of generating texture images of individual patches, an image with color values (e.g., R, G, and B values) of the points constituting a point cloud corresponding to a position is generated in place of the depth values for geometry generation.

In estimating a color value of each point constituting the point cloud, the geometry previously obtained through the smoothing process may be used. In the smoothed point cloud, the positions of some points may have been shifted from the original point cloud, and accordingly a recoloring process of finding colors suitable for the changed positions may be required. Recoloring may be performed using the color values of neighboring points. For example, as shown in the figure, a new color value may be calculated in consideration of the color value of the nearest neighboring point and the color values of the neighboring points.

For example, referring to the figure, in the recoloring, a suitable color value for a changed position may be calculated based on the average of the attribute information about the closest original points to a point and/or the average of the attribute information about the closest original positions to the point.

Texture images may also be generated in two layers of t0 and t1, like the geometry images, which are generated in two layers of d0 and d1.

Auxiliary Patch Info Compression (40005)

The point cloud encoder or the auxiliary patch info compressor according to the embodiments may compress the auxiliary patch information (auxiliary information about the point cloud).

The auxiliary patch info compressor compresses the auxiliary patch information generated in the patch generation, patch packing, and geometry generation processes described above. The auxiliary patch information may include the following parameters:

Index (cluster index) for identifying the projection plane (normal plane);

3D spatial position of a patch, i.e., the minimum tangent value of the patch (on the patch 3d shift tangent axis), the minimum bitangent value of the patch (on the patch 3d shift bitangent axis), and the minimum normal value of the patch (on the patch 3d shift normal axis);

2D spatial position and size of the patch, i.e., the horizontal size (patch 2d size u), the vertical size (patch 2d size v), the minimum horizontal value (patch 2d shift u), and the minimum vertical value (patch 2d shift u); and Mapping information about each block and patch, i.e., a candidate index (when patches are disposed in order based on the 2D spatial position and size information about the patches, multiple patches may be mapped to one block in an overlapping manner. In this case, the mapped patches constitute a candidate list, and the candidate index indicates the position in sequential order of a patch whose data is present in the block), and a local patch index (which is an index indicating one of the patches present in the frame). Table X shows a pseudo code representing the process of matching between blocks and patches based on the candidate list and the local patch indexes.

The maximum number of candidate lists may be defined by a user.

TABLE 1-1

Pseudo code for mapping a block to a patch

```
for( i = 0; i < BlockCount; i++ ) {
    if( candidatePatches[ i ].size( ) = = 1 ) {
        blockToPatch[ i ] = candidatePatches[ i ][ 0 ]
    } else {
        candidate_index
        if( candidate_index = = max_candidate_count ) {
            blockToPatch[ i ] = local_patch_index
        } else {
            blockToPatch[ i ] =
candidatePatches[ i ][ candidate_index ]
        }
    }
}
```

Figure 12:
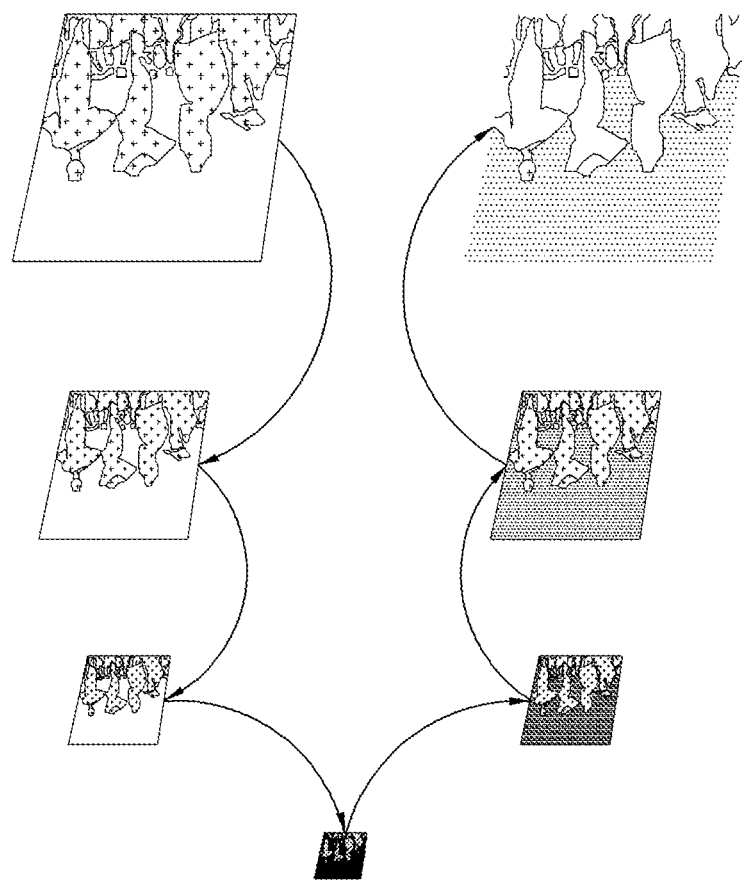
FIG. 12 illustrates an example of push-pull background filling according to embodiments.

FIG. 12 illustrates push-pull background filling according to embodiments.

Image padding and group dilation (40006, 40007, 40008)

The image padder according to the embodiments may fill the space except the patch area with meaningless supplemental data based on the push-pull background filling technique.

Image padding is a process of filling the space other than the patch region with meaningless data to improve compression efficiency. For image padding, pixel values in columns or rows close to a boundary in the patch may be copied to fill the empty space. Alternatively, as shown in the figure, a push-pull background filling method may be used. According to this method, the empty space is filled with pixel values from a low resolution image in the process of gradually reducing the resolution of a non-padded image and increasing the resolution again.

Group dilation is a process of filling the empty spaces of a geometry image and a texture image configured in two layers, d0/d1 and t0/t1, respectively. In this process, the empty spaces of the two layers calculated through image padding are filled with the average of the values for the same position.

Figure 13:
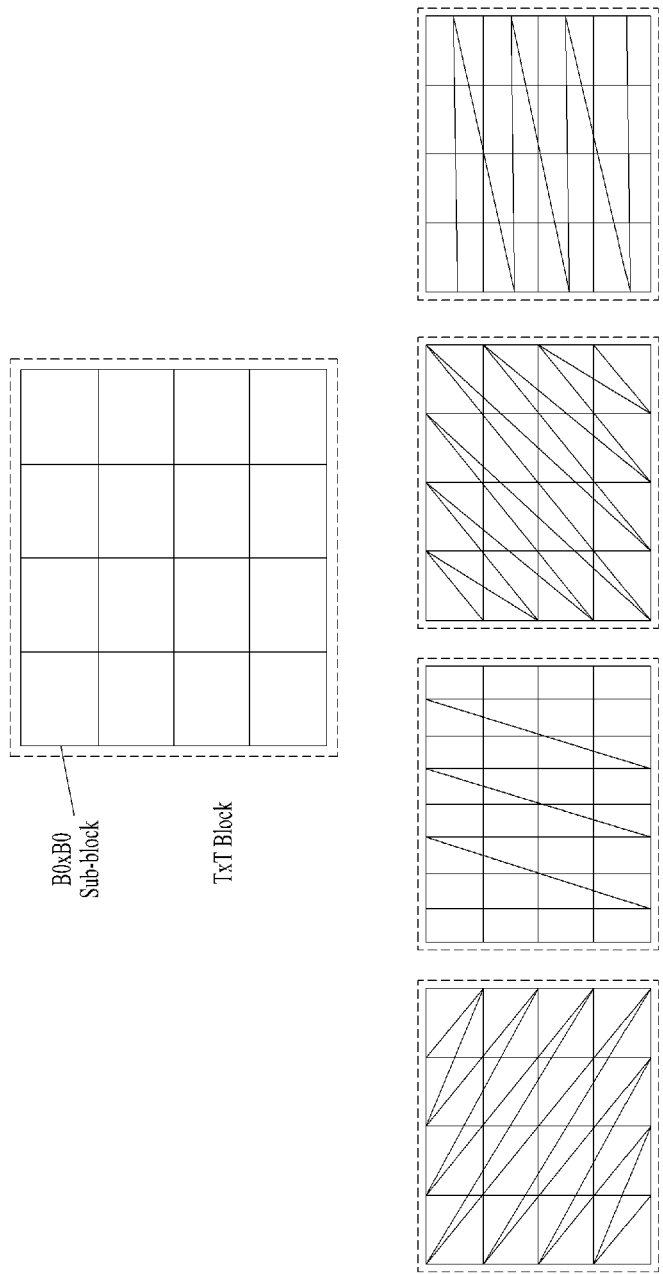
FIG. 13 shows an exemplary possible traversal order for a 4*4 block according to embodiments.

FIG. 13 shows an exemplary possible traversal order for a 4*4 block according to embodiments.

Occupancy Map Compression (40012, 40011)

The occupancy map compressor according to the embodiments may compress the previously generated occupancy map. Specifically, two methods, namely video compression for lossy compression and entropy compression for lossless compression, may be used. Video compression is described below.

The entropy compression may be performed through the following operations.

1) If a block constituting an occupancy map is fully occupied, encode 1 and repeat the same operation for the next block of the occupancy map. Otherwise, encode 0 and perform operations 2) to 5).

2) Determine the best traversal order to perform run-length coding on the occupied pixels of the block. The figure shows four possible traversal orders for a 4*4 block.

Figure 14:
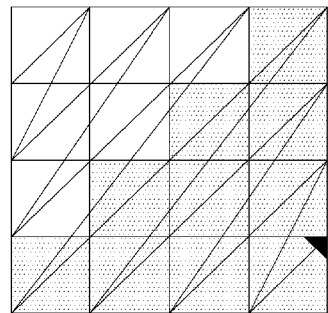
FIG. 14 illustrates an exemplary best traversal order according to embodiments.

FIG. 14 illustrates an exemplary best traversal order according to embodiments.

As described above, the entropy compressor according to the embodiments may code (encode) a block based on the traversal order scheme as described above.

For example, the best traversal order with the minimum number of runs is selected from among the possible traversal orders and the index thereof is encoded. The figure illustrates a case where the third traversal order in FIG. 13 is selected. In the illustrated case, the number of runs may be minimized to 2, and therefore the third traversal order may be selected as the best traversal order.

3) Encode the number of runs. In the example of FIG. 14, there are two runs, and therefore 2 is encoded.

4) Encode the occupancy of the first run. In the example of FIG. 14, 0 is encoded because the first run corresponds to unoccupied pixels.

5) Encode lengths of the individual runs (as many as the number of runs). In the example of FIG. 14, the lengths of the first run and the second run, 6 and 10, are sequentially encoded.

Video Compression (40009, 40010, 40011)

The video compressor according to the embodiments encodes a sequence of a geometry image, a texture image, an occupancy map image, and the like generated in the above-described operations, using a 2D video codec such as HEVC or VVC.

Figure 15:
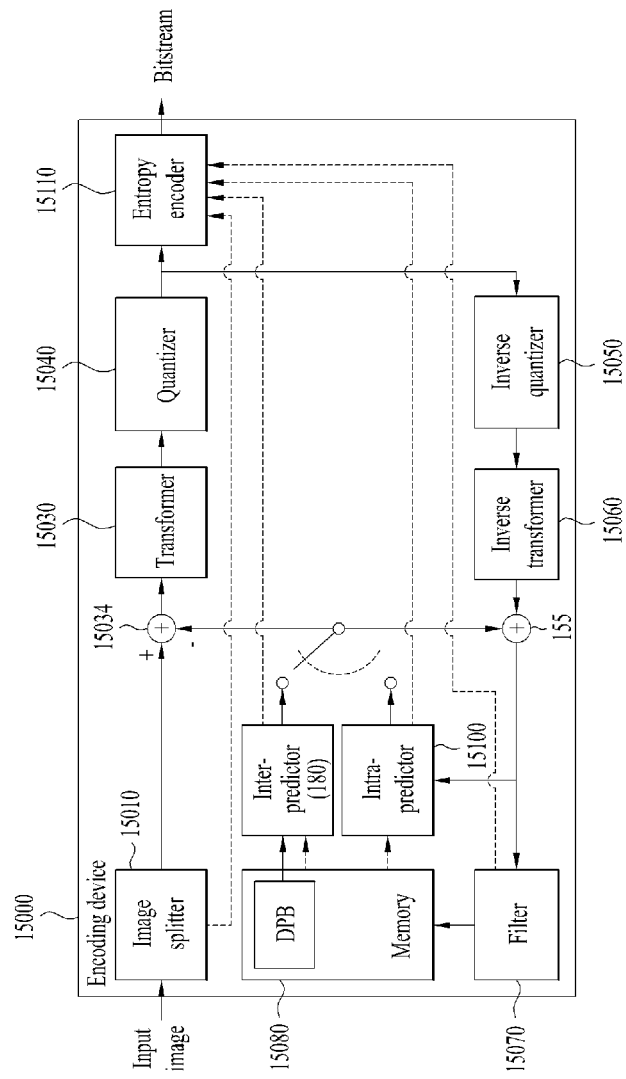
FIG. 15 illustrates an exemplary 2D video/image encoder according to embodiments.

FIG. 15 illustrates an exemplary 2D video/image encoder according to embodiments.

The figure, which represents an embodiment to which the video compression or video compressor 40009, 40010, and 40011 described above is applied, is a schematic block diagram of a 2D video/image encoder 15000 configured to encode a video/image signal. The 2D video/image encoder 15000 may be included in the point cloud video encoder described above or may be configured as an internal/external component. Each component of FIG. 15 may correspond to software, hardware, processor and/or a combination thereof.

Here, the input image may include the geometry image, the texture image (attribute(s) image), and the occupancy map image described above. The output bitstream (i.e., the point cloud video/image bitstream) of the point cloud video encoder may include output bitstreams for the respective input images (i.e., the geometry image, the texture image (attribute(s) image), the occupancy map image, etc.).

An inter-predictor 15090 and an intra-predictor 15100 may be collectively called a predictor. That is, the predictor may include the inter-predictor 15090 and the intra-predictor 15100. A transformer 15030, a quantizer 15040, an inverse quantizer 15050, and an inverse transformer 15060 may be included in the residual processor. The residual processor may further include a subtractor 15020. According to an embodiment, the image splitter 15010, the subtractor 15020, the transformer 15030, the quantizer 15040, the inverse quantizer 15050, the inverse transformer 15060, the adder 155, the filter 15070, the inter-predictor 15090, the intra-predictor 15100, and the entropy encoder 15110 described above may be configured by one hardware component (e.g., an encoder or a processor). In addition, the memory 15080 may include a decoded picture buffer (DPB) and may be configured by a digital storage medium.

The image splitter 15010 may spit an image (or a picture or a frame) input to the encoder 15000 into one or more processing units. For example, the processing unit may be called a coding unit (CU). In this case, the CU may be recursively split from a coding tree unit (CTU) or a largest coding unit (LCU) according to a quad-tree binary-tree (QTBT) structure. For example, one CU may be split into a plurality of CUs of a lower depth based on a quad-tree structure and/or a binary-tree structure. In this case, for example, the quad-tree structure may be applied first and the binary-tree structure may be applied later. Alternatively, the binary-tree structure may be applied first. The coding procedure according to the present disclosure may be performed based on a final CU that is not split anymore. In this case, the LCU may be used as the final CU based on coding efficiency according to characteristics of the image. When necessary, a CU may be recursively split into CUs of a lower depth, and a CU of the optimum size may be used as the final CU. Here, the coding procedure may include prediction, transformation, and reconstruction, which will be described later. As another example, the processing unit may further include a prediction unit (PU) or a transform unit (TU). In this case, the PU and the TU may be split or partitioned from the aforementioned final CU. The PU may be a unit of sample prediction, and the TU may be a unit for deriving a transform coefficient and/or a unit for deriving a residual signal from the transform coefficient.

The term "unit" may be used interchangeably with terms such as block or area. In a general case, an M×N block may represent a set of samples or transform coefficients configured in M columns and N rows. A sample may generally represent a pixel or a value of a pixel, and may indicate only a pixel/pixel value of a luma component, or only a pixel/pixel value of a chroma component. "Sample" may be used as a term corresponding to a pixel or a pel in one picture (or image).

The encoder 15000 may generate a residual signal (residual block or residual sample array) by subtracting a prediction signal (predicted block or predicted sample array) output from the inter-predictor 15090 or the intra-predictor 15100 from an input image signal (original block or original sample array), and the generated residual signal is transmitted to the transformer 15030. In this case, as shown in the figure, the unit that subtracts the prediction signal (predicted block or predicted sample array) from the input image signal (original block or original sample array) in the encoder 15000 may be called a subtractor 15020. The predictor may perform prediction for a processing target block (hereinafter referred to as a current block) and generate a predicted block including prediction samples for the current block. The predictor may determine whether intra-prediction or inter-prediction is applied on a current block or CU basis. As will be described later in the description of each prediction mode, the predictor may generate various kinds of information about prediction, such as prediction mode information, and deliver the generated information to the entropy encoder 15110. The information about the prediction may be encoded and output in the form of a bitstream by the entropy encoder 15110.

The intra-predictor 15100 may predict the current block with reference to the samples in the current picture. The samples may be positioned in the neighbor of or away from the current block depending on the prediction mode. In intra-prediction, the prediction modes may include a plurality of non-directional modes and a plurality of directional modes. The non-directional modes may include, for example, a DC mode and a planar mode. The directional modes may include, for example, 33 directional prediction modes or 65 directional prediction modes according to fineness of the prediction directions. However, this is merely an example, and more or fewer directional prediction modes may be used depending on the setting. The intra-predictor 15100 may determine a prediction mode to be applied to the current block, based on the prediction mode applied to the neighboring block.

The inter-predictor 15090 may derive a predicted block for the current block based on a reference block (reference sample array) specified by a motion vector on the reference picture. In this case, in order to reduce the amount of motion information transmitted in the inter-prediction mode, the motion information may be predicted on a per block, sub-block, or sample basis based on the correlation in motion information between the neighboring blocks and the current block. The motion information may include a motion vector and a reference picture index. The motion information may further include information about an inter-prediction direction (L0 prediction, L1 prediction, Bi prediction, etc.). In the case of inter-prediction, the neighboring blocks may include a spatial neighboring block, which is present in the current picture, and a temporal neighboring block, which is present in the reference picture. The reference picture including the reference block may be the same as or different from the reference picture including the temporal neighboring block. The temporal neighboring block may be referred to as a collocated reference block or a collocated CU (colCU), and the reference picture including the temporal neighboring block may be referred to as a collocated picture (colPic). For example, the inter-predictor 15090 may configure a motion information candidate list based on the neighboring blocks and generate information indicating a candidate to be used to derive a motion vector and/or a reference picture index of the current block. Inter-prediction may be performed based on various prediction modes. For example, in a skip mode and a merge mode, the inter-predictor 15090 may use motion information about a neighboring block as motion information about the current block. In the skip mode, unlike the merge mode, the residual signal may not be transmitted. In a motion vector prediction (MVP) mode, the motion vector of a neighboring block may be used as a motion vector predictor and the motion vector difference may be signaled to indicate the motion vector of the current block.

The prediction signal generated by the inter-predictor 15090 or the intra-predictor 15100 may be used to generate a reconstruction signal or to generate a residual signal.

The transformer 15030 may generate transform coefficients by applying a transformation technique to the residual signal. For example, the transformation technique may include at least one of discrete cosine transform (DCT), discrete sine transform (DST), Karhunen-Loève transform (KLT), graph-based transform (GBT), or conditionally non-linear transform (CNT). Here, the GBT refers to transformation obtained from a graph depicting the relationship between pixels. The CNT refers to transformation obtained based on a prediction signal generated based on all previously reconstructed pixels. In addition, the transformation operation may be applied to pixel blocks having the same size of a square, or may be applied to blocks of a variable size other than the square.

The quantizer 15040 may quantize the transform coefficients and transmit the same to the entropy encoder 15110. The entropy encoder 15110 may encode the quantized signal (information about the quantized transform coefficients) and output a bitstream of the encoded signal. The information about the quantized transform coefficients may be referred to as residual information. The quantizer 15040 may rearrange the quantized transform coefficients, which are in a block form, in the form of a one-dimensional vector based on a coefficient scan order, and generate information about the quantized transform coefficients based on the quantized transform coefficients in the form of the one-dimensional vector. The entropy encoder 15110 may employ various encoding techniques such as, for example, exponential Golomb, context-adaptive variable length coding (CAVLC), and context-adaptive binary arithmetic coding (CABAC). The entropy encoder 15110 may encode information necessary for video/image reconstruction (e.g., values of syntax elements) together with or separately from the quantized transform coefficients. The encoded information (e.g., encoded video/image information) may be transmitted or stored in the form of a bitstream on a network abstraction layer (NAL) unit basis. The bitstream may be transmitted over a network or may be stored in a digital storage medium. Here, the network may include a broadcast network and/or a communication network, and the digital storage medium may include various storage media such as USB, SD, CD, DVD, Blu-ray, HDD, and SSD. A transmitter (not shown) to transmit the signal output from the entropy encoder 15110 and/or a storage (not shown) to store the signal may be configured as internal/external elements of the encoder 15000. Alternatively, the transmitter may be included in the entropy encoder 15110.

The quantized transform coefficients output from the quantizer 15040 may be used to generate a prediction signal. For example, inverse quantization and inverse transform may be applied to the quantized transform coefficients through the inverse quantizer 15050 and the inverse transformer 15060 to reconstruct the residual signal (residual block or residual samples). The adder 155 may add the reconstructed residual signal to the prediction signal output from the inter-predictor 15090 or the intra-predictor 15100. Thereby, a reconstructed signal (reconstructed picture, reconstructed block, reconstructed sample array) may be generated. When there is no residual signal for a processing target block as in the case where the skip mode is applied, the predicted block may be used as the reconstructed block. The adder 155 may be called a reconstructor or a reconstructed block generator. The generated reconstructed signal may be used for intra-prediction of the next processing target block in the current picture, or may be used for inter-prediction of the next picture through filtering as described below.

The filter 15070 may improve subjective/objective image quality by applying filtering to the reconstructed signal. For example, the filter 15070 may generate a modified reconstructed picture by applying various filtering techniques to the reconstructed picture, and the modified reconstructed picture may be stored in the memory 15080, specifically, the DPB of the memory 15080. The various filtering techniques may include, for example, deblocking filtering, sample adaptive offset, adaptive loop filtering, and bilateral filtering.

As described below in the description of the filtering techniques, the filter 15070 may generate various kinds of information about filtering and deliver the generated information to the entropy encoder 15110. The information about filtering may be encoded and output in the form of a bitstream by the entropy encoder 15110.

The modified reconstructed picture transmitted to the memory 15080 may be used as a reference picture by the inter-predictor 15090. Thus, when inter-prediction is applied, the encoder may avoid prediction mismatch between the encoder 15000 and the decoder and improve encoding efficiency.

The DPB of the memory 15080 may store the modified reconstructed picture so as to be used as a reference picture by the inter-predictor 15090. The memory 15080 may store the motion information about a block from which the motion information in the current picture is derived (or encoded) and/or the motion information about the blocks in a picture that has already been reconstructed. The stored motion information may be delivered to the inter-predictor 15090 so as to be used as motion information about a spatial neighboring block or motion information about a temporal neighboring block. The memory 15080 may store the reconstructed samples of the reconstructed blocks in the current picture and deliver the reconstructed samples to the intra-predictor 15100.

At least one of the prediction, transform, and quantization procedures described above may be skipped. For example, for a block to which the pulse coding mode (PCM) is applied, the prediction, transform, and quantization procedures may be skipped, and the value of the original sample may be encoded and output in the form of a bitstream.

Figure 16:
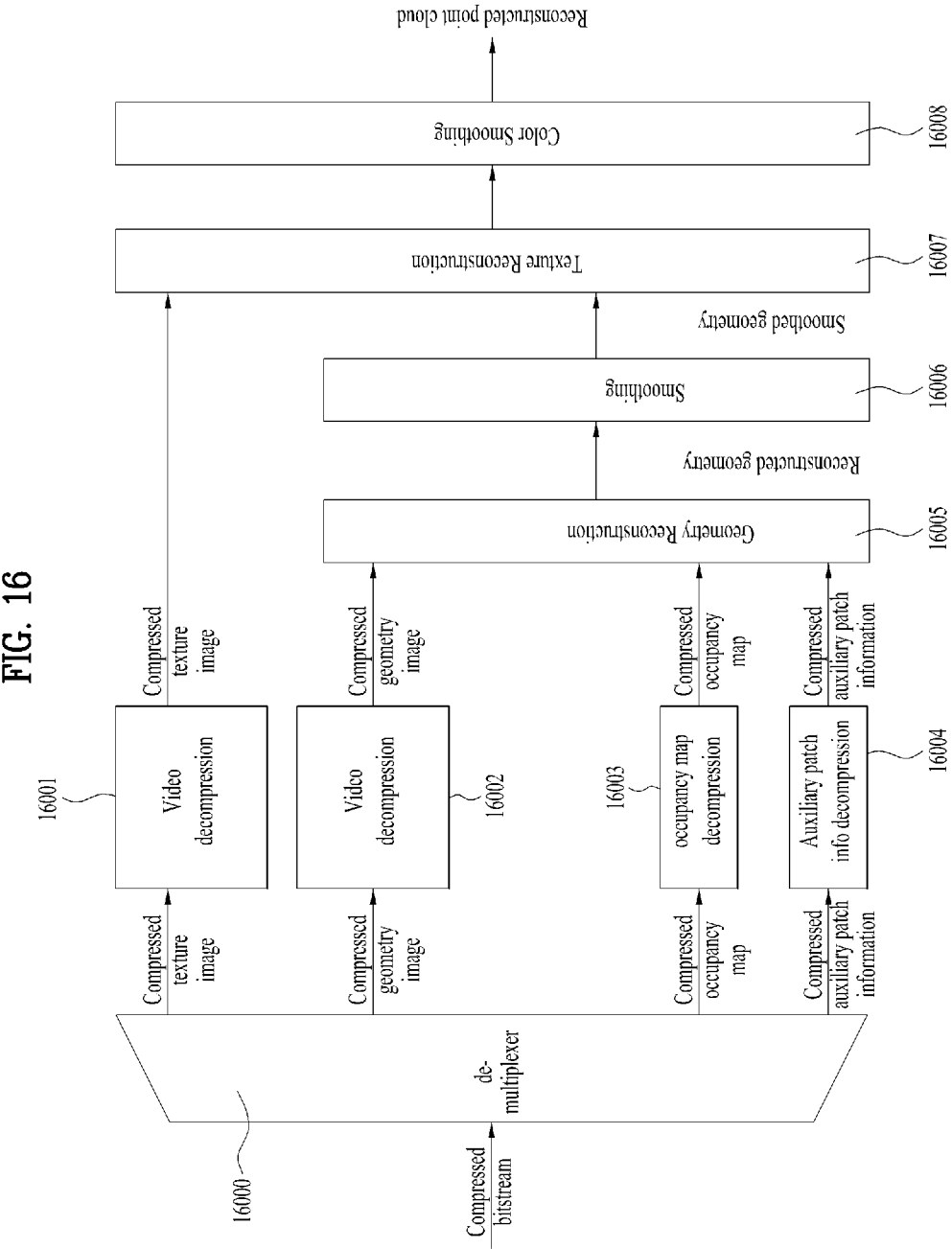
FIG. 16 illustrates an exemplary V-PCC decoding process according to embodiments.

FIG. 16 illustrates an exemplary V-PCC decoding process according to embodiments.

The V-PCC decoding process or V-PCC decoder may follow the reverse process of the V-PCC encoding process (or encoder) of FIG. 4. Each component in FIG. 16 may correspond to software, hardware, a processor, and/or a combination thereof.

The demultiplexer 16000 demultiplexes the compressed bitstream to output a compressed texture image, a compressed geometry image, a compressed occupancy map, and a compressed auxiliary patch information.

The video decompression or video decompressor 16001, 16002 decompresses (or decodes) each of the compressed texture image and the compressed geometry image.

The occupancy map decompression or occupancy map decompressor 16003 decompresses the compressed occupancy map.

The auxiliary patch info decompression or auxiliary patch info decompressor 16004 decompresses auxiliary patch information.

The geometry reconstruction or geometry reconstructor 16005 restores (reconstructs) the geometry information based on the decompressed geometry image, the decompressed occupancy map, and/or the decompressed auxiliary patch information. For example, the geometry changed in the encoding process may be reconstructed.

The smoothing or smoother 16006 may apply smoothing to the reconstructed geometry. For example, smoothing filtering may be applied.

The texture reconstruction or texture reconstructor 16007 reconstructs the texture from the decompressed texture image and/or the smoothed geometry.

The color smoothing or color smoother 16008 smooths color values from the reconstructed texture. For example, smoothing filtering may be applied.

As a result, reconstructed point cloud data may be generated.

The figure illustrates a decoding process of the V-PCC for reconstructing a point cloud by decoding the compressed occupancy map, geometry image, texture image, and auxiliary path information. Each process according to the embodiments is operated as follows.

Video Decompression (1600, 16002)

Video decompression is a reverse process of the video compression described above. In video decompression, a 2D video codec such as HEVC or VVC is used to decode a compressed bitstream containing the geometry image, texture image, and occupancy map image generated in the above-described process.

Figure 17:
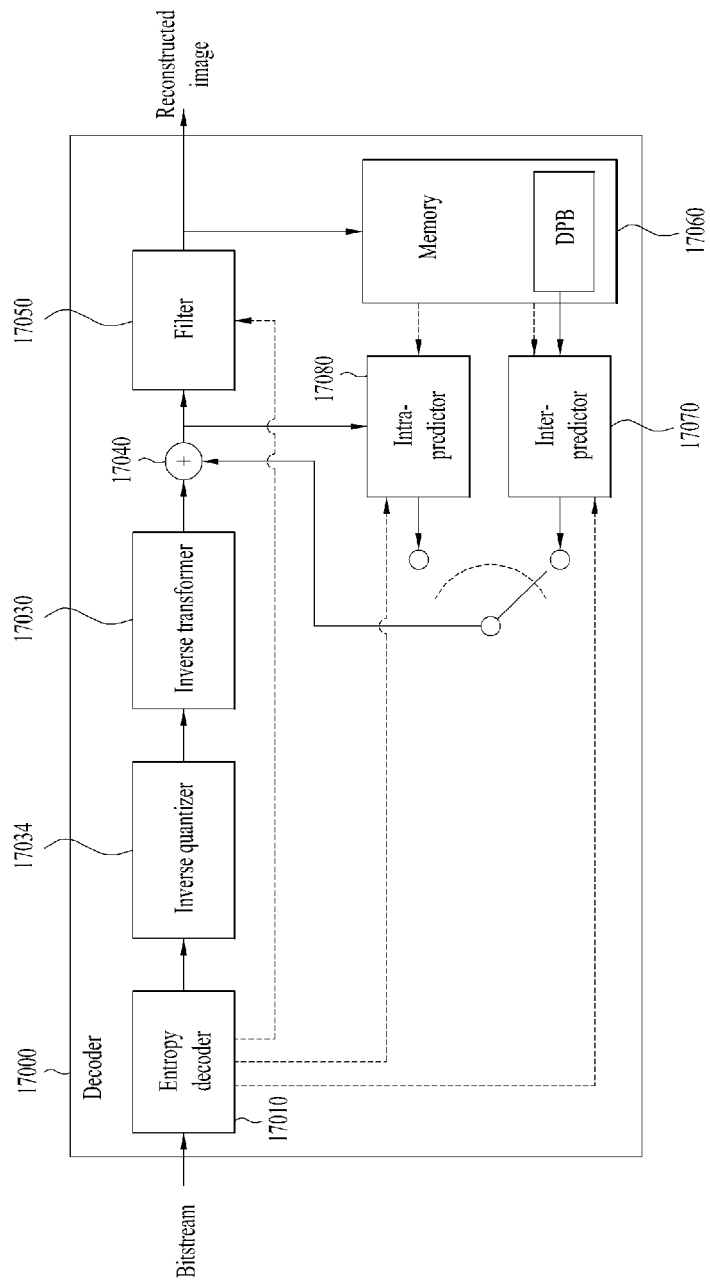
FIG. 17 shows an exemplary 2D video/image decoder according to embodiments.

FIG. 17 illustrates an exemplary 2D video/image decoder according to embodiments.

The 2D video/image decoder may follow the reverse process of the 2D video/image encoder of FIG. 15.

The 2D video/image decoder of FIG. 17 is an embodiment of the video decompression or video decompressor of FIG. 16. FIG. 17 is a schematic block diagram of a 2D video/image decoder 17000 by which decoding of a video/image signal is performed. The 2D video/image decoder 17000 may be included in the point cloud video decoder of FIG. 1, or may be configured as an internal/external component. Each component in FIG. 17 may correspond to software, hardware, a processor, and/or a combination thereof.

Here, the input bitstream may include bitstreams for the geometry image, texture image (attribute(s) image), and occupancy map image described above. The reconstructed image (or the output image or the decoded image) may represent a reconstructed image for the geometry image, texture image (attribute(s) image), and occupancy map image described above.

Referring to the figure, an inter-predictor 17070 and an intra-predictor 17080 may be collectively referred to as a predictor. That is, the predictor may include the inter-predictor 17070 and the intra-predictor 17080. An inverse quantizer 17020 and an inverse transformer 17030 may be collectively referred to as a residual processor. That is, the residual processor may include the inverse quantizer 17020 and the inverse transformer 17030. The entropy decoder 17010, the inverse quantizer 17020, the inverse transformer 17030, the adder 17040, the filter 17050, the inter-predictor 17070, and the intra-predictor 17080 described above may be configured by one hardware component (e.g., a decoder or a processor) according to an embodiment. In addition, the memory 170 may include a decoded picture buffer (DPB) or may be configured by a digital storage medium.

When a bitstream containing video/image information is input, the decoder 17000 may reconstruct an image in a process corresponding to the process in which the video/image information is processed by the encoder of FIGS. 0.2-1. For example, the decoder 17000 may perform decoding using a processing unit applied in the encoder. Thus, the processing unit of decoding may be, for example, a CU. The CU may be split from a CTU or an LCU along a quad-tree structure and/or a binary-tree structure. Then, the reconstructed video signal decoded and output through the decoder 17000 may be played through a player.

The decoder 17000 may receive a signal output from the encoder in the form of a bitstream, and the received signal may be decoded through the entropy decoder 17010. For example, the entropy decoder 17010 may parse the bitstream to derive information (e.g., video/image information) necessary for image reconstruction (or picture reconstruction). For example, the entropy decoder 17010 may decode the information in the bitstream based on a coding technique such as exponential Golomb coding, CAVLC, or CABAC, output values of syntax elements required for image reconstruction, and quantized values of transform coefficients for the residual. More specifically, in the CABAC entropy decoding, a bin corresponding to each syntax element in the bitstream may be received, and a context model may be determined based on decoding target syntax element information and decoding information about neighboring and decoding target blocks or information about a symbol/bin decoded in a previous step. Then, the probability of occurrence of a bin may be predicted according to the determined context model, and arithmetic decoding of the bin may be performed to generate a symbol corresponding to the value of each syntax element. According to the CABAC entropy decoding, after a context model is determined, the context model may be updated based on the information about the symbol/bin decoded for the context model of the next symbol/bin. Information about the prediction in the information decoded by the entropy decoder 17010 may be provided to the predictors (the inter-predictor 17070 and the intra-predictor 17080), and the residual values on which entropy decoding has been performed by the entropy decoder 17010, that is, the quantized transform coefficients and related parameter information, may be input to the inverse quantizer 17020. In addition, information about filtering of the information decoded by the entropy decoder 17010 may be provided to the filter 17050. A receiver (not shown) configured to receive a signal output from the encoder may be further configured as an internal/external element of the decoder 17000. Alternatively, the receiver may be a component of the entropy decoder 17010.

The inverse quantizer 17020 may output transform coefficients by inversely quantizing the quantized transform coefficients. The inverse quantizer 17020 may rearrange the quantized transform coefficients in the form of a two-dimensional block. In this case, the rearrangement may be performed based on the coefficient scan order implemented by the encoder. The inverse quantizer 17020 may perform inverse quantization on the quantized transform coefficients using a quantization parameter (e.g., quantization step size information), and acquire transform coefficients.

The inverse transformer 17030 acquires a residual signal (residual block and residual sample array) by inversely transforming the transform coefficients.

The predictor may perform prediction on the current block and generate a predicted block including prediction samples for the current block. The predictor may determine whether intra-prediction or inter-prediction is to be applied to the current block based on the information about the prediction output from the entropy decoder 17010, and may determine a specific intra-/inter-prediction mode.

The intra-predictor 265 may predict the current block with reference to the samples in the current picture. The samples may be positioned in the neighbor of or away from the current block depending on the prediction mode. In intra-prediction, the prediction modes may include a plurality of non-directional modes and a plurality of directional modes. The intra-predictor 17080 may determine a prediction mode to be applied to the current block, using the prediction mode applied to the neighboring block.

The inter-predictor 17070 may derive a predicted block for the current block based on a reference block (reference sample array) specified by a motion vector on the reference picture. In this case, in order to reduce the amount of motion information transmitted in the inter-prediction mode, the motion information may be predicted on a per block, sub-block, or sample basis based on the correlation in motion information between the neighboring blocks and the current block. The motion information may include a motion vector and a reference picture index. The motion information may further include information about an inter-prediction direction (L0 prediction, L1 prediction, Bi prediction, etc.). In the case of inter-prediction, the neighboring blocks may include a spatial neighboring block, which is present in the current picture, and a temporal neighboring block, which is present in the reference picture. For example, the inter-predictor 17070 may configure a motion information candidate list based on neighboring blocks and derive a motion vector of the current block and/or a reference picture index based on the received candidate selection information. Inter-prediction may be performed based on various prediction modes. The information about the prediction may include information indicating an inter-prediction mode for the current block.

The adder 17040 may add the acquired residual signal to the prediction signal (predicted block or prediction sample array) output from the inter-predictor 17070 or the intra-predictor 17080, thereby generating a reconstructed signal (a reconstructed picture, a reconstructed block, or a reconstructed sample array). When there is no residual signal for a processing target block as in the case where the skip mode is applied, the predicted block may be used as the reconstructed block.

The adder 17040 may be called a reconstructor or a reconstructed block generator. The generated reconstructed signal may be used for intra-prediction of the next processing target block in the current picture, or may be used for inter-prediction of the next picture through filtering as described below.

The filter 17050 may improve subjective/objective image quality by applying filtering to the reconstructed signal. For example, the filter 17050 may generate a modified reconstructed picture by applying various filtering techniques to the reconstructed picture, and may transmit the modified reconstructed picture to the memory 250, specifically, the DPB of the memory 17060. The various filtering techniques may include, for example, deblocking filtering, sample adaptive offset, adaptive loop filtering, and bilateral filtering.

The reconstructed picture stored in the DPB of the memory 17060 may be used as a reference picture in the inter-predictor 17070. The memory 17060 may store the motion information about a block from which the motion information is derived (or decoded) in the current picture and/or the motion information about the blocks in a picture that has already been reconstructed. The stored motion information may be delivered to the inter-predictor 17070 so as to be used as the motion information about a spatial neighboring block or the motion information about a temporal neighboring block. The memory 17060 may store the reconstructed samples of the reconstructed blocks in the current picture, and deliver the reconstructed samples to the intra-predictor 17080.

In the present disclosure, the embodiments described regarding the filter 160, the inter-predictor 180, and the intra-predictor 185 of the encoder 100 may be applied to the filter 17050, the inter-predictor 17070 and the intra-predictor 17080 of the decoder 17000, respectively, in the same or corresponding manner.

At least one of the prediction, transform, and quantization procedures described above may be skipped. For example, for a block to which the pulse coding mode (PCM) is applied, the prediction, transform, and quantization procedures may be skipped, and the value of a decoded sample may be used as a sample of the reconstructed image.

Occupancy Map Decompression (16003)

This is a reverse process of the occupancy map compression described above. Occupancy map decompression is a process for reconstructing the occupancy map by decompressing the occupancy map bitstream.

Auxiliary Patch Info Decompression (16004)

The auxiliary patch information may be reconstructed by performing the reverse process of the aforementioned auxiliary patch info compression and decoding the compressed auxiliary patch info bitstream.

Geometry Reconstruction (16005)

This is a reverse process of the geometry image generation described above. Initially, a patch is extracted from the geometry image using the reconstructed occupancy map, the 2D position/size information about the patch included in the auxiliary patch info, and the information about mapping between a block and the patch. Then, a point cloud is reconstructed in a 3D space based on the geometry image of the extracted patch and the 3D position information about the patch included in the auxiliary patch info. When the geometry value corresponding to a point (u, v) within the patch is g(u, v), and the coordinates of the position of the patch on the normal, tangent and bitangent axes of the 3D space are (δ0, s0, r0), □δ(u, v), s(u, v), and r(u, v), which are the normal, tangent, and bitangent coordinates in the 3D space of a position mapped to point (u, v) may be expressed as follows:

δ(u, v)=δ0+g(u, v);
s(u, v)=s0+u;
r(u, v)=r0+v.

Smoothing (16006)

Smoothing, which is the same as the smoothing in the encoding process described above, is a process for eliminating discontinuity that may occur on the patch boundary due to deterioration of the image quality occurring during the compression process.

Texture Reconstruction (16007)

Texture reconstruction is a process of reconstructing a color point cloud by assigning color values to each point constituting a smoothed point cloud. It may be performed by assigning color values corresponding to a texture image pixel at the same position as in the geometry image in the 2D space to points of a point of a point cloud corresponding to the same position in the 3D space, based on the mapping information about the geometry image and the point cloud in the geometry reconstruction process described above.

Color Smoothing (16008)

Color smoothing is similar to the process of geometry smoothing described above. Color smoothing is a process for eliminating discontinuity that may occur on the patch boundary due to deterioration of the image quality occurring during the compression process. Color smoothing may be performed through the following operations:

1) Calculate neighboring points of each point constituting the reconstructed point cloud using the K-D tree or the like. The neighboring point information calculated in the geometry smoothing process described in section 2.5 may be used.

2) Determine whether each of the points is positioned on the patch boundary. These operations may be performed based on the boundary information calculated in the geometry smoothing process described above.

3) Check the distribution of color values for the neighboring points of the points present on the boundary and determine whether smoothing is to be performed. For example, when the entropy of luminance values is less than or equal to a threshold local entry (there are many similar luminance values), it may be determined that the corresponding portion is not an edge portion, and smoothing may be performed. As a method of smoothing, the color value of the point may be replaced with the average of the color values of the neighboring points.

Figure 18:
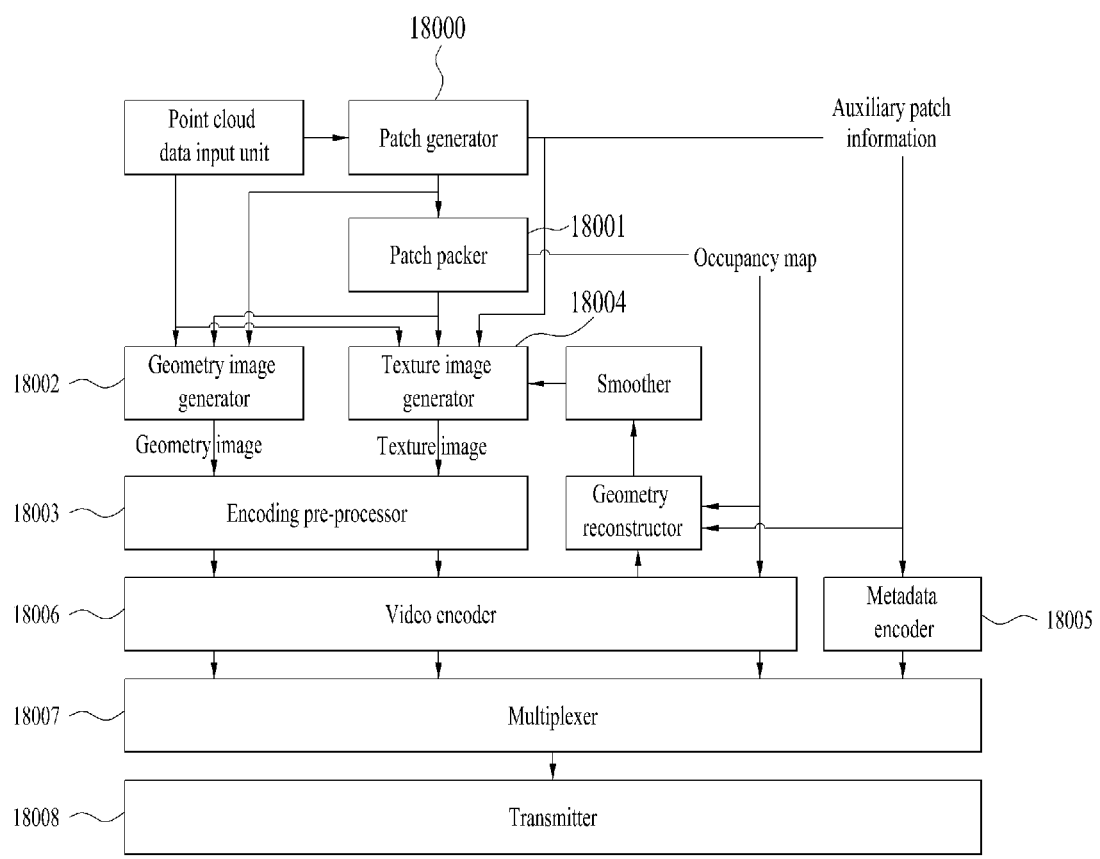
FIG. 18 is a flowchart illustrating operation of a transmission device according to embodiments of the present disclosure.

FIG. 18 is a flowchart illustrating operation of a transmission device according to embodiments of the present disclosure.

The transmission device according to the embodiments may correspond to the transmission device of FIG. 1, the encoding process of FIG. 4, and the 2D video/image encoder of FIG. 15, or perform some/all of the operations thereof. Each component of the transmission device may correspond to software, hardware, a processor and/or a combination thereof.

An operation process of the transmission terminal for compression and transmission of point cloud data using V-PCC may be performed as illustrated in the figure.

The point cloud data transmission device according to the embodiments may be referred to as a transmission device.

Regarding a patch generator 18000, a patch for 2D image mapping of a point cloud is generated. Auxiliary patch information is generated as a result of the patch generation. The generated information may be used in the processes of geometry image generation, texture image generation, and geometry reconstruction for smoothing.

Regarding a patch packer 18001, a patch packing process of mapping the generated patches into the 2D image is performed. As a result of patch packing, an occupancy map may be generated. The occupancy map may be used in the processes of geometry image generation, texture image generation, and geometry reconstruction for smoothing.

A geometry image generator 18002 generates a geometry image based on the auxiliary patch information and the occupancy map. The generated geometry image is encoded into one bitstream through video encoding.

An encoding preprocessor 18003 may include an image padding procedure. The geometry image regenerated by decoding the generated geometry image or the encoded geometry bitstream may be used for 3D geometry reconstruction and then be subjected to a smoothing process.

A texture image generator 18004 may generate a texture image based on the (smoothed) 3D geometry, the point cloud, the auxiliary patch information, and the occupancy map. The generated texture image may be encoded into one video bitstream.

A metadata encoder 18005 may encode the auxiliary patch information into one metadata bitstream.

A video encoder 18006 may encode the occupancy map into one video bitstream.

A multiplexer 18007 may multiplex the video bitstreams of the generated geometry image, texture image, and occupancy map and the metadata bitstream of the auxiliary patch information into one bitstream.

A transmitter 18008 may transmit the bitstream to the reception terminal. Alternatively, the video bitstreams of the generated geometry image, texture image, and the occupancy map and the metadata bitstream of the auxiliary patch information may be processed into a file of one or more track data or encapsulated into segments and may be transmitted to the reception terminal through the transmitter.

Figure 19:
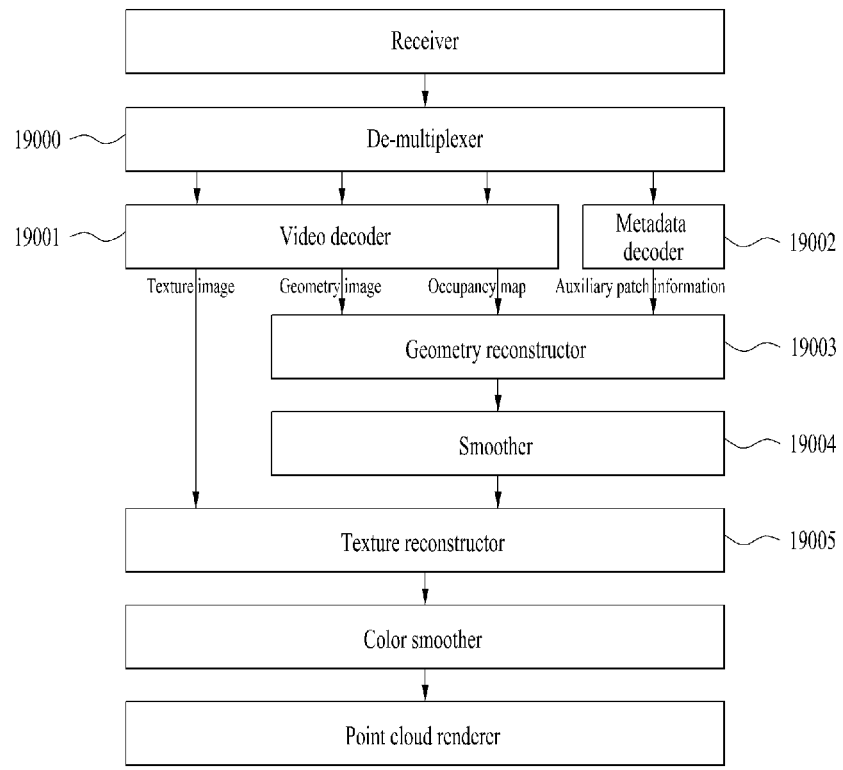
FIG. 19 is a flowchart illustrating operation of a reception device according to embodiments.

FIG. 19 is a flowchart illustrating operation of a reception device according to embodiments.

The reception device according to the embodiments may correspond to the reception device of FIG. 1, the decoding process of FIG. 16, and the 2D video/image encoder of FIG. 17, or perform some/all of the operations thereof. Each component of the reception device may correspond to software, hardware, a processor and/or a combination thereof.

The operation of the reception terminal for receiving and reconstructing point cloud data using V-PCC may be performed as illustrated in the figure. The operation of the V-PCC reception terminal may follow the reverse process of the operation of the V-PCC transmission terminal of FIG. 18.

The point cloud data reception device according to the embodiments may be referred to as a reception device.

The bitstream of the received point cloud is demultiplexed into the video bitstreams of the compressed geometry image, texture image, occupancy map and the metadata bitstream of the auxiliary patch information by a demultiplexer 19000 after file/segment decapsulation. A video decoder 19001 and a metadata decoder 19002 decode the demultiplexed video bitstreams and metadata bitstream. 3D geometry is reconstructed by a geometry reconstructor 19003 based on the decoded geometry image, occupancy map, and auxiliary patch information, and is then subjected to a smoothing process performed by a smoother 19004. A color point cloud image/picture may be reconstructed by a texture reconstructor 19005 by assigning color values to the smoothed 3D geometry based on the texture image. Thereafter, a color smoothing process may be additionally performed to improve the objective/subjective visual quality, and a modified point cloud image/picture derived through the color smoothing process is shown to the user through the rendering process (through, for example, the point cloud renderer). In some cases, the color smoothing process may be skipped.

Figure 20:
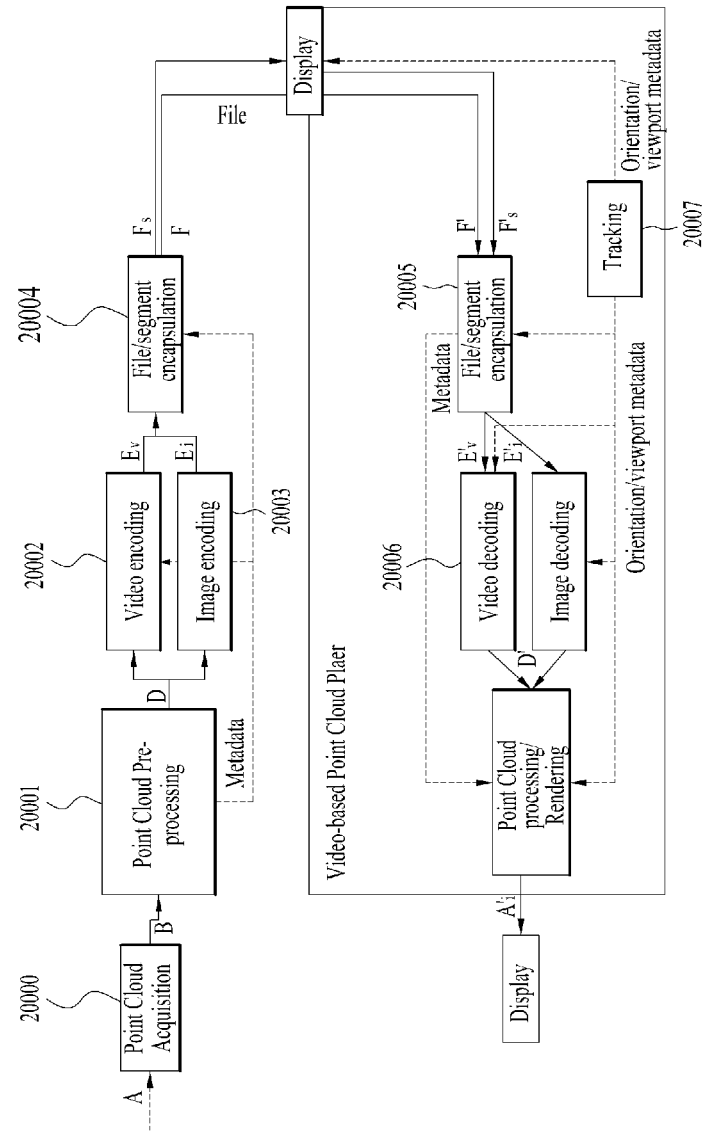
FIG. 20 illustrates an exemplary architecture for V-PCC based storage and streaming of point cloud data according to embodiments.

FIG. 20 illustrates an exemplary architecture for V-PCC based storage and streaming of point cloud data according to embodiments.

A part/the entirety of the system of FIG. 20 may include some or all of the transmission device and reception device of FIG. 1, the encoding process of FIG. 4, the 2D video/image encoder of FIG. 15, the decoding process of FIG. 16, the transmission device of FIG. 18, and/or the reception device of FIG. 19. Each component in the figure may correspond to software, hardware, a processor and/or a combination thereof.

Figure 21:
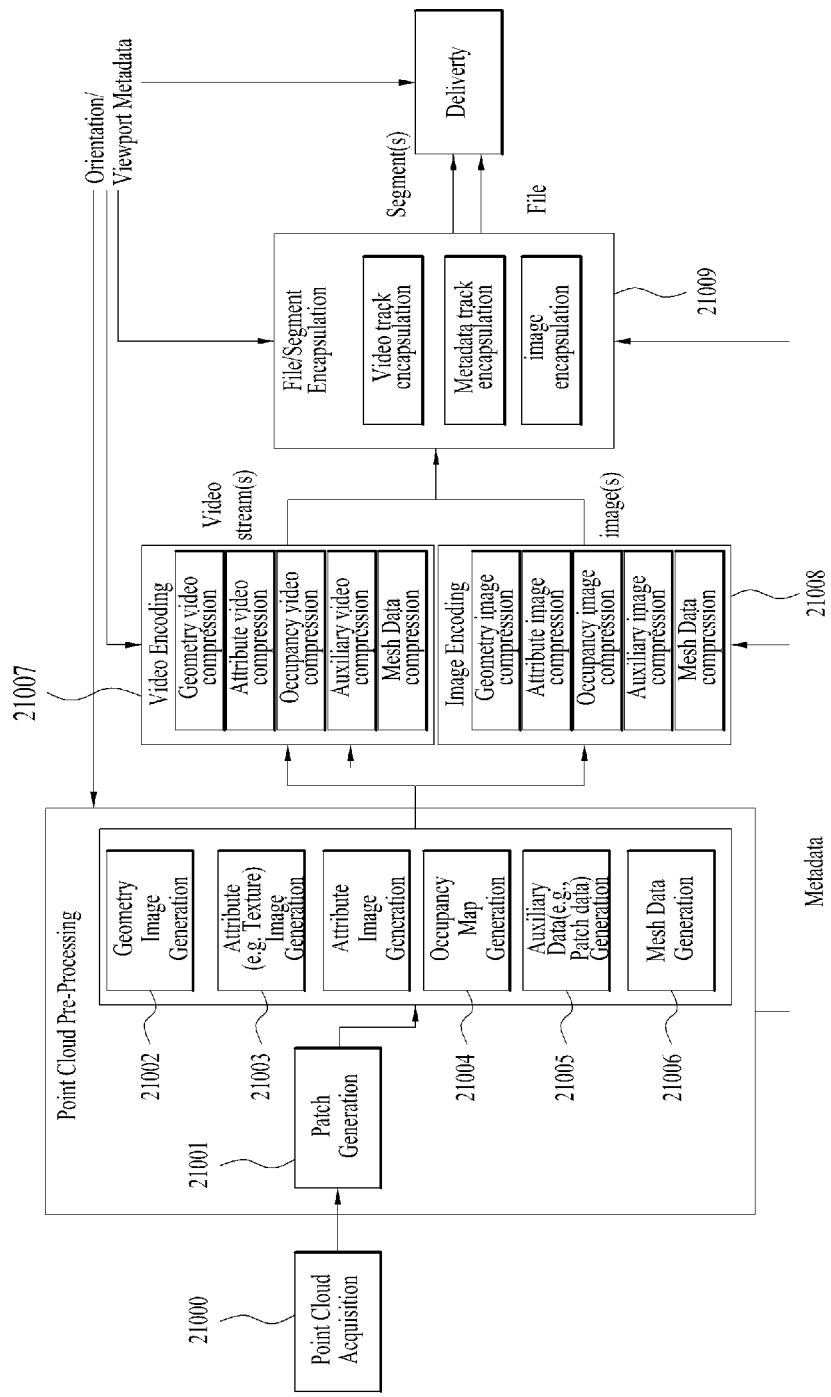
FIG. 21 is an exemplary block diagram of a device for storing and transmitting point cloud data according to embodiments.
Figure 22:
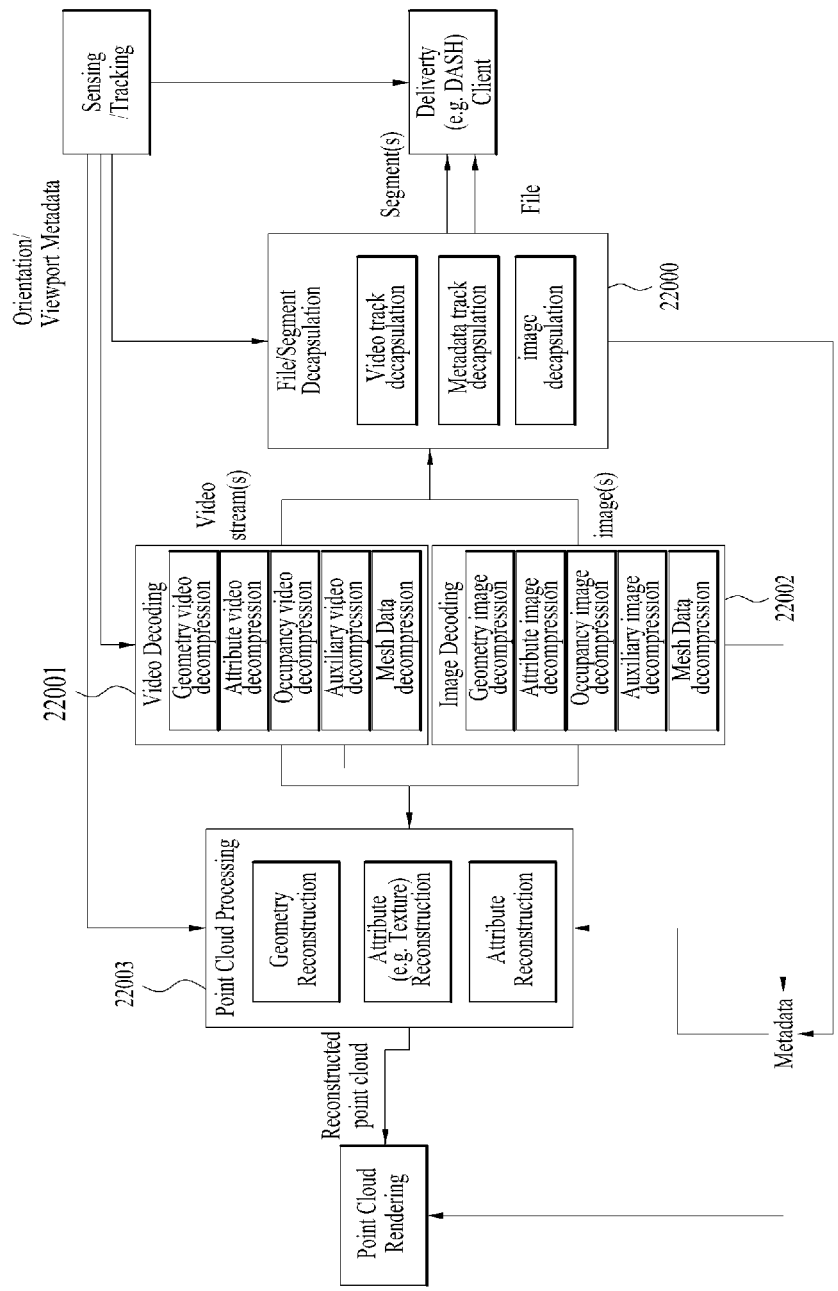
FIG. 22 is an exemplary block diagram of a point cloud data reception device according to embodiments.

FIGS. 20 to 22 are diagrams illustrating a structure in which a system is additionally connected to the transmission device and the reception device according to embodiments. The transmission device and the reception device the system according to embodiments may be referred to as a transmission/reception apparatus according to the embodiments.

In the apparatus according to the embodiments illustrated in FIGS. 20 to 22, the transmitting device corresponding to FIG. 18 or the like may generate a container suitable for a data format for transmission of a bitstream containing encoded point cloud data.

The V-PCC system according to the embodiments may create a container including point cloud data, and may further add additional data necessary for efficient transmission/reception to the container.

The reception device according to the embodiments may receive and parse the container based on the system shown in FIGS. 20 to 22. The reception device corresponding to FIG. 19 or the like may decode and restore point cloud data from the parsed bitstream.

The figure shows the overall architecture for storing or streaming point cloud data compressed based on video-based point cloud compression (V-PCC). The process of storing and streaming the point cloud data may include an acquisition process, an encoding process, a transmission process, a decoding process, a rendering process, and/or a feedback process.

The embodiments propose a method of effectively providing point cloud media/content/data.

In order to effectively provide point cloud media/content/data, a point cloud acquirer 20000 may acquire a point cloud video. For example, one or more cameras may acquire point cloud data through capture, composition or generation of a point cloud. Through this acquisition process, a point cloud video including a 3D position (which may be represented by x, y, and z position values, etc.) (hereinafter referred to as geometry) of each point and attributes (color, reflectance, transparency, etc.) of each point may be acquired. For example, a Polygon File format (PLY) (or Stanford Triangle format) file or the like containing the point cloud video may be generated. For point cloud data having multiple frames, one or more files may be acquired. In this process, point cloud related metadata (e.g., metadata related to capture, etc.) may be generated.

Post-processing for improving the quality of the content may be needed for the captured point cloud video. In the video capture process, the maximum/minimum depth may be adjusted within the range provided by the camera equipment. Even after the adjustment, point data of an unwanted area may still be present. Accordingly, post-processing of removing the unwanted area (e.g., the background) or recognizing a connected space and filling the spatial holes may be performed. In addition, point clouds extracted from the cameras sharing a spatial coordinate system may be integrated into one piece of content through the process of transforming each point into a global coordinate system based on the coordinates of the location of each camera acquired through a calibration process. Thereby, a point cloud video with a high density of points may be acquired.

A point cloud pre-processor 20001 may generate one or more pictures/frames of the point cloud video. Here, a picture/frame may generally represent a unit representing one image in a specific time interval. When points constituting the point cloud video is divided into one or more patches (sets of points that constitute the point cloud video, wherein the points belonging to the same patch are adjacent to each other in the 3D space and are mapped in the same direction among the planar faces of a 6-face bounding box when mapped to a 2D image) and mapped to a 2D plane, an occupancy map picture/frame of a binary map, which indicates presence or absence of data at the corresponding position in the 2D plane with a value of 0 or 1 may be generated. In addition, a geometry picture/frame, which is in the form of a depth map that represents the information about the position (geometry) of each point constituting the point cloud video on a patch-by-patch basis, may be generated. A texture picture/frame, which represents the color information about each point constituting the point cloud video on a patch-by-patch basis, may be generated. In this process, metadata needed to reconstruct the point cloud from the individual patches may be generated. The metadata may include information about the patches, such as the position and size of each patch in the 2D/3D space. These pictures/frames may be generated continuously in temporal order to construct a video stream or metadata stream.

A point cloud video encoder 20002 may encode one or more video streams related to a point cloud video. One video may include multiple frames, and one frame may correspond to a still image/picture. In the present disclosure, the point cloud video may include a point cloud image/frame/picture, and the term "point cloud video" may be used interchangeably with the point cloud video/frame/picture. The point cloud video encoder may perform a video-based point cloud compression (V-PCC) procedure. The point cloud video encoder may perform a series of procedures such as prediction, transform, quantization, and entropy coding for compression and coding efficiency. The encoded data (encoded video/image information) may be output in the form of a bitstream. Based on the V-PCC procedure, the point cloud video encoder may encode point cloud video by dividing the same into a geometry video, an attribute video, an occupancy map video, and metadata, for example, information about patches, as described below. The geometry video may include a geometry image, the attribute video may include an attribute image, and the occupancy map video may include an occupancy map image. The patch data, which is auxiliary information, may include patch related information. The attribute video/image may include a texture video/image.

A point cloud image encoder 20003 may encode one or more images related to a point cloud video. The point cloud image encoder may perform a video-based point cloud compression (V-PCC) procedure. The point cloud image encoder may perform a series of procedures such as prediction, transform, quantization, and entropy coding for compression and coding efficiency. The encoded image may be output in the form of a bitstream. Based on the V-PCC procedure, the point cloud image encoder may encode the point cloud image by dividing the same into a geometry image, an attribute image, an occupancy map image, and metadata, for example, information about patches, as described below.

The point cloud video encoder and/or the point cloud image encoder according to the embodiments may generate a PCC bitstream (G-PCC and/or V-PCC bitstream) according to the embodiments.

According to embodiments, the video encoder 2002, the image encoder 20002, the video decoding 20006, and the image decoding may be performed by one encoder/decoder as described above, and may be performed along separate paths as shown in the figure.

In file/segment encapsulation 20004, the encoded point cloud data and/or point cloud-related metadata may be encapsulated into a file or a segment for streaming. Here, the point cloud-related metadata may be received from the metadata processor or the like. The metadata processor may be included in the point cloud video/image encoder or may be configured as a separate component/module. The encapsulation processor may encapsulate the corresponding video/image/metadata in a file format such as ISOBMFF or in the form of a DASH segment or the like. According to an embodiment, the encapsulation processor may include the point cloud metadata in the file format. The point cloud-related metadata may be included, for example, in boxes at various levels on the ISOBMFF file format or as data in a separate track within the file. According to an embodiment, the encapsulation processor may encapsulate the point cloud-related metadata into a file.

The encapsulation or encapsulator according to the embodiments may divide the G-PCC/V-PCC bitstream into one or multiple tracks and store the same in a file, and may also encapsulate signaling information for this operation. In addition, the atlas stream included on the G-PCC/V-PCC bitstream may be stored as a track in the file, and related signaling information may be stored. Furthermore, an SEI message present in the G-PCC/V-PCC bitstream may be stored in a track in the file and related signaling information may be stored.

A transmission processor may perform processing of the encapsulated point cloud data for transmission according to the file format. The transmission processor may be included in the transmitter or may be configured as a separate component/module. The transmission processor may process the point cloud data according to a transmission protocol. The processing for transmission may include processing for delivery over a broadcast network and processing for delivery through a broadband. According to an embodiment, the transmission processor may receive point cloud-related metadata from the metadata processor as well as the point cloud data, and perform processing of the point cloud video data for transmission.

The transmitter may transmit a point cloud bitstream or a file/segment including the bitstream to the receiver of the reception device over a digital storage medium or a network. For transmission, processing according to any transmission protocol may be performed. The data processed for transmission may be delivered over a broadcast network and/or through a broadband. The data may be delivered to the reception side in an on-demand manner. The digital storage medium may include various storage media such as USB, SD, CD, DVD, Blu-ray, HDD, and SSD. The transmitter may include an element for generating a media file in a predetermined file format, and may include an element for transmission over a broadcast/communication network. The receiver may extract the bitstream and transmit the extracted bitstream to the decoder.

The receiver may receive point cloud data transmitted by the point cloud data transmission device according to the present disclosure. Depending on the transmission channel, the receiver may receive the point cloud data over a broadcast network or through a broadband. Alternatively, the point cloud data may be received through the digital storage medium. The receiver may include a process of decoding the received data and rendering the data according to the viewport of the user.

The reception processor may perform processing on the received point cloud video data according to the transmission protocol. The reception processor may be included in the receiver or may be configured as a separate component/module. The reception processor may reversely perform the process of the transmission processor above described so as to correspond to the processing for transmission performed at the transmission side. The reception processor may deliver the acquired point cloud video to a decapsulation processor, and the acquired point cloud-related metadata to a metadata parser.

A decapsulation processor (file/segment decapsulation) 20005 may decapsulate the point cloud data received in the form of a file from the reception processor. The decapsulation processor may decapsulate files according to ISOBMFF or the like, and may acquire a point cloud bitstream or point cloud-related metadata (or a separate metadata bitstream). The acquired point cloud bitstream may be delivered to the point cloud decoder, and the acquired point cloud video-related metadata (metadata bitstream) may be delivered to the metadata processor. The point cloud bitstream may include the metadata (metadata bitstream). The metadata processor may be included in the point cloud decoder or may be configured as a separate component/module. The point cloud video-related metadata acquired by the decapsulation processor may take the form of a box or track in the file format. The decapsulation processor may receive metadata necessary for decapsulation from the metadata processor, when necessary. The point cloud-related metadata may be delivered to the point cloud decoder and used in a point cloud decoding procedure, or may be transferred to the renderer and used in a point cloud rendering procedure.

The point cloud video decoder 20006 may receive the bitstream and decode the video/image by performing an operation corresponding to the operation of the point cloud video encoder. In this case, the point cloud video decoder may decode the point cloud video by dividing the same into a geometry video, an attribute video, an occupancy map video, and auxiliary patch information as described below. The geometry video may include a geometry image, the attribute video may include an attribute image, and the occupancy map video may include an occupancy map image. The auxiliary information may include auxiliary patch information. The attribute video/image may include a texture video/image.

The 3D geometry may be reconstructed based on the decoded geometry image, the occupancy map, and auxiliary patch information, and then may be subjected to a smoothing process. The color point cloud image/picture may be reconstructed by assigning a color value to the smoothed 3D geometry based on the texture image. The renderer may render the reconstructed geometry and the color point cloud image/picture. The rendered video/image may be displayed through the display. All or part of the rendered result may be shown to the user through a VR/AR display or a typical display.

A sensor/tracker (sensing/tracking) 20007 acquires orientation information and/or user viewport information from the user or the reception side and delivers the orientation information and/or the user viewport information to the receiver and/or the transmitter. The orientation information may represent information about the position, angle, movement, etc. of the user's head, or represent information about the position, angle, movement, etc. of a device through which the user is viewing a video/image. Based on this information, information about the area currently viewed by the user in a 3D space, that is, viewport information may be calculated.

The viewport information may be information about an area in a 3D space currently viewed by the user through a device or an HMD. A device such as a display may extract a viewport area based on the orientation information, a vertical or horizontal FOV supported by the device, and the like. The orientation or viewport information may be extracted or calculated at the reception side. The orientation or viewport information analyzed at the reception side may be transmitted to the transmission side on a feedback channel.

Based on the orientation information acquired by the sensor/tracker and/or the viewport information indicating the area currently viewed by the user, the receiver may efficiently extract or decode only media data of a specific area, i.e., the area indicated by the orientation information and/or the viewport information from the file. In addition, based on the orientation information and/or viewport information acquired by the sensor/tracker, the transmitter may efficiently encode only the media data of the specific area, that is, the area indicated by the orientation information and/or the viewport information, or generate and transmit a file therefor.

The renderer may render the decoded point cloud data in a 3D space. The rendered video/image may be displayed through the display. The user may view all or part of the rendered result through a VR/AR display or a typical display.

The feedback process may include transferring various feedback information that may be acquired in the rendering/ displaying process to the transmitting side or the decoder of the receiving side. Through the feedback process, interactivity may be provided in consumption of point cloud data. According to an embodiment, head orientation information, viewport information indicating an area currently viewed by a user, and the like may be delivered to the transmitting side in the feedback process. According to an embodiment, the user may interact with what is implemented in the VR/AR/MR/autonomous driving environment. In this case, information related to the interaction may be delivered to the transmitting side or a service provider in the feedback process. According to an embodiment, the feedback process may be skipped.

According to an embodiment, the above-described feedback information may not only be transmitted to the transmitting side, but also be consumed at the receiving side. That is, the decapsulation processing, decoding, and rendering processes at the receiving side may be performed based on the above-described feedback information. For example, the point cloud data about the area currently viewed by the user may be preferentially decapsulated, decoded, and rendered based on the orientation information and/or the viewport information.

A method of transmitting point cloud data according to embodiments may include encoding point cloud data, encapsulating the point cloud data, and transmitting the point cloud data.

A method of receiving point cloud data according to embodiments may include receiving point cloud data, decapsulating the point cloud data, and decoding the point cloud data.

FIG. 21 is an exemplary block diagram of an device for storing and transmitting point cloud data according to embodiments.

FIG. 21 shows a point cloud system according to embodiments. A part/the entirety of the system may include some or all of the transmission device and reception device of FIG. 1, the encoding process of FIG. 4, the 2D video/image encoder of FIG. 15, the decoding process of FIG. 16, the transmission device of FIG. 18, and/or the reception device of FIG. 19. In addition, it may be included or corresponded to a part/the entirety of the system of FIG. 20.

A point cloud data transmission device according to embodiments may be configured as shown in the figure. Each element of the transmission device may be a module/unit/component/hardware/software/a processor.

The geometry, attribute, auxiliary data, and mesh data of the point cloud may each be configured as a separate stream or stored in different tracks in a file. Furthermore, they may be included in a separate segment.

A point cloud acquirer (point cloud acquisition) 21000 acquires a point cloud. For example, one or more cameras may acquire point cloud data through capture, composition or generation of a point cloud. Through this acquisition process, point cloud data including a 3D position (which may be represented by x, y, and z position values, etc.) (hereinafter referred to as geometry) of each point and attributes (color, reflectance, transparency, etc.) of each point may be acquired. For example, a Polygon File format (PLY) (or Stanford Triangle format) file or the like including the point cloud data may be generated. For point cloud data having multiple frames, one or more files may be acquired. In this process, point cloud related metadata (e.g., metadata related to capture, etc.) may be generated.

A patch generator (or patch generation) 21002 generates patches from the point cloud data. The patch generator generates point cloud data or point cloud video as one or more pictures/frames. A picture/frame may generally represent a unit representing one image in a specific time interval. When points constituting the point cloud video is divided into one or more patches (sets of points that constitute the point cloud video, wherein the points belonging to the same patch are adjacent to each other in the 3D space and are mapped in the same direction among the planar faces of a 6-face bounding box when mapped to a 2D image) and mapped to a 2D plane, an occupancy map picture/frame in a binary map, which indicates presence or absence of data at the corresponding position in the 2D plane with 0 or 1 may be generated. In addition, a geometry picture/frame, which is in the form of a depth map that represents the information about the position (geometry) of each point constituting the point cloud video on a patch-by-patch basis, may be generated. A texture picture/frame, which represents the color information about each point constituting the point cloud video on a patch-by-patch basis, may be generated. In this process, metadata needed to reconstruct the point cloud from the individual patches may be generated. The metadata may include information about the patches, such as the position and size of each patch in the 2D/3D space. These pictures/frames may be generated continuously in temporal order to construct a video stream or metadata stream.

In addition, the patches may be used for 2D image mapping. For example, the point cloud data may be projected onto each face of a cube. After patch generation, a geometry image, one or more attribute images, an occupancy map, auxiliary data, and/or mesh data may be generated based on the generated patches.

Geometry image generation, attribute image generation, occupancy map generation, auxiliary data generation, and/or mesh data generation are performed by a pre-processor or a controller.

In geometry image generation 21002, a geometry image is generated based on the result of the patch generation. Geometry represents a point in a 3D space. The geometry image is generated using the occupancy map, which includes information related to 2D image packing of the patches, auxiliary data (patch data), and/or mesh data based on the patches. The geometry image is related to information such as a depth (e.g., near, far) of the patch generated after the patch generation.

In attribute image generation 21003, an attribute image is generated. For example, an attribute may represent a texture. The texture may be a color value that matches each point. According to embodiments, images of a plurality of attributes (such as color and reflectance) (N attributes) including a texture may be generated. The plurality of attributes may include material information and reflectance. According to an embodiment, the attributes may additionally include information indicating a color, which may vary depending on viewing angle and light even for the same texture.

In occupancy map generation 21004, an occupancy map is generated from the patches. The occupancy map includes information indicating presence or absence of data in the pixel, such as the corresponding geometry or attribute image.

In auxiliary data generation 21005, auxiliary data including information about the patches is generated. That is, the auxiliary data represents metadata about a patch of a point cloud object. For example, it may represent information such as normal vectors for the patches. Specifically, the auxiliary data may include information needed to reconstruct the point cloud from the patches (e.g., information about the positions, sizes, and the like of the patches in 2D/3D space, and projection (normal) plane identification information, patch mapping information, etc.)

In mesh data generation 21006, mesh data is generated from the patches. Mesh represents connection between neighboring points. For example, it may represent data of a triangular shape. For example, the mesh data refers to connectivity between the points.

A point cloud pre-processor or controller generates metadata related to patch generation, geometry image generation, attribute image generation, occupancy map generation, auxiliary data generation, and mesh data generation.

The point cloud transmission device performs video encoding and/or image encoding in response to the result generated by the pre-processor. The point cloud transmission device may generate point cloud image data as well as point cloud video data. According to embodiments, the point cloud data may have only video data, only image data, and/or both video data and image data.

A video encoder 21007 performs geometry video compression, attribute video compression, occupancy map compression, auxiliary data compression, and/or mesh data compression. The video encoder generates video stream(s) containing encoded video data.

Specifically, in the geometry video compression, point cloud geometry video data is encoded. In the attribute video compression, attribute video data of the point cloud is encoded. In the auxiliary data compression, auxiliary data associated with the point cloud video data is encoded. In the mesh data compression, mesh data of the point cloud video data is encoded. The respective operations of the point cloud video encoder may be performed in parallel.

An image encoder 21008 performs geometry image compression, attribute image compression, occupancy map compression, auxiliary data compression, and/or mesh data compression. The image encoder generates image(s) containing encoded image data.

Specifically, in the geometry image compression, the point cloud geometry image data is encoded. In the attribute image compression, the attribute image data of the point cloud is encoded. In the auxiliary data compression, the auxiliary data associated with the point cloud image data is encoded. In the mesh data compression, the mesh data associated with the point cloud image data is encoded. The respective operations of the point cloud image encoder may be performed in parallel.

The video encoder and/or the image encoder may receive metadata from the pre-processor. The video encoder and/or the image encoder may perform each encoding process based on the metadata.

A file/segment encapsulator (file/segment encapsulation) 21009 encapsulates the video stream(s) and/or image(s) in the form of a file and/or segment. The file/segment encapsulator performs video track encapsulation, metadata track encapsulation, and/or image encapsulation.

In the video track encapsulation, one or more video streams may be encapsulated into one or more tracks.

In the metadata track encapsulation, metadata related to a video stream and/or an image may be encapsulated in one or more tracks. The metadata includes data related to the content of the point cloud data. For example, it may include initial viewing orientation metadata. According to embodiments, the metadata may be encapsulated into a metadata track, or may be encapsulated together in a video track or an image track.

In the image encapsulation, one or more images may be encapsulated into one or more tracks or items.

For example, according to embodiments, when four video streams and two images are input to the encapsulator, the four video streams and two images may be encapsulated in one file.

The point cloud video encoder and/or the point cloud image encoder according to the embodiments may generate a G-PCC/V-PCC bitstream according to the embodiments.

The file/segment encapsulator may receive metadata from the pre-processor. The file/segment encapsulator may perform encapsulation based on the metadata.

A file and/or a segment generated by the file/segment encapsulation are transmitted by the point cloud transmission device or the transmitter. For example, the segment(s) may be delivered based on a DASH-based protocol.

The encapsulation or encapsulator according to the embodiments may divide the V-PCC bitstream into one or multiple tracks and store the same in a file, and may also encapsulate signaling information for this operation. In addition, the atlas stream included on the V-PCC bitstream may be stored as a track in the file, and related signaling information may be stored. Furthermore, an SEI message present in the V-PCC bitstream may be stored in a track in the file and related signaling information may be stored.

The transmitter may transmit a point cloud bitstream or a file/segment including the bitstream to the receiver of the reception device over a digital storage medium or a network. Processing according to any transmission protocol may be performed for transmission. The data that has been processed for transmission may be delivered over a broadcast network and/or through a broadband. The data may be delivered to the receiving side in an on-demand manner. The digital storage medium may include various storage media such as USB, SD, CD, DVD, Blu-ray, HDD, and SSD. The deliverer may include an element for generating a media file in a predetermined file format, and may include an element for transmission over a broadcast/communication network. The deliverer receives orientation information and/or viewport information from the receiver. The deliverer may deliver the acquired orientation information and/or viewport information (or information selected by the user) to the pre-processor, the video encoder, the image encoder, the file/segment encapsulator, and/or the point cloud encoder. Based on the orientation information and/or the viewport information, the point cloud encoder may encode all point cloud data or the point cloud data indicated by the orientation information and/or the viewport information. Based on the orientation information and/or the viewport information, the file/segment encapsulator may encapsulate all point cloud data or the point cloud data indicated by the orientation information and/or the viewport information. Based on the orientation information and/or the viewport information, the deliverer may deliver all point cloud data or the point cloud data indicated by the orientation information and/or the viewport information.

For example, the pre-processor may perform the above-described operation on all the point cloud data or on the point cloud data indicated by the orientation information and/or the viewport information. The video encoder and/or the image encoder may perform the above-described operation on all the point cloud data or on the point cloud data indicated by the orientation information and/or the viewport information. The file/segment encapsulator may perform the above-described operation on all the point cloud data or on the point cloud data indicated by the orientation information and/or the viewport information. The transmitter may perform the above-described operation on all the point cloud data or on the point cloud data indicated by the orientation information and/or the viewport information.

FIG. 22 is an exemplary block diagram of a point cloud data reception device according to embodiments.

FIG. 22 shows a point cloud system according to embodiments. A part/the entirety of the system may include some or all of the transmission device and reception device of FIG. 1, the encoding process of FIG. 4, the 2D video/image encoder of FIG. 15, the decoding process of FIG. 16, the transmission device of FIG. 18, and/or the reception device of FIG. 19. In addition, it may be included or corresponded to a part/the entirety of the system of FIGS. 20 and 21.

Each component of the reception device may be a module/unit/component/hardware/software/processor. A delivery client may receive point cloud data, a point cloud bitstream, or a file/segment including the bitstream transmitted by the point cloud data transmission device according to the embodiments. The receiver may receive the point cloud data over a broadcast network or through a broadband depending on the channel used for the transmission. Alternatively, the point cloud video data may be received through a digital storage medium. The receiver may include a process of decoding the received data and rendering the received data according to the user viewport. The reception processor may perform processing on the received point cloud data according to a transmission protocol. A reception processor may be included in the receiver or configured as a separate component/module. The reception processor may reversely perform the process of the transmission processor described above so as to correspond to the processing for a transmission performed at the transmitting side. The reception processor may deliver the acquired point cloud data to the decapsulation processor and the acquired point cloud related metadata to the metadata parser.

The sensor/tracker (sensing/tracking) acquires orientation information and/or viewport information. The sensor/tracker may deliver the acquired orientation information and/or viewport information to the delivery client, the file/segment decapsulator, and the point cloud decoder.

The delivery client may receive all point cloud data or the point cloud data indicated by the orientation information and/or the viewport information based on the orientation information and/or the viewport information. The file/segment decapsulator may decapsulate all point cloud data or the point cloud data indicated by the orientation information and/or the viewport information based on the orientation information and/or the viewport information. The point cloud decoder (the video decoder and/or the image decoder) may decode all point cloud data or the point cloud data indicated by the orientation information and/or the viewport information based on the orientation information and/or the viewport information. The point cloud processor may process all point cloud data or the point cloud data indicated by the orientation information and/or the viewport information based on the orientation information and/or the viewport information.

A file/segment decapsulator (file/segment decapsulation) 22000 performs video track decapsulation, metadata track decapsulation, and/or image decapsulation. The decapsulation processor (file/segment decapsulation) may decapsulate the point cloud data in the form of a file received from the reception processor. The decapsulation processor (file/segment decapsulation) may decapsulate files or segments according to ISOBMFF, etc., to acquire a point cloud bitstream or point cloud-related metadata (or a separate metadata bitstream). The acquired point cloud bitstream may be delivered to the point cloud decoder, and the acquired point cloud-related metadata (or metadata bitstream) may be delivered to the metadata processor. The point cloud bitstream may include the metadata (metadata bitstream). The metadata processor may be included in the point cloud video decoder or may be configured as a separate component/module. The point cloud-related metadata acquired by the decapsulation processor may take the form of a box or track in a file format. The decapsulation processor may receive metadata necessary for decapsulation from the metadata processor, when necessary. The point cloud-related metadata may be delivered to the point cloud decoder and used in a point cloud decoding procedure, or may be delivered to the renderer and used in a point cloud rendering procedure. The file/segment decapsulator may generate metadata related to the point cloud data.

In the video track decapsulation, a video track contained in the file and/or segment is decapsulated. Video stream(s) including a geometry video, an attribute video, an occupancy map, auxiliary data, and/or mesh data are decapsulated.

In the metadata track decapsulation, a bitstream containing metadata related to the point cloud data and/or auxiliary data is decapsulated.

In the image decapsulation, image(s) including a geometry image, an attribute image, an occupancy map, auxiliary data and/or mesh data are decapsulated.

The decapsulation or decapsulator according to the embodiments may divide and parse (decapsulate) the G-PCC/V-PCC bitstream based on one or more tracks in a file, and may also decapsulate signaling information therefor. In addition, the atlas stream included in the G-PCC/V-PCC bitstream may be decapsulated based on a track in the file, and related signaling information may be parsed. Furthermore, an SEI message present in the G-PCC/V-PCC bitstream may be decapsulated based on a track in the file, and related signaling information may be also acquired.

The video decoding or video decoder 22001 performs geometry video decompression, attribute video decompression, occupancy map decompression, auxiliary data decompression, and/or mesh data decompression. The video decoder decodes the geometry video, the attribute video, the auxiliary data, and/or the mesh data in a process corresponding to the process performed by the video encoder of the point cloud transmission device according to the embodiments.

The image decoding or image decoder 22002 performs geometry image decompression, attribute image decompression, occupancy map decompression, auxiliary data decompression, and/or mesh data decompression. The image decoder decodes the geometry image, the attribute image, the auxiliary data, and/or the mesh data in a process corresponding to the process performed by the image encoder of the point cloud transmission device according to the embodiments.

The video decoding and the image decoding according to the embodiments may be processed by one video/image decoder as described above, and may be performed along separate paths as illustrated in the figure.

The video decoding and/or the image decoding may generate metadata related to the video data and/or the image data.

The point cloud video encoder and/or the point cloud image encoder according to the embodiments may decode the G-PCC/V-PCC bitstream according to the embodiments.

In point cloud processing 22003, geometry reconstruction and/or attribute reconstruction are performed.

In the geometry reconstruction, the geometry video and/or geometry image are reconstructed from the decoded video data and/or decoded image data based on the occupancy map, auxiliary data and/or mesh data.

In the attribute reconstruction, the attribute video and/or the attribute image are reconstructed from the decoded attribute video and/or the decoded attribute image based on the occupancy map, auxiliary data, and/or mesh data. According to embodiments, for example, the attribute may be a texture. According to embodiments, an attribute may represent a plurality of pieces of attribute information. When there is a plurality of attributes, the point cloud processor according to the embodiments performs a plurality of attribute reconstructions.

The point cloud processor may receive metadata from the video decoder, the image decoder, and/or the file/segment decapsulator, and process the point cloud based on the metadata.

The point cloud rendering or point cloud renderer renders the reconstructed point cloud. The point cloud renderer may receive metadata from the video decoder, the image decoder, and/or the file/segment decapsulator, and render the point cloud based on the metadata.

The display actually displays the result of rendering on the display.

As shown in FIGS. 15 to 19, after encoding/decoding, the method/device according to the embodiments the point cloud data as shown in 15 to 19, the bitstream containing the point cloud data may be encapsulated and/or decapsulated in the form of a file and/or a segment.

For example, a point cloud data device according to the embodiments may encapsulate point cloud data based on a file. The file may include a V-PCC track containing parameters for a point cloud, a geometry track containing geometry, an attribute track containing an attribute, and an occupancy track containing an occupancy map.

In addition, a point cloud data reception device according to embodiments decapsulates the point cloud data based on a file. The file may include a V-PCC track containing parameters for a point cloud, a geometry track containing geometry, an attribute track containing an attribute, and an occupancy track containing an occupancy map.

The operation described above may be performed by the file/segment encapsulator 20004, 20005 of FIG. 20, the file/segment encapsulator 21009 of FIG. 21, and the file/segment encapsulator 22000 of FIG. 22.

Figure 23:
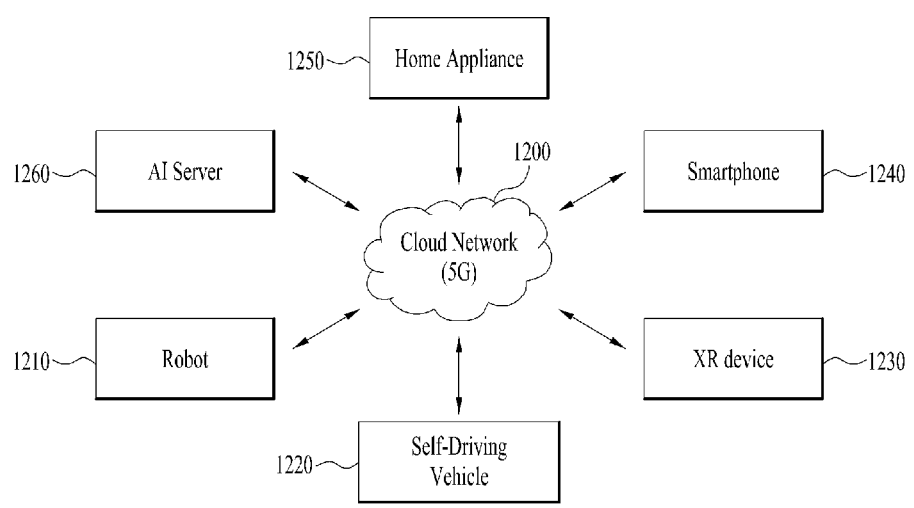
FIG. 23 illustrates an exemplary structure operable in connection with point cloud data transmission/reception methods/devices according to embodiments.

FIG. 23 illustrates an exemplary structure operable in connection with point cloud data transmission/reception methods/devices according to embodiments.

In the structure according to the embodiments, at least one of a server 2360, a robot 2310, a self-driving vehicle 2320, an XR device 2330, a smartphone 2340, a home appliance 2350 and/or a head-mount display (HMD) 2370 is connected to a cloud network 2300. Here, the robot 2310, the self-driving vehicle 2320, the XR device 2330, the smartphone 2340, or the home appliance 2350 may be referred to as a device. In addition, the XR device 1730 may correspond to a point cloud data (PCC) device according to embodiments or may be operatively connected to the PCC device.

The cloud network 2300 may represent a network that constitutes part of the cloud computing infrastructure or is present in the cloud computing infrastructure. Here, the cloud network 2300 may be configured using a 3G network, 4G or Long Term Evolution (LTE) network, or a 5G network.

The server 2360 may be connected to at least one of the robot 2310, the self-driving vehicle 2320, the XR device 2330, the smartphone 2340, the home appliance 2350, and/or the HMD 2370 over the cloud network 2300 and may assist at least a part of the processing of the connected devices 2310 to 2370.

The HMD 2370 represents one of the implementation types of the XR device and/or the PCC device according to the embodiments. An HMD type device according to embodiments includes a communication unit, a control unit, a memory, an I/O unit, a sensor unit, and a power supply unit.

Hereinafter, various embodiments of the devices 2310 to 2350 to which the above-described technology is applied will be described. The devices 2310 to 2350 illustrated in FIG. 23 may be operatively connected/coupled to a point cloud data transmission and reception device according to the above-described embodiments.

<PCC+XR>

The XR/PCC device 2330 may employ PCC technology and/or XR (AR+VR) technology, and may be implemented as an HMD, a head-up display (HUD) provided in a vehicle, a television, a mobile phone, a smartphone, a computer, a wearable device, a home appliance, a digital signage, a vehicle, a stationary robot, or a mobile robot.

The XR/PCC device 2330 may analyze 3D point cloud data or image data acquired through various sensors or from an external device and generate position data and attribute data about 3D points. Thereby, the XR/PCC device 2330 may acquire information about the surrounding space or a real object, and render and output an XR object. For example, the XR/PCC device 2330 may match an XR object including auxiliary information about a recognized object with the recognized object and output the matched XR object.

<PCC+XR+Mobile Phone>

The XR/PCC device 2330 may be implemented as a mobile phone 2340 by applying PCC technology.

The mobile phone 2340 may decode and display point cloud content based on the PCC technology.

<PCC+Self-Driving+XR>

The self-driving vehicle 2320 may be implemented as a mobile robot, a vehicle, an unmanned aerial vehicle, or the like by applying the PCC technology and the XR technology.

The self-driving vehicle 2320 to which the XR/PCC technology is applied may represent an autonomous vehicle provided with means for providing an XR image, or an autonomous vehicle that is a target of control/interaction in the XR image. In particular, the self-driving vehicle 2320, which is a target of control/interaction in the XR image, may be distinguished from the XR device 2330 and may be operatively connected thereto.

The self-driving vehicle 2320 having means for providing an XR/PCC image may acquire sensor information from the sensors including a camera, and output the generated XR/PCC image based on the acquired sensor information. For example, the self-driving vehicle may have an HUD and output an XR/PCC image thereto to provide an occupant with an XR/PCC object corresponding to a real object or an object present on the screen.

In this case, when the XR/PCC object is output to the HUD, at least a part of the XR/PCC object may be output to overlap the real object to which the occupant's eyes are directed. On the other hand, when the XR/PCC object is output on a display provided inside the self-driving vehicle, at least a part of the XR/PCC object may be output to overlap the object on the screen. For example, the self-driving vehicle may output XR/PCC objects corresponding to objects such as a road, another vehicle, a traffic light, a traffic sign, a two-wheeled vehicle, a pedestrian, and a building.

The virtual reality (VR) technology, the augmented reality (AR) technology, the mixed reality (MR) technology and/or the point cloud compression (PCC) technology according to the embodiments are applicable to various devices.

In other words, the VR technology is a display technology that provides only real-world objects, backgrounds, and the like as CG images. On the other hand, the AR technology refers to a technology for showing a CG image virtually created on a real object image. The MR technology is similar to the AR technology described above in that virtual objects to be shown are mixed and combined with the real world. However, the MR technology differs from the AR technology makes a clear distinction between a real object and a virtual object created as a CG image and uses virtual objects as complementary objects for real objects, whereas the MR technology treats virtual objects as objects having the same characteristics as real objects. More specifically, an example of MR technology applications is a hologram service.

Recently, the VR, AR, and MR technologies are sometimes referred to as extended reality (XR) technology rather than being clearly distinguished from each other. Accordingly, embodiments of the present disclosure are applicable to all VR, AR, MR, and XR technologies. For such technologies, encoding/decoding based on PCC, V-PCC, and G-PCC techniques may be applied.

The PCC method/device according to the embodiments may be applied to a vehicle that provides a self-driving service.

A vehicle that provides the self-driving service is connected to a PCC device for wired/wireless communication.

When the point cloud data transmission and reception device (PCC device) according to the embodiments is connected to a vehicle for wired/wireless communication, the device may receive and process content data related to an AR/VR/PCC service that may be provided together with the self-driving service and transmit the processed content data to the vehicle. In the case where the point cloud data transmission and reception device is mounted on a vehicle, the point cloud transmitting and reception device may receive and process content data related to the AR/VR/PCC service according to a user input signal input through a user interface device and provide the processed content data to the user. The vehicle or the user interface device according to the embodiments may receive a user input signal. The user input signal according to the embodiments may include a signal indicating the self-driving service.

A transmission device according to embodiments is a device configured to transmit point cloud data, and a reception device according to embodiments is a device configured to receive point cloud data.

The methods/devices according to the embodiments represent methods/devices for transmitting and receiving point cloud data according to the embodiments, a point cloud encoder and a decoder included in the transmission device/reception device, a device configured to generate and parse data to transmit and receive point cloud data, a processor, and/or methods corresponding thereto.

A point cloud data transmission device according to embodiments may include a point cloud data encoder and a transmitter configured to transmit point cloud data. The point cloud data transmission device may further include a point cloud data encapsulator capable of configuring point cloud data in a format for efficient transmission. The encoder configured to compress the point cloud data and the encapsulator configured to perform the encapsulation for transmission may be collectively referred to as a point cloud data system. The above-described components may be simply referred to as a method/device according to embodiments in this specification.

The point cloud data reception device according to the embodiments may include a point cloud data decoder and a receiver configured to receive point cloud data. The point cloud data reception device may further include a decapsulator configured to parse the point cloud data from a data structure in a format for efficient reception of the point cloud data. The decoder configured to restore the point cloud data and the decapsulator configured to perform the decapsulation for reception/parsing may be collectively referred to as a point cloud data system. The above-described components may be simply referred to as a method/device according to embodiments in this specification.

Video-based point cloud compression (V-PCC) described in this specification is the same as visual volumetric video-based coding (V3C). The terms V-PCC and V3C according to embodiments may be used interchangeably and may have the same meaning.

The method/device according to the embodiments may generate a file format for a dynamic point cloud object and provide a signaling method therefor (File Encapsulation of Dynamic Point Cloud Object).

Figure 24:
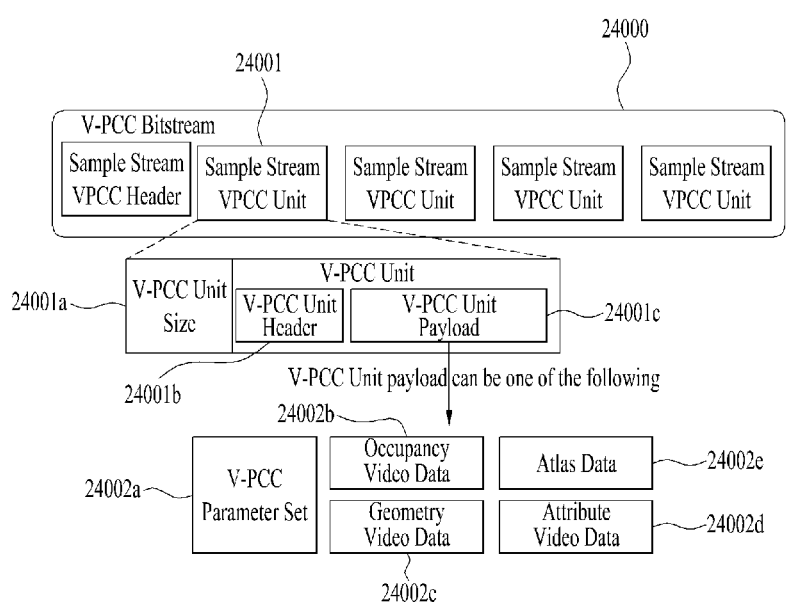
FIG. 24 illustrates a V-PCC bitstream according to embodiments.

FIG. 24 illustrates a V-PCC bitstream according to embodiments.

The V-PCC bitstream 24000 represents a form (i.e., a bitstream form) in which point cloud data according to embodiments is transmitted. The V-PCC bitstream 24000 shown in FIG. 24 may represent the compressed bitstream of FIG. 4, the bitstream of FIG. 15, the compressed bitstream received in FIG. 16, and the bitstream of FIG. 17, a bitstream generated by the multiplexer 18007 in FIG. 18, and a bitstream generated by the demultiplexer in FIG. 19.

The V-PCC bitstream shown in FIG. 24 may be generated by the XR device 1230, the self-driving vehicle 1220, the robot 1210, the AI server 1260, the home appliance 1250, and the smartphone 1240 according to the embodiments shown in FIG. 23, and may be transmitted to or transmitted/received between the devices over the cloud network (5G) 1200.

The V-PCC bitstream 24000 shown in FIG. 24 may be a bitstream to be received by the file/segment encapsulator 20004 of FIG. 20. That is, the V-PCC bitstream may be a bitstream directly transmitted by the point cloud data transmission device/method according to the embodiments, or may represent a bitstream before being encapsulated in the ISOBMFF scheme.

The V-PCC bitstream 24000 shown in FIG. 24 may be video streams and/or image streams of FIG. 21, or output from the file/segment insulation unit 21009. It may be a bitstream constituting segments (or files).

The V-PCC bitstream 24000 according to embodiments may include one or more sample stream V-PCC units 24001. The one or more sample stream V-PCC units 24001 may include a V-PCC unit and a V-PCC unit size indicating the size of the V-PCC unit.

The V-PCC bitstream 24000 includes a coded point cloud sequence (CPCS).

The V-PCC unit includes a V-PCC unit header 24001*b* and/or a V-PCC unit payload 24001*c*.

The V-PCC unit header 24001*b* includes signaling information about data contained in the V-PCC unit payload according to the embodiments. The V-PCC unit header according to the embodiments may indicate, for example, the type of data (e.g., V-PCC parameter set 24002*a*, occupancy video data 24002*b*, geometry video data 24002*c*, atlas data 24002*e*, and/or attribute video data 24002*d*, or the like) contained in the V-PCC unit according to the embodiments. In addition, the V-PCC unit header 24001*b* according to the embodiments may further include signaling information necessary for data contained in the V-PCC unit.

The V-PCC unit payload 24001*c* contains point cloud data according to embodiments or information needed to render or reconstruct the point cloud data.

The V-PCC unit payload 24001*c* may include, for example, a V-PCC parameter set 24002*a*, occupancy video data 24002*b*, geometry video data 24002*c*, atlas data 24002*e*, and/or attribute video data 24002*d*. The V-PCC unit payload 24001*c* may carry occupancy video, attribute video, or geometry video. The V-PCC unit payload 24001*c* may be composed of one or more NAL units.

The V-PCC unit payload 24002 according to the embodiments contains point cloud data according to the embodiments. The point cloud data may include one of occupancy video data, geometry video data, and/or attribute video data of the point cloud data. The point cloud data may include geometry video data encoded using the scheme of pulse coding modulation (PCM) and/or attribute video data encoded using the PCM.

The V-PCC parameter set 24002*a* according to the embodiments represents a parameter set including parameters or signaling information (e.g., metadata) for the point cloud data according to the embodiments. For example, the V-PCC parameter set may include signaling information about a sequence constituting point cloud data.

The occupancy video data 24002*b* is data including occupancy map data according to embodiments. The geometry video data 24002*c* includes geometry video data according to embodiments. The attribute video data 24002*d* includes attribute video data according to embodiments.

The atlas data 24002*e* represents data composed of an attribute (e.g., texture (patch)) and/or depth of point cloud data.

For example, the syntax of the V-PCC unit according to the embodiments may be configured as follows.

| | Descriptor |
|---|---|
| vpcc_unit( numBytesInVPCCUnit) { | |
|     vpcc_unit_header( ) | |
|     vpcc_unit_payload( ) | |
|     while( more_data_in_vpcc_unit ) | |
|         trailing_zero_8bits /* equal to 0x00*/ | f(8) |
| } | |

Figure 25:
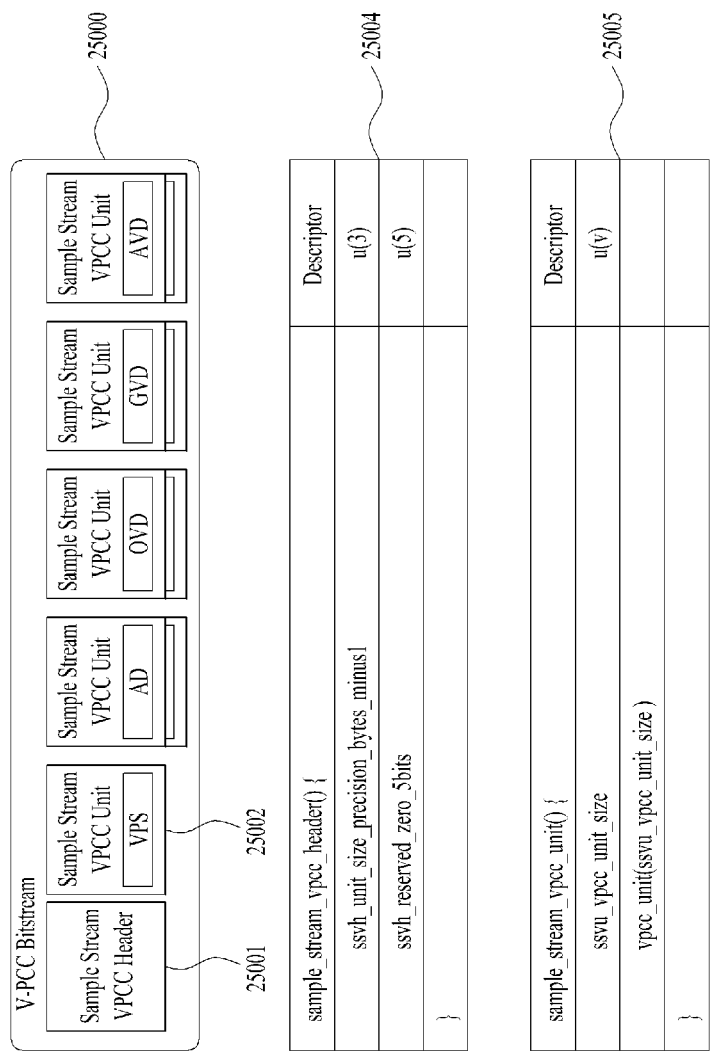
FIG. 25 illustrates an example of a V-PCC bitstream according to embodiments.

FIG. 25 illustrates an example of a V-PCC bitstream according to embodiments.

The V-PCC bitstream according to the embodiments illustrated in FIG. 25 represents the V-PCC bitstream 24000 of FIG. 24.

The V-PCC bitstream shown in FIG. 25 may be generated by the XR device 1230, the self-driving vehicle 1220, the robot 1210, the AI server 1260, the home appliance 1250, and the smartphone 1240 according to the embodiments shown in FIG. 23, and may be transmitted to or transmitted/received between the devices over the cloud network (5G) 1200.

The V-PCC bitstream 25000 according to the embodiments includes one or more sample stream V-PCC units 25002. The sample stream V-PCC units may represent the sample stream V-PCC units 24001 of FIG. 24. The sample stream V-PCC unit may be referred to as a V-PCC unit.

The V-PCC bitstream 25000 according to the embodiments may further include a sample stream V-PCC header 25001 containing information about sample stream V-PCC units.

The sample stream V-PCC unit 25002 has several types. Examples of the sample stream V-PCC unit 25002 include a V-PCC unit including a V-PCC parameter set (VPS), and a V-PCC unit including attribute data (AD), a V-PCC unit including occupancy video data (OVD), a V-PCC unit including geometry video data (GVD), and/or a V-PCC unit including attribute video data (AVD).

The V-PCC bitstream 25000 according to the embodiments includes the sample stream V-PCC unit 25002 including a VPS according to the embodiments. The V-PCC bitstream 25000 according to the embodiments may include one or more ore sample stream V-PCC units including one of AD, OVD, GVD, and/or AVD.

25004 shows an example of the syntax of the sample stream V-PCC header 25001 according to the embodiments. The sample stream V-PCC header 25004 may contain information of ssvh_unit_sizeprecision_bytes_minus1. Each sample stream V-PCC unit contains one type of V-PCC unit among VPS, AD, OVD, GVD, and AVD.

ssvh_unit_size_precision_bytes_minus1 plus 1 specifies the precision, in bytes, of the ssvu_vpcc_unit_size element in all sample stream V-PCC units. ssvh_unit_size_precision_ bytes_minus1 may be in the range of 0 to 7.

25005 shows an example of the syntax of the sample stream V-PCC unit 25002 according to the embodiments. The content of each sample stream V PCC unit is associated with the same access unit as the V-PCC unit contained in the sample stream V-PCC unit. The V-PCC unit 25002 may include, for example, ssvu_vpcc_unit_size.

ssvu_vpcc_unit_size specifies the size, in bytes, of the subsequent vpcc_unit. The number of bits used to represent ssvu_vpcc_unit_size may be equal to (ssvh_unit_size_precision_bytes_minus1+1)*8.

vpcc_unit( ), that is, vpcc_unit(ssvu_vpcc_unit_size) represents a V-PCC unit having a size of ssvu_vpcc_unit_size according to embodiments. vpcc_unit(ssvu_vpcc_unit_size) according to the embodiments includes a V-PCC unit header (vpcc_unit_header( )) and/or a V-PCC unit payload (vpcc_unit_payload( )). The V-PCC unit header shown in FIG. 25 may represent the V-PCC unit header 24001*b* shown in FIG. 24.

vpcc_unit( ) according to the embodiments may have, for example, the following syntax.

| | Descriptor |
|---|---|
| vpcc_unit( numBytesInVPCCUnit) { | |
|     vpcc_unit_header( ) | |
|     vpcc_unit_payload( ) | |
|     while( more_data_in_vpcc_unit ) | |
|         trailing_zero_8bits /* equal to 0x00 */ | f(8) |
| } | | vpcc_unit_header( ) represents a V-PCC unit header according to embodiments. vpcc_unit_payload( ) represents a V-PCC unit payload according to embodiments.

FIG. 26 shows a V-PCC unit and a V-PCC unit header according to embodiments.

FIG. 26 shows the syntax of the above-described V-PCC unit and V-PCC unit header (for example, the V-PCC unit and V-PCC unit header described above in FIGS. 24 and 25).

A V-PCC bitstream according to embodiments may contain a series of V-PCC sequences.

A V-PCC bitstream contains a series of V-PCC sequences. A vpcc unit type with a value of vuh_unit_type equal to VPCC_VPS may be expected to be the first V-PCC unit type in a V-PCC sequence. All other V-PCC unit types follow this unit type without any additional restrictions in their coding order. A V-PCC unit payload of a V-PCC unit carrying occupancy video, attribute video, or geometry video is composed of one or more NAL units.

A VPCC unit may include a header and a payload.

The VPCC unit header may include the following information based on the VUH unit type.

vuh_unit_type indicates the type of the V-PCC unit 27020 as follows.

| vuh_unit_type | Identifier | V-PCC Unit Type | Description |
| --- | --- | --- | --- |
| 0 | VPCC_VPS | V-PCC parameter set | V-PCC level parameters |
| 1 | VPCC_AD | Atlas data | Atlas information |
| 2 | VPCC_OVD | Occupancy Video Data | Occupancy information |
| 3 | VPCC_GVD | Geometry Video Data | Geometry information |
| 4 | VPCC_AVD | Attribute Video Data | Attribute information |
| 5 . . . 31 | VPCC_RSVD | Reserved | — |

When vuh_unit_type indicates attribute video data (VPCC_AVD), geometry video data (VPCC_GVD), occupancy video data (VPCC_OVD), or atlas data (VPCC_AD), vuh_vpcc_parameter_set ID and vuh_atlas_id is carried in the unit header. A parameter set ID and an atlas ID associated with the V-PCC unit may be delivered.

When the unit type is atlas video data, the header of the unit may carry an attribute index (vuh_attribute_index), an attribute partition index (vuh_attribute_partition_index), a map index (vuh_map_index), and an auxiliary video flag (vuh_auxiliary_video_flag).

When the unit type is geometry video data, vuh_map_index and vuh_auxiliary_video_flag may be carried.

When the unit type is occupancy video data or atlas data, the header of the unit may contain additional reserved bits.

vuh_vpccparameter_set_id specifies the value of vps_vpcc_parameter_set_id for the active V-PCC VPS. Through the vpcc_parameter_set_id in the header of the current V-PCC unit, the ID of the VPS parameter set may be known and the relationship between the V-PCC unit and the V-PCC parameter set may be announced.

vuh_atlas_id specifies the index of the atlas that corresponds to the current V-PCC unit. Through the vuh_atlas_id in the header of the current V-PCC unit, the index of the atlas may be known, and the atlas corresponding to the V-PCC unit may be announced.

vuh_attribute_index indicates the index of the attribute data carried in the Attribute Video Data unit.

vuh_attribute_partition_index indicates the index of the attribute dimension group carried in the Attribute Video Data unit.

vuh_map_index indicates, when present, the map index of the current geometry or attribute stream.

vuh_auxiliary_video_flag equal to 1 indicates that the associated geometry or attribute video data unit is a RAW and/or EOM coded points video only. vuh_auxiliary_video_flag equal to 0 indicates that the associated geometry or attribute video data unit may contain RAW and/or EOM coded points.

FIG. 27 shows exemplary syntax of a V-PCC parameter set according to embodiments.

The V-PCC parameter set according to the embodiments shown in FIG. 27 may represent, for example, the V-PCC parameter set 24002a of FIG. 24, the VPS in the sample stream V-PCC unit 25002 of FIG. 25, or the V-PCC parameter set included in the V-PCC unit of type VPCC_VPS described with reference to FIG. 26.

The V-PCC parameter set according to the embodiments shown in FIG. 27 may be generated by the point cloud video encoder 10002 of FIG. 1, the auxiliary patch info compressor 40005 of FIG. 4, the encoding device 100 of FIG. 15, the patch generator 18000 of FIG. 18, the video encoder 20002 and the image encoder 20003 of FIGS. 20 and 21, or the like.

The V-PCC parameter set according to the embodiments may be referred to as various terms such as a V3C parameter set and a visual volumetric parameter set. Hereinafter, the term "VPCC" may be replaced with and/or referred to as "V3C." For example, vps_vpcc_parameter_set_id information may be referred to as vps_v3c_parameter_set_id or the like.

The V-PCC parameter set according to the embodiments may include, for example, profile_tier_level( ) information, vps_vpcc_parameter_set_id, vps_atlas_count_minus1, and/or vps_extension_present_flag.

profile_tier_level( ) contains V-PCC codec profile related information and specifies restrictions on the bitstreams and hence limits on the capabilities needed to decode the bitstreams. Profiles, tiers, and levels may also be used to indicate interoperability points between individual decoder implementations.

vps_vpcc_parameter_set_id provides an identifier for the V-PCC parameter set (VPS) for reference by other syntax elements.

vps_atlas_count_minus1 plus 1 indicates the total number of supported atlases in the current bitstream.

vps_extension_present_flag equal to 1 specifies that the syntax element vps_extension_length is present in vpcc_parameter_set syntax structure. vps_extension_present_flag equal to 0 specifies that syntax element vps_extension_length is not present.

vps_extension_length_minus1 plus 1 specifies the number of vps_extension_data_byte elements that follow this syntax element.

vps_extension_data_byte may have any value.

The V-PCC parameter set according to the embodiments may include vps_frame_width, vps_frame_height, vps_map_count_minus1, vps_map_absolute_coding_enabled_flag, vps_auxiliary_video_present_flag, occupancy_information, geometry_information, and/or attribute_information as many as the number of atlases indicated by vps_atlas_count_minus1.

vps_frame_width[j] indicates the V-PCC frame width for the atlas with index j. For example, vps_frame_width[j] indicates the V-PCC frame width in terms of integer luma samples for the atlas with index j. This frame width is the nominal width that is associated with all V-PCC components for the atlas with index j.

vps_frame_height[j] indicates the V-PCC frame height for the atlas with index j. For example, vps_frame_height[j] indicates the V-PCC frame height in terms of integer luma samples for the atlas with index j. This frame height is the nominal height that is associated with all V-PCC components for the atlas with index j.

vps_map_count_minus1[j] plus 1 indicates the number of maps used for encoding the geometry and attribute data for the atlas with index j.

vps_multiple_map_streams_present_flag[j] equal to 0 indicates that all geometry or attribute maps for the atlas with index j are placed in a single geometry or attribute video stream, respectively. vps_multiple_map_streams_present_flag[j] equal to 1 indicates that all geometry or attribute maps for the atlas with index j are placed in separate video streams.

vps_map_absolute_coding_enabled_flag[j][i] equal to 1 indicates that the geometry map with index i for the atlas with index j is coded without any form of map prediction. vps_map_absolute_coding_enabled_flag[j][i] equal to 0 indicates that the geometry map with index i for the atlas with index j is first predicted from another, earlier coded map, prior to coding.

vps_map_predictor_index_diff[j][i] is used to compute the predictor of the geometry map with index i for the atlas with index j when vps_map_absolute_coding_enabled_flag [j][i] is equal to 0.

vps_auxiliary_video_present_flag[j] equal to 1 indicates that auxiliary information for the atlas with index j, e.g., RAW or EOM patch data, may be stored in a separate video stream, e.g., the auxiliary video stream. vps_auxiliary_video_present_flag[j] equal to 0 indicates that auxiliary information for the atlas with index j is not stored in a separate video stream.

occupancy_information( ) includes occupancy video related information.

geometry_information( ) includes geometry video related information.

attribute_information( ) includes attribute video related information.

Figure 28:
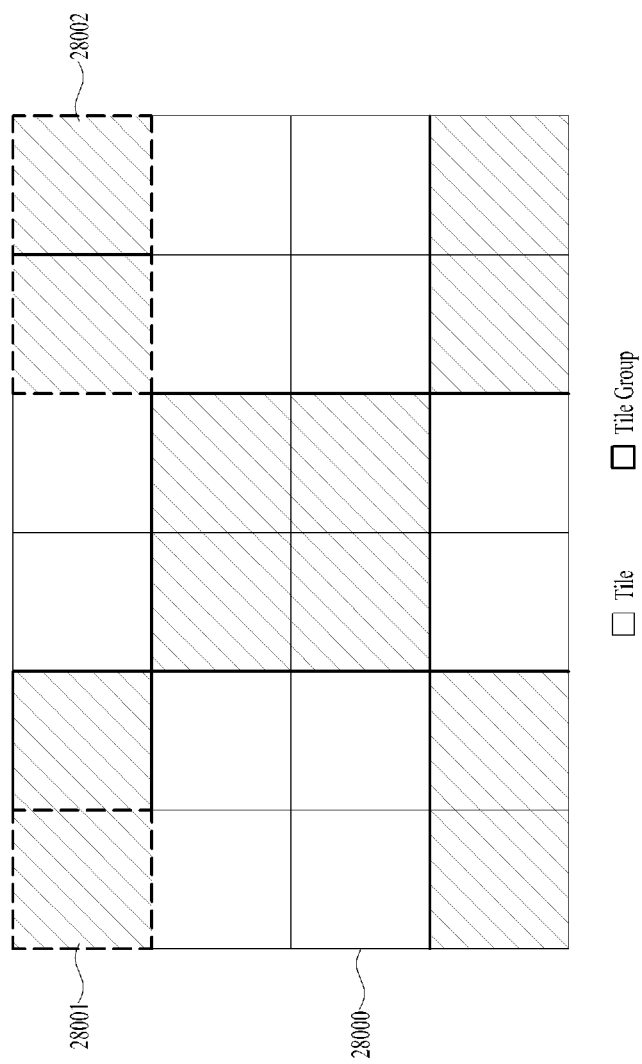
FIG. 28 shows an atlas frame according to embodiments.

FIG. 28 shows an atlas frame according to embodiments.

A rectangle 28000 shown in FIG. 28 represents one atlas frame. The atlas frame 28000 according to the embodiments may be generated by the patch generator 40000 and the patch packer 40001 of FIG. 4.

The atlas frame 28000 is a 2D rectangular array of atlas samples onto which patches are projected. The atlas frame according to the embodiments may mean the atlas frame shown in FIG. 3.

The atlas frame 28000 may include one or more tiles 28001. That is, the atlas frame may be divided into tiles.

The atlas frame 28000 may be divided into one or more tile rows and one or more tile columns.

The tile 28001 according to the embodiments is a unit for dividing a 2D frame. That is, the tile 28001 is a unit for dividing the atlas. The tile 28001 may represent, for example, a unit for encoding and/or decoding according to embodiments. A tile may be a rectangular region of an atlas frame.

A tile group 28802 may contain one or more tiles of the atlas frame 28000.

Referring to FIG. 28, the tile group 28002 contains multiple tiles 28001, etc. of the atlas frame 28000. The tile group 28002 constitutes a rectangular region of the atlas frame 28000. Referring to FIG. 28, for example, the atlas frame 28000 may be partitioned and/or divided into 24 tiles (6 tile columns and 4 tile rows). The atlas frame 28000 may be divided into 9 rectangular tile groups 28002.

Figure 29:
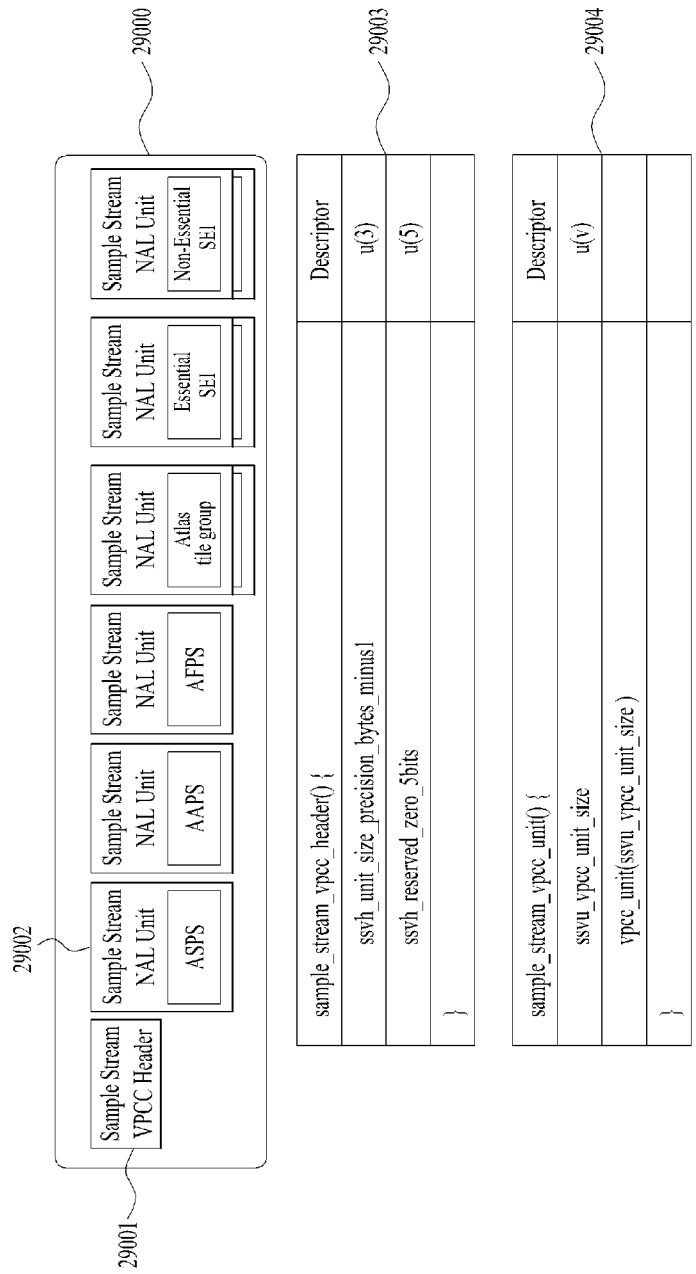
FIG. 29 shows an exemplary atlas substream according to embodiments.

FIG. 29 shows an exemplary atlas substream according to embodiments.

The atlas substream represents a sub-bitstream type extracted from a V-PCC bitstream (or V3C bitstream). The atlas substream includes a part of the atlas NAL bitstream.

The V-PCC unit payload 29000 of the V-PCC unit according to the embodiments may contain an atlas sub-bitstream (or atlas substream) shown in FIG. 29, and the atlas sub-bitstream may contain one or more sample stream NAL units. (A V-PCC unit payload of V-PCC unit carrying the atlas substream may be composed of one or more sample stream NAL units).

The atlas sub-bitstream according to the embodiments shown in FIG. 29 may be composed of one or more network abstraction layer (NAL) units or sample stream NAL units for point cloud data according to the embodiments.

The atlas sub-bitstream according to the embodiments includes a V-PCC sample stream NAL header 29001. A V-PCC unit 29000 according to the embodiments includes one or more sample stream NAL units 29002.

There are various types of NAL units (or sample stream NAL units) 29002 according to embodiments. Examples of the NAL unit include a sample stream NAL unit including an atlas sequence parameter set (ASPS), a sample stream NAL unit including an adaptation parameter set (AAPS), a sample stream NAL unit including an atlas frame parameter set (AFPS), a sample stream NAL unit including an atlas tile group (ATP), a sample stream NAL unit including essential SEI, and/or a NAL unit including non-essential SEI.

The sample stream NAL header 29001 contains signaling information about the one or more sample stream NAL units 29002. For example, the sample stream NAL header 29001 may contain ssvh_unit_size_precision_bytes_minus1.

29003 shows an example of the syntax of the sample stream NAL unit header according to embodiments.

ssvh_unit_size_precision_bytes_minus1 plus 1 may specify, for example, the precision, in bytes, of the ssnu_nal_unit_size element in all sample stream NAL units. ssnh_unit_size_precision_bytes_minus1 may be in the range of 0 to 7.

29004 shows an example of the syntax of the sample stream NAL unit according to embodiments.

ssvu_nal_unit_size specifies the size, in bytes, of the subsequent NAL_unit. The number of bits used to represent ssnu_nal_unit_size may be equal to (ssnh_unit_size_precision_bytes_minus1+1)*8.

NAL_unit( ) that is, nal_unit(ssvu_vpcc_unit_size) indicates a NAL unit having a size of ssvu_nal_unit_size according to the embodiments.

Each sample stream NAL unit includes an atlas sequence parameter set (ASPS), an atlas adaptation parameter set (AAPS), an atlas frame parameter set (AFPS), and atlas tile group information, essential SEI, and/or non-essential SEI.

A supplemental enhancement information (SEI) message contains information necessary for operations related to decoding, reconstruction, display, or other purposes. The SEI message according to the embodiments contains an SEI payload (sei_payload).

The syntax of NAL_unit( ), that is, nal_unit (ssvu_vpcc_unit_size) according to embodiments may be configured as follows.

|  | Descriptor |
|---|---|
| nal_unit( NumBytesInNalUnit ) {<br>    nal_unit_header( )<br>    NumBytesInRbsp = 0<br>    for( i = 2; i < NumBytesInNalUnit; i++ )<br>        rbsp_byte[ NumBytesInRbsp++ ]<br>} | <br><br><br><br>b(8) | nal_unit_header( ) represents the header of a NAL unit according to embodiments.

NumBytesInNalUnit specifies the size of the NAL unit in bytes.

NumBytesInRbsp is initialized to zero, and indicates the bytes that belong to the payload of the NAL unit.

rbsp_byte[i] is the i-th byte of an RBSP.

The syntax of the header of the NAL unit, that is, nal_unit_header( ) according to embodiments may be configured as follows.

| | Descriptor |
|---|---|
| nal_unit_header( ) { | |
|     nal_forbidden_zero_bit | f(1) |

| | Descriptor |
|---|---|
|     nal_unit_type | u(6) |
|     nal_layer_id | u(6) |
|     nal_temporal_id_plus1 | u(3) |
| } | | nal_forbidden_zero_bit shall be equal to 0.

nal_unit_type specifies the type of the RBSP data structure contained in the NAL unit as specified in the table below.

| nal_unit_type | Name of nal_unit_type | Content of NAL unit and RBSP syntax structure | NAL unit type class |
|---|---|---|---|
| 0 | NAL_TRAIL | Coded tile group of a non-TSA, non STSA trailing atlas frame<br>atlas_tile_group_layer_rbsp( ) | ACL |
| 1 | NAL_TSA | Coded tile group of a TSA atlas frame<br>atlas_tile_group_layer_rbsp( ) | ACL |
| 2 | NAL_STSA | Coded tile group of an STSA atlas frame<br>atlas_tile_group_layer_rbsp( ) | ACL |
| 3 | NAL_RADL | Coded tile group of an RADL atlas frame<br>atlas_tile_group_layer_rbsp( ) | ACL |
| 4 | NAL_RASL | Coded tile group of an RASL atlas frame<br>atlas_tile_group_layer_rbsp( ) | ACL |
| 5 | NAL_SKIP | Coded tile group of a skipped atlas frame<br>atlas_tile_group_layer_rbsp( ) | ACL |
| 6 . . . 9 | NAL_RSV_ACL_6 . . . NAL_RSV_ACL_9 | Reserved non-IRAP ACL NAL unit types | ACL |
| 10<br>11<br>12 | NAL_BLA_W_LP<br>NAL_BLA_W_RADL<br>NAL_BLA_N_LP | Coded tile group of a BLA atlas frame<br>atlas_tile_group_layer_rbsp( ) | ACL |
| 13<br>14<br>15 | NAL_GBLA_WLP<br>NAL_GBLA_WRADL<br>NAL_GBLA_NLP | Coded tile group of a GBLA atlas frame<br>atlas_tile_group_layer_rbsp( ) | ACL |
| 16<br>17 | NAL_IDR_W_RADL<br>NAL_IDR_N_LP | Coded tile group of an IDR atlas frame<br>atlas_tile_group_layer_rbsp( ) | ACL |
| 18<br>19 | NAL_GIDR_W_RADL<br>NAL_GIDR_N_LP | Coded tile group of a GIDR atlas frame<br>atlas_tile_group_layer_rbsp( ) | ACL |
| 20 | NAL_CRA | Coded tile group of a CRA atlas frame<br>atlas_tile_group_layer_rbsp( ) | ACL |
| 21 | NAL_GCRA | Coded tile group of a GCRA atlas frame<br>atlas_tile_group_layer_rbsp( ) | ACL |
| 22<br>23 | NAL_IRAP_ACL_—22<br>NAL_IRAP_ACL_23 | Reserved IRAP ACL NAL unit types | ACL |
| 24 . . . 31 | NAL_RSV_ACL_24 . . . NAL_RSV_ACL_31 | Reserved non-IRAP ACL NAL unit types | ACL |
| 32 | NAL_ASPS | Atlas sequence parameter set<br>atlas_sequence_parameter_set_rbsp( ) | non-ACL |
| 33 | NAL_AFPS | Atlas frame parameter set<br>atlas_frame_parameter_set_rbsp( ) | non-ACL |
| 34 | NAL_AUD | Access unit delimiter<br>access_unit_delimiter_rbsp( ) | non-ACL |
| 35 | NAL_VPCC_AUD | V-PCC access unit delimiter<br>access_unit_delimiter_rbsp( ) | non-ACL |
| 36 | NAL_EOS | End of sequence<br>end_of_seq_rbsp( ) | non-ACL |
| 37 | NAL_EOB | End of bitstream<br>end_of_atlas_sub_bitstream_rbsp( ) | non-ACL |
| 38 | NAL_FD | Filler<br>filler_data_rbsp( ) | non-ACL |
| 39<br>40 | NAL_PREFIX_NSEI<br>NAL_SUFFIX_NSEI | Non-essential supplemental enhancement information<br>sei_rbsp( ) | non-ACL |
| 41<br>42 | NAL_PREFIX_ESEI<br>NAL_SUFFIX_ESEI | Essential supplemental enhancement information<br>sei_rbsp( ) | non-ACL |
| 43 | NAL_AAPS | Atlas adaptation parameter set<br>atlas_adaptation_parameter_set-rbsp( ) | non-ACL |
| 44 . . . 47 | NAL_RSV_NACL_44<br>NAL_RSV_NACL_47 | Reserved non-ACL NAL unit types | non-ACL |
| 48 . . . 63 | NAL_UNSPEC_48<br>NAL_UNSPEC_63 | Unspecified non-ACL NAL unit types | non-ACL | nal_layer_id specifies the identifier of the layer to which an ACL NAL unit belongs or the identifier of a layer to which a non-ACL NAL unit applies.

nal_temporal_id_plus1 minus1 specifies a temporal identifier for the NAL unit.

Each sample stream NAL unit contains one of atlas parameter sets, i.e., ASPS, AAPS, AFPS, one or more atlas tile group information, and SEIs.

FIG. 30 shows exemplary syntax of an atlas sequence parameter set according to embodiments.

The atlas sequence parameter set according to the embodiments shown in FIG. 30 represents, for example, the ASPS shown in FIG. 29 and described in the corresponding paragraph.

The atlas sequence parameter set according to the embodiments shown in FIG. 30 may be generated by the point cloud video encoder 10002 of FIG. 1, the auxiliary patch info compressor 40005 of FIG. 4, the encoding device 100 of FIG. 15, the patch generator 18000 of FIG. 18, the video encoder 20002 and the image encoder 20003 of FIGS. 20 and 21, or the like.

The ASPS according to the embodiments shown in FIG. 30 may include asps_atlas_sequence_parameter_set_id, asps_frame_width, asps_frame_height, asps_log 2_patch_packing_block_size, asps_log 2_max_atlas_frame_order_cnt_lsb_minus4, asps_max_dec_atlas_frame_buffering_minus1, asps_long_term_ref_atlas_frames_flag, asps_num_ref_atlas_frame_lists_in_asps, asps_use_eight_orientations_flag, asps_extended_projection_enabled_flag, asps_normal_axis_limits_quantization_enabled_flag, asps_normal_axis_max_delta_value_enabled_flag, asps_remove_duplicate_point_enabled_flag, asps_pixel_deinterleaving_enabled_flag, asps_patch_precedence_order_flag, asps_patch_size_quantizer_present_flag, asps_raw_patch_enabled_flag, asps_eom_patch_enabled_flag, asps_point_local_reconstruction_enabled_flag, 1asps_map_count_minus1, asps_vui_parameters_present_flag, and/or asps_extension_flag.

The ASPS according to the embodiments may contain syntax elements that apply to zero or more entire coded atlas sequences (CASs) as determined by the content of a syntax element found in the ASPS referred to by a syntax element found in each tile group header.

asps_atlas_sequence_parameter_set_id provides an identifier for the atlas sequence parameter set for reference by other syntax elements.

asps_frame_width indicates the atlas frame width in terms of integer number of samples, where a sample corresponds to a luma sample of a video component.

asps_frame_height indicates the atlas frame height in terms of integer number of samples, where a sample corresponds to a luma sample of a video component.

asps_log 2patch_packing_block_size specifies the value of the variable PatchPackingBlockSize. PatchPackingBlockSize is used for the horizontal and vertical placement of the patches within the atlas.

asps_log 2_max_atlas_frame_order_cnt_lsb_minus4 specifies the value of the variable MaxAtlasFrmOrderCntLsb, which is used in the decoding process for the atlas frame order count.

asps_max_dec_atlas_frame_buffering_minus1 plus 1 specifies the maximum required size of the decoded atlas frame buffer for the CAS in units of atlas frame storage buffers.

asps_long_term_ref_atlas_frames_flag equal to 0 specifies that no long term reference atlas frame is used for inter prediction of any coded atlas frame in the CAS. asps_long_term_ref_atlas_frames_flag equal to 1 specifies that long term reference atlas frames may be used for inter prediction of one or more coded atlas frames in the CAS.

asps_num_ref_atlas_frame_lists_in_asps specifies the number of the ref list struct(rlsIdx) syntax structures included in the atlas sequence parameter set.

asps_use_eight_orientations_flag equal to 0 specifies that the patch orientation index for a patch with index j in a frame with index i, pdu_orientation_index[i][j], is in the range of 0 to 1, inclusive. asps_use_eight_orientations_flag equal to 1 specifies that the patch orientation index for a patch with index j in a frame with index i, pdu_orientation_index[i][j], is in the range of 0 to 7, inclusive.

asps_extendedprojection_enabled_flag equal to 0 specifies that the patch projection information is not signaled for the current atlas tile group. asps_extendedprojection_enabled_flag equal to 1 specifies that the patch projection information is signaled for the current atlas tile group.

asps_normal_axis_limits_quantization_enabled_flag equal to 1 specifies that quantization parameters shall be signaled and used for quantizing the normal axis related elements of a patch data unit, a merge patch data unit, or an inter patch data unit. asps_normal_axis_limits_quantization_ enabled_flag equal to 0 specifies that no quantization is applied on any normal axis related elements of a patch data unit, a merge patch data unit, or an inter patch data unit.

asps_normal_axis_max_delta_value_enabled_flag equal to 1 specifies that the maximum nominal shift value of the normal axis that may be present in the geometry information of a patch with index i in a frame with index j will be indicated in the bitstream for each patch data unit, a merge patch data unit, or an inter patch data unit. asps_normal_axis_max_delta_value_enabled_flag equal to 0 specifies that the maximum nominal shift value of the normal axis that may be present in the geometry information of a patch with index i in a frame with index j shall not be indicated in the bitstream for each patch data unit, a merge patch data unit, or an inter patch data unit.

asps_remove_duplicatepoint_enabled_flag equal to 1 indicates that duplicated points are not reconstructed for the current atlas, where a duplicated point is a point with the same 2D and 3D geometry coordinates as another point from a lower index map. asps_remove_duplicatepoint_enabled_flag equal to 0 indicates that all points are reconstructed.

asps_pixel_deinterleaving_enabled_flag equal to 1 indicates that the decoded geometry and attribute videos for the current atlas contain spatially interleaved pixels from two maps. asps_pixel_deinterleaving_flag equal to 0 indicates that the decoded geometry and attribute videos correspond-ing to the current atlas contain pixels from only a single map.

For example, when the value of asps_pixel_deinterleaving_enabled_flag is 1, the ASPS according to the embodiments may include asps_pixel_deinterleaving_map_flag as many as asps_map_count_minus1 plus 1.

asps_map_count_minus1 plus 1 indicates the number of maps that may be used for encoding the geometry and attribute data for the current atlas)

asps_pixel_deinterleaving_map_flag equal to 1 indicates that decoded geometry and attribute videos corresponding to a map with index i in the current atlas contain spatially interleaved pixels corresponding to two maps. asps_pixel_deinterleaving_map_flag[i] equal to 0 indicates that decoded geometry and attribute videos corresponding to the map index i in the current atlas contain pixels corresponding to a single map.

asps_patch_precedence_order_flag equal to 1 indicates that patch precedence for the current atlas is the same as the decoding order. asps_patch_precedence_order_flag equal to 0 indicates that patch precedence for the current atlas is the reverse of the decoding order.

asps_patch_size_quantizer_present_flag equal to 1 indicates that the patch size quantization parameters are present in an atlas tile group header. asps_patch_size_quantizer_present_flag equal to 0 indicates that the patch size quantization parameters are not present.

asps_eom_patch_enabled_flag equal to 1 indicates that the decoded occupancy map video for the current atlas contains information related to whether intermediate depth positions between two depth maps are occupied. asps_eom_patch_enabled_flag equal to 0 indicates that the decoded occupancy map video does not contain information related to whether intermediate depth positions between two depth maps are occupied.

When the value of asps_eom_patch_enabled_flag is 1, the ASPS according to the embodiments may further include asps auxiliary video enabled flag.

asps_point_local_reconstruction_enabled_flag equal to 1 indicates that point local reconstruction mode information may be present in the bitstream for the current atlas. asps_point_local_reconstruction_enabled_flag equal to 0 indicates that no information related to the point local reconstruction mode is present in the bitstream for the current atlas.

When the value of asps_eom_patch_enabled_flag is 0, the ASPS according to the embodiments may further include asps_eom_fix_bit_count_minus1.

asps_eom_fix_bit_count_minus1 plus 1 indicates the size in bits of the EOM codeword.

When the value of asps_point_local_reconstruction_enabled_flag is 1, the ASPS according to the embodiments may further include asps point local reconstruction information.

asps_point_local_reconstruction_information includes the point local reconstruction mode information to support the missed point reconstruction at the decoder side.

When the value of asps_pixel_deinterleaving_enabled_flag or asps_point_local_reconstruction_enabled_flag is 1, the ASPS according to the embodiments may include asps_surface_thickness_minus1.

asps_surface_thickness_minus1 plus 1 specifies the maximum absolute difference between an explicitly coded depth value and interpolated depth value when asps_pixel_deinterleaving_enabled_flag or asps_point_local_reconstruction_enabled_flag is equal to 1.

asps_vui_parameters_present_flag equal to 1 specifies that the vui_parameters( ) syntax structure is present. asps_vui_parameters_present_flag equal to 0 specifies that the vui_parameters( ) syntax structure is not present.

asps_extension_flag equal to 0 specifies that no asps_extension_data_flag syntax elements are present in the ASPS RBSP syntax structure.

asps_extension_data_flag may have any value.

rbsp_trailing_bits is used for the purpose of filling the remaining bits with 0 for byte alignment after adding 1, which is a stop bit, to indicate the end of RBSP data.

FIG. 31 shows exemplary syntax of an atlas frame parameter set according to embodiments.

The atlas frame parameter set according to the embodiments shown in FIG. 31 represents, for example, the AFPS shown in FIG. 29 and described in the corresponding paragraph.

The atlas frame parameter set according to the embodiments shown in FIG. 31 may be generated by the point cloud video encoder 10002 of FIG. 1, the auxiliary patch info compressor 40005 of FIG. 4, the encoding device 100 of FIG. 15, the patch generator 18000 of FIG. 18, the video encoder 20002 and the image encoder 20003 of FIGS. 20 and 21, or the like.

The atlas frame parameter set (AFPS) according to the embodiments contains a syntax structure containing syntax elements that apply to zero or more entire coded atlas frames.

The AFPS according to the embodiments may further contain afps_atlas_frame_parameter_set_id, afps_atlas_sequence_parameter_set_id, atlas_frame_tile_information( ), afps_output_flag_present_flag, afps_num_ref_idx_default_active_minus1, afps_additional_lt_afoc_lsb_len, afps_3d_pos_x_bit_count_minus1, afps_3d_pos_y_bit_count_minus1, afps_lod_mode_enabled_flag, afps_override_eom_for_depth_flag, afps_raw_3d_pos_bit_count_explicit_mode_flag, afps_fixed_camera_model_flag, and/or afps_extension_flag.

afps_atlas_frame_parameter_set_id identifies the atlas frame parameter set for reference by other syntax elements.

afps_atlas_sequence_parameter_set_id specifies the value of asps_atlas_sequence_parameter_set_id for the active atlas sequence parameter set.

afps_output_flag_present_flag equal to 1 indicates that the atgh_frame_output_flag syntax element is present in the associated tile group headers. afps_output_flag_present_flag equal to 0 indicates that the atgh_frame_output_flag syntax element is not present in the associated tile group headers.

afps_num_ref_idx_default_active_minus1 plus 1 specifies the inferred value of the variable NumRefIdxActive for the tile group with atgh_num_ref_idx_active_override_flag equal to 0.

afps_additional_lt_afoc_lsb_len specifies the value of the variable MaxLtAtlasFrmOrderCntLsb that is used in the decoding process for the reference atlas frame.

afps_3d_pos_x_bit_count_minus1 plus 1 specifies the number of bits in the fixed-length representation of pdu_3d_pos_x[j] of patch with index j in an atlas tile group that refers to afps_atlas_frame_parameter_set_id.

afps_3d_pos_y_bit_count_minus1 plus 1 specifies the number of bits in the fixed-length representation of pdu_3d_pos_y[j] of patch with index j in an atlas tile group that refers to afps_atlas_frame_parameter_set_id.

afps_lod_mode_enabled_flag equal to 1 indicates that the LOD parameters may be present in a patch. afps_lod_mode_enabled_flag equal to 0 indicates that the LOD parameters are not be present in a patch.

afps_override_eom_for_depth_flag equal to 1 indicates that the values of afps_eom_number_ofpatch_bit_count_minus1 and afps_eom_max_bit_count_minus1 are explicitly present in the bitstream. afps_override_eom_for_depth_flag equal to 0 indicates that the values of afps_eom_number_ofpatch_bit_count_minus1 and afps_eom_max_bit_count_minus1 are implicitly derived.

afps_raw_3d_pos_bit_count_explicit_mode_flag equal to 1 indicates that the number of bits in the fixed-length representation of rpdu_3d_pos_x, rpdu_3d_pos_y, and rpdu_3d_pos_z is explicitly coded by atgh_raw_3d_pos_axis_bit_count_minus1 in the atlas tile group header.

afps_extension_flag equal to 0 specifies that no afps_extension_data_flag_syntax elements are present in the AFPS RBSP syntax structure.

afps_extension_data_flag may have any value.

When the value of afps_override_eom_for_depth_flag is 1, the AFPS according to the embodiments may further contain afps_eom_number_ofpatch_bit_count_minus1 and/or afps_eom_max_bit_count_minus1.

afps_eom_number_ofpatch_bit_count_minus1 plus 1 specifies the number of bits used to represent the number of geometry patches associated with an EOM attribute patch in an atlas frame that is associated with this atlas frame parameter set.

afps_eom_max_bit_count_minus1 plus 1 specifies the number of bits used to represent the number of EOM points per geometry patch associated with an EOM attribute patch in an atlas frame that is associated with this atlas frame parameter set.

FIG. 32 shows exemplary syntax of atlas frame tile information according to embodiments.

Atlas frame tile information (AFTI) according to the embodiments represents atlas_frame_tile_information( ) shown/described with reference to FIG. 31.

The AFTI according to the embodiments may include afti_single_tile_in_atlas_frame_flag.

afti_single_tile_in_atlas_frame_flag equal to 1 specifies that there is only one tile in each atlas frame referring to the AFPS. afti_single_tile_in_atlas_frame_flag equal to 0 specifies that there is more than one tile in each atlas frame referring to the AFPS.

When the value of afti_single_tile_in_atlas_frame_flag is 0 (or when there are two or more tiles in each atlas frame referring to the AFPS, the AFTI according to the embodiments may include afti_uniform_tile_spacing_flag, afti_single_tile_per_tile_group_flag, and/or afti_signalled_tile_group_flag.

afti_uniform_tile_spacing_flag equal to 1 specifies that tile column and row boundaries are distributed uniformly across the atlas frame and may be signaled using the syntax elements, afti_tile_cols_width_minus1 and afti_tile_rows_height_minus1, respectively. afti_uniform_tile_spacing_flag equal to 0 specifies that tile column and row boundaries may or may not be distributed uniformly across the atlas frame and may be signaled using the syntax elements afti_num_tile_columns_minus1 and afti_num_tile_rows_minus1 and a list of syntax element pairs afti_tile_column_width_minus1 [i] and afti_tile_row_height_minus1 [i].

When the value of afti_uniform_tile_spacing_flag is 1, the AFTI according to the embodiments may further include afti_tile_cols_width_minus1 and/or afti_tile_cols_width_minus1.

afti_tile_cols_width_minus1 plus 1 specifies the width of the tile columns excluding the rightmost tile column of the atlas frame in units of 64 samples.

afti_tile_rows_height_minus1 plus 1 specifies the height of the tile rows excluding the bottom tile row of the atlas frame in units of 64 samples.

When the value of afti_uniform_tile_spacing_flag is 0, the AFTI according to the embodiments may include afti_num_tile_columns_minus1, afti_num_tile_rows_minus1, afti_tile_column_width_minus1, and/or afti_tile_row_height_minus1.

afti_num_tile_columns_minus1 plus 1 specifies the number of tile columns partitioning the atlas frame.

afti_num_tile_rows_minus1 specifies the number of tile rows partitioning the atlas frame.

afti_tile_column_width_minus1[i] plus 1 specifies the width of the i-th tile column in units of 64 samples.

afti_tile_row_height_minus1 [i] plus 1 specifies the height of the i-th tile row in units of 64 samples.

afti_single_tile_per_tile_group_flag equal to 1 specifies that each tile group that refers to this AFPS includes one tile. afti_single_tile_per_tile_group_flag equal to 0 specifies that a tile group that refers to this AFPS may include more than one tile.

When the value of afti_single_tile_per_tile_group_flag is 0, that is, when each tile group referring to the AFPS contains more than one tile, the AFTI includes afti_num_tile_groups_in_atlas_frame_minus1, afti_top_left_tile_idx, afti_bottom_right_tile_idx_delta, and afti_signalled_tile_group_id_flag.

afti_num_tile_groups_in_atlas_frame_minus1 plus 1 specifies the number of tile groups in each atlas frame referring to the AFPS.

afti_top_left_tile_idx[i] specifies the tile index of the tile located at the top-left corner of the i-th tile group.

afti_bottom_right_tile_idx_delta[i] specifies the difference between the tile index of the tile located at the bottom-right corner of the i-th tile group and afti_top_left_tile_idx[i].

afti_signalled_tile_group_id_flag equal to 1 specifies that the tile group ID for each tile group is signaled.

When the value of afti_signalled_tile_group_id_flag is 1, that is, when the tile group ID for each tile group is signaled, the AFTI according to the embodiments may further include afti_signalled_tile_group_id_length_minus1 and/or afti_tile_group_id.

afti_signalled_tile_group_id_length_minus1 plus 1 specifies the number of bits used to represent the syntax element afti_tile_group_id[i] when present, and the syntax element atgh_address in tile group headers.

afti_tile_group_id[i] specifies the tile group ID of the i-th tile group. The length of the afti_tile_group_id[i] syntax element is afti_signalled_tile_group_id_length_minus1+1 bits.

FIG. 33 shows exemplary syntax of an atlas adaptation parameter set and atlas camera parameters according to embodiments.

The atlas adaptation parameter set according to the embodiments shown in FIG. 31 represents, for example, the AAPS shown in FIG. 29 and described in the corresponding paragraph.

The atlas camera parameters according to the embodiments shown in FIG. 33 may be contained in the atlas adaptation parameter set according to the embodiments.

The atlas adaptation parameter set shown in FIG. 33 may be generated by the point cloud video encoder 10002 of FIG. 1, the auxiliary patch info compressor 40005 of FIG. 4, the encoding device 100 of FIG. 15, the patch generator 18000 of FIG. 18, the video encoder 20002 and the image encoder 20003 of FIGS. 20 and 21, or the like.

An atlas adaptation parameter set (AAPS) RBSP according to embodiments includes parameters that can be referred to by the coded tile group NAL units of one or more coded atlas frames. At most one AAPS RBSP is considered active at any given moment during the operation of the decoding process, and the activation of any particular AAPS RBSP results in the deactivation of the previously-active AAPS RBSP.

The AAPS according to the embodiments may contain aaps_atlas_adaptation_parameter_set_id, aaps_camera_parameters_present_flag, and/or aaps_extension_flag.

aaps_atlas_adaptation_parameter_set_id identifies the atlas adaptation parameter set for reference by other syntax elements.

aaps_camera_parameters_present_flag equal to 1 specifies that camera parameters are present in the current AAPS. aaps_camera_parameters_present_flag equal to 0 specifies that camera parameters for the currrent AAPS are not be present.

When the value of aaps_camera_parameters_present_flag is 1, the AAPS may further contain atlas_camera_parameters( ) according to embodiments.

atlas_camera_parameters( ) according to the embodiments may contain acp_camera_model.

acp_camera_model indicates the camera model for point cloud frames that are associated with the current adaptation parameter set as listed in the table below.

| acp_camera_model | Name of acp_camera_model |
|---|---|
| 0 | UNSPECIFIED |
| 1 | Orthographic camera model |
| 2-255 | RESERVED |

When the value of acp_camera_model is 1, that is, when the camera model for the point cloud frames associated with the adaptation parameter set is the orthographic camera model, the ACP according to the embodiments may include acp_scale_enabled_flag, acp_offset_enabled_flag, and/or acp_rotation_enabled_flag.

acp_scale_enabled_flag equal to 1 indicates that scale parameters for the current camera model are present. acp_scale_enabled_flag equal to 0 indicates that scale parameters for the current camera model are not present.

When the value of acp_scale_enabled_flag is 1, the ACP according to the embodiments may further contain a scale parameter for the current camera model, for example, acp_scale_on_axis.

acp_scale_on_axis[d] specifies the value of the scale, Scale[d], along the d axis for the current camera model. The value of d may be in the range of 0 to 2, inclusive, with the values of 0, 1, and 2 corresponding to the X, Y, and Z axis, respectively.

acp_offset_enabled_flag equal to 1 indicates that offset parameters for the current camera model are present. acp_offset_enabled_flag equal to 0 indicates that offset parameters for the current camera model are not present.

When the value of acp_offset_enabled_flag is 1, the ACP according to the embodiments may further include a scale parameter for the current camera model, for example, acp_offset_on_axis[d].

acp_offset_on_axis[d] indicates the value of the offset, Offset[d], along the d axis for the current camera model where d is in the range of 0 to 2, inclusive. The values of d equal to 0, 1, and 2 correspond to the X, Y, and Z axis, respectively.

acp_rotation_enabled_flag equal to 1 indicates that rotation parameters for the current camera model are present. acp_rotation_enabled_flag equal to 0 indicates that rotation parameters for the current camera model are not present.

When the value of acp_rotation_enabled_flag is 1, the ACP may include acp_rotation_qx, acp_rotation_qy, and acp_rotation_qz.

acp_rotation_qx specifies the x component, qX, for the rotation of the current camera model using the quaternion representation.

acp_rotation_qy specifies the y component, qY, for the rotation of the current camera model using the quaternion representation.

acp_rotation_qz specifies the z component, qZ, for the rotation of the current camera model using the quaternion representation.

aaps_extension_flag equal to 0 specifies that no aaps_extension_data_flag syntax elements are present in the AAPS RBSP syntax structure.

aaps_extension_data_flag may have any value.

FIG. 34 shows atlas tile group layer information according to embodiments.

The atlas tile group layer information according to the embodiments shown in FIG. 34 represents, for example, the atlas tile group layer shown in FIG. 29 and described in the corresponding paragraph.

The atlas tile group layer according to the embodiments shown in FIG. 34 may be generated by the point cloud video encoder 10002 of FIG. 1, the auxiliary patch info compressor 40005 of FIG. 4, the encoding device 100 of FIG. 15, the patch generator 18000 of FIG. 18, the video encoder 20002 and the image encoder 20003 of FIGS. 20 and 21, or the like.

The atlas tile group layer according to the embodiments may contain atlas_tile_group_header( ).

atlas_tile_group_header( ) according to the embodiments may contain atgh_atlas_frame_parameter_set_id, atgh_atlas_adaptation_parameter_set_id, atgh_address, atgh_type, atgh_atlas_frm_order_cnt_lsb, and atgh_additional_afoc_lsbpresent_flag.

atgh_atlas_frame_parameter_set_id specifies the value of afps_atlas_frame_parameter_set_id for the active atlas frame parameter set for the current atlas tile group.

atgh_atlas_adaptation_parameter_set_id specifies the value of aaps_atlas_adaptation_parameter_set_id for the active atlas adaptation parameter set for the current atlas tile group.

atgh_address specifies the tile group address of the tile group. When not present, the value of atgh_address is inferred to be equal to 0. The tile group address is the tile group ID of the tile group. The length of atgh_address is afti_signalled_tile_group_id_length_minus1+1 bits. If afti_signalled_tile_group_id_flag is equal to 0, the value of atgh_address is in the range of 0 to afti_num_tile_groups_in_atlas_frame_minus1, inclusive. Otherwise, the value of atgh_address is in the range of 0 to $2^{(afti\_signalled\_tile\_group\_id\_length\_minus1+1)}-1$, inclusive.

atgh_type specifies the coding type of the current atlas tile group according to the table below.

| atgh_type | Name of atgh_type |
|---|---|
| 0 | P_TILE_GRP (Inter atlas tile group) |
| 1 | I_TILE_GRP (Intra atlas tile group) |
| 2 | SKIP_TILE_GRP (SKIP atlas tile group) |
| 3-... | RESERVED | atgh_atlas_output_flag affects the decoded atlas output and removal processes.

atgh_atlas_frm_order_cnt_lsb specifies the atlas frame order count modulo MaxAtlasFrmOrderCntLsb for the current atlas tile group.

atgh_ref_atlas_frame_list_sps_flag equal to 1 specifies that the reference atlas frame list of the current atlas tile group is derived based on one of the ref_list_struct(rlsIdx) syntax structures in the active ASPS. atgh_ref_atlas_frame_list_sps_flag equal to 0 specifies that the reference atlas frame list of the current atlas tile list is derived based on the ref_list_struct(rlsIdx) syntax structure that is directly included in the tile group header of the current atlas tile group.

atgh_ref_atlas_frame_list_idx specifies the index, into the list of the ref_list_struct(rlsIdx) syntax structures included in the active ASPS, of the ref_list_struct(rlsIdx) syntax structure that is used for derivation of the reference atlas frame list for the current atlas tile group.

atgh_additional_afoc_lsbpresent_flag[j] equal to 1 specifies that atgh_additional_afoc_lsb_val[j] is present for the current atlas tile group. atgh_additional_afoc_lsbpresent_flag[j] equal to 0 specifies that atgh_additional_afoc_lsb_val [j] is not present.

atgh_additional_afoc_lsb_val[j] specifies the value of FullAtlasFrmOrderCntLsbLt[RlsIdx][j] for the current atlas tile group.

atghpos_min_z_quantizer specifies the quantizer that is to be applied to the pdu_3d_pos_min_z[p] value of the patch p. If atghpos_min_z_quantizer is not present, the value thereof is inferred to be equal to 0.

atgh_pos_delta_max_z_quantizer specifies the quantizer that is to be applied to the pdu_3d_pos_delta_max_z[p] value of the patch with index p. If atgh_pos_delta_max_z_quantizer is not present, the value thereof is inferred to be equal to 0.

atgh_patch_size_x_info_quantizer specifies the value of the quantizer PatchSizeXQuantizer that is to be applied to the variables pdu_2d_size_x_minus1[p], mpdu_2d_delta_size_x[p], ipdu_2d_delta_size_x[p], rpdu_2d_size_x_minus1 [p], and epdu_2d_size_x_minus1 [p] of a patch with index p. If atgh_patch_size_x_info_quantizer is not present, the value thereof may be inferred to be equal to asps_log 2patch_packing_block_size.

atgh_patch_size_y_info_quantizer specifies the value of the quantizer PatchSizeYQuantizer that is to be applied to the variables pdu_2d_size_y minus1[p], mpdu_2d_delta_size_y[p], ipdu_2d_delta_size_y[p], rpdu_2d size_y minus1 [p], and epdu_2d_size_y_minus1[p] of a patch with index p. If atgh_patch_size_y_info_quantizer is not present, the value thereof may be inferred to be equal to asps_log 2_patch_packing_block_size.

atgh_raw_3d_pos_axis_bit_count_minus1 plus 1 specifies the number of bits in the fixed-length representation of rpdu_3d_pos_x, rpdu 3d_pos_y, and rpdu_3d_pos_z.

atgh_num_ref_idx_active_override_flag equal to 1 specifies that the syntax element atgh_num_ref_idx_active_minus1 is present for the current atlas tile group. atgh_num_ref_idx_active_override_flag equal to 0 specifies that the syntax element atgh_num_ref_idx_active_minus1 is not present. If atgh_num_ref_idx_active_override_flag is not present, the value thereof may be inferred to be equal to 0.

atgh_num_ref_idx_active_minus1 specifies the maximum reference index for reference in the atlas frame list that may be used to decode the current atlas tile group. When the value of NumRefIdxActive is equal to 0, no reference index for the reference atlas frame list may be used to decode the current atlas tile group.

FIG. 35 shows reference list structure information according to embodiments.

The reference list structure (ref_list_struct( )) according to the embodiments may represent, for example, ref_list_struct( ) shown in FIG. 34.

ref_list_struct( ) according to the embodiments may have an identifier (rlsIdx) for identifying a reference list structure as a parameter.

ref_list_struct( ) according to the embodiments may include num_ref_entries.

num_ref_entries specifies the number of entries in the ref_list_struct(rlsIdx) syntax structure.

ref_list_struct( ) according to the embodiments may further include st_ref_atlas_frame_flag, abs_delta_afoc_st, and/or afoc_lsb_lt as many as the value of num_ref_entries, namely, the number of entries.

st_ref_atlas_frame_flag[rlsIdx][i] equal to 1 specifies that the i-th entry in the ref_list_struct(rlsIdx) syntax structure is a short term reference atlas frame entry. st_ref_atlas_frame_flag[rlsIdx][i] equal to 0 specifies that the i-th entry in the ref_list_struct(rlsIdx) syntax structure is a long term reference atlas frame entry. When not present, the value of st_ref_atlas_frame_flag[rlsIdx][i] may be inferred to be equal to 1.

When the i-th entry is the first short term reference atlas frame entry in ref_list_struct(rlsIdx) syntax structure, abs_delta_afoc_st[rlsIdx][i] specifies the absolute difference between the atlas frame order count values of the current atlas tile group and the atlas frame referred to by the i-th entry. When the i-th entry is a short term reference atlas frame entry but not the first short term reference atlas frame entry in the ref_list_struct(rlsIdx) syntax structure, abs_delta_afoc_st[rlsIdx][i] specifies the absolute difference between the atlas frame order count values of the atlas frames referred to by the i-th entry and by the previous short term reference atlas frame entry in the ref_list_struct(rlsIdx) syntax structure.

strpf_entry_sign_flag[rlsIdx][i] equal to 1 specifies that i-th entry in the syntax structure_ref_list_struct(rlsIdx) has a value greater than or equal to 0. strpf_entry_sign_flag[rlsIdx][i] equal to 0 specifies that the i-th entry in the syntax structure ref_list_struct(rlsIdx) has a value less than 0. When not present, the value of strpf_entry_sign_flag[rlsIdx][i] may be inferred to be equal to 1.

afoc_lsb_lt[rlsIdx][i] specifies the value of the atlas frame order count modulo MaxAtlasFrmOrderCntLsb of the atlas frame referred to by the i-th entry in the ref_list_struct (rlsIdx) syntax structure. The length of the afoc_lsb_lt [rlsIdx][i] syntax element is asps_log 2_max_atlas_frame_order_cnt_lsb_minus4+4 bits.

FIG. 36 shows an atlas tile group data unit according to embodiments.

The atlas tile group data unit according to the embodiments represents the atlas tile group data unit (atlas_tile_group_data_unit) included in the atlas tile group layer information shown in FIG. 34.

The atlas_tile_group_data_unit according to the embodiments includes atgdu_patch_mode[p].

atgdu_patch_mode[p] indicates the patch mode for the patch with index p in the current atlas tile group. A tile group with atgh_type=SKIP_TILE_GRP implies that the entire tile group information is copied directly from the tile group with the same atgh_address as that of the current tile group that corresponds to the first reference atlas frame.

Patch mode types for atlas tile groups of type I TILE GRP may be specified as follows.

| atgdu_patch_mode | Identifier | Description |
| --- | --- | --- |
| 0 | I_INTRA | Non-predicted Patch mode |
| 1 | I_RAW | RAW Point Patch mode |
| 2 | I_EOM | EOM Point Patch mode |
| 3-13 | I_RESERVED | Reserved modes |
| 14 | I_END | Patch termination mode |

Patch mode types for atlas tile groups of type P TILE GRP may be specified as follows.

| atgdu_patch_mode | Identifier | Description |
| --- | --- | --- |
| 0 | P_SKIP | Patch Skip mode |
| 1 | P_MERGE | Patch Merge mode |
| 2 | P_INTER | Inter predicted Patch mode |
| 3 | P_INTRA | Non-predicted Patch mode |

-continued

| atgdu_patch_mode | Identifier | Description |
|---|---|---|
| 4 | P_RAW | RAW Point Patch mode |
| 5 | P_EOM | EOM Point Patch mode |
| 6-13 | P_RESERVED | Reserved modes |
| 14 | P_END | Patch termination mode |

Patch mode types for atlas tile groups of type SKIP_TILE_GRP may be specified as follows.

| atgdu_patch_mode | Identifier | Description |
|---|---|---|
| 0 | P_SKIP | Patch Skip mode |

The atlas_tile_group_data_unit according to the embodiments may further include patch information data (patch_information_data( )) according to embodiments.

For example, the patch information data (patch_information_data( )) may have a syntax structure as follows.

```
                                                              Descriptor
patch_information_data (patchIdx, patchMode ) {
    if( atgh_type == SKIP_TILE_GR )
        skip_patch_data_unit( patchIdx )
    else if( atgh_type == P_TILE_GR ) {
        if( patchMode == P_SKIP )
            skip_patch_data_unit( patchIdx )
        else if( patchMode == P_MERGE )
            merge_patch_data_unit( patchIdx )
        else if( patchMode == P_INTRA )
            patch_data_unit( patchIdx )
        else if( patchMode == P_INTER )
            inter_patch_data_unit( patchIdx )
        else if( patchMode == P_RAW )
            raw_patch_data_unit( patchIdx )
        else if( patchMode == P_EOM )
            eom_patch_data_unit( patchIdx )
    }
    else if( atgh_type == I_TILE_GR ) {
        if( patchMode == I_INTRA )
            patch_data_unit( patchIdx )
        else if( patchMode == I_RAW )
            raw_patch_data_unit( patchIdx )
        else if( patchMode == I_EOM )
            eom_patch_data_unit( patchIdx )
    }
}
```

The patch information data (patch_information_data( )) according to the embodiments may include a patch data unit. An example of the patch data unit is shown in FIG. 37.

FIG. 37 shows exemplary syntax of a patch data unit according to embodiments.

pdu_2d_pos_x[p] specifies the x-coordinate (or left offset) of the top-left corner of the patch bounding box for patch p in the current atlas tile group, tileGroupIdx, expressed as a multiple of PatchPackingBlockSize.

pdu_2d_pos_y[p] specifies the y-coordinate (or top offset) of the top-left corner of the patch bounding box for patch p in the current atlas tile group, tileGroupIdx, expressed as a multiple of PatchPackingBlockSize.

pdu_2d_size_x_minus1 [p] plus 1 specifies the quantized width value of the patch with index p in the current atlas tile group, tileGroupIdx.

pdu_2d_size_y_minus1 [p] plus 1 specifies the quantized height value of the patch with index p in the current atlas tile group, tileGroupIdx.

pdu_3d_pos_x[p] specifies the shift to be applied to the reconstructed patch points in patch with index p of the current atlas tile group along the tangent axis.

pdu_3d_pos_y[p] specifies the shift to be applied to the reconstructed patch points in patch with index p of the current atlas tile group along the bitangent axis.

pdu_3d_pos_min_z[p] specifies the shift to be applied to the reconstructed patch points in patch with index p of the current atlas tile group along the normal axis.

pdu_3d_pos_delta_max_z[p], if present, specifies the nominal maximum value of the shift expected to be present in the reconstructed bitdepth patch geometry samples, after conversion to their nominal representation, in patch with index p of the current atlas tile group along the normal axis.

pdu_projection_id[p] specifies the values of the projection mode and of the index of the normal to the projection plane for the patch with index p of the current atlas tile group.

pdu_orientation_index[p] indicates the patch orientation index for the patch with index p of the current atlas tile group as the below.

The orientation index according to the embodiments may be specified as follows.

| x | Identifier | Rotation( x ) | Offset( x ) |
|---|---|---|---|
| 0 | FPO_NULL | $\begin{bmatrix} 1 & 0 \\ 0 & 1 \end{bmatrix}$ | $\begin{bmatrix} 0 \\ 0 \end{bmatrix}$ |
| 1 | FPO_SWAP | $\begin{bmatrix} 0 & 1 \\ 1 & 0 \end{bmatrix}$ | $\begin{bmatrix} 0 \\ 0 \end{bmatrix}$ |
| 2 | FPO_ROT90 | $\begin{bmatrix} 0 & -1 \\ 1 & 0 \end{bmatrix}$ | $\begin{bmatrix} Patch2dSizeY[p]-1 \\ 0 \end{bmatrix}$ |
| 3 | FPO_ROT180 | $\begin{bmatrix} -1 & 0 \\ 0 & -1 \end{bmatrix}$ | $\begin{bmatrix} Patch2dSizeX[p]-1 \\ Patch2dSizeY[p]-1 \end{bmatrix}$ |
| 4 | FPO_ROT270 | $\begin{bmatrix} 0 & 1 \\ -1 & 0 \end{bmatrix}$ | $\begin{bmatrix} 0 \\ Patch2dSizeX[p]-1 \end{bmatrix}$ |
| 5 | FPO_MIRROR | $\begin{bmatrix} -1 & 0 \\ 0 & 1 \end{bmatrix}$ | $\begin{bmatrix} Patch2dSizeX[p]-1 \\ 0 \end{bmatrix}$ |
| 6 | FPO_MROT90 | $\begin{bmatrix} 0 & -1 \\ -1 & 0 \end{bmatrix}$ | $\begin{bmatrix} Patch2dSizeY[p]-1 \\ Patch2dSizeX[p]-1 \end{bmatrix}$ |
| 7 | FPO_MROT180 | $\begin{bmatrix} 1 & 0 \\ 0 & -1 \end{bmatrix}$ | $\begin{bmatrix} 0 \\ Patch2dSizeY[p]-1 \end{bmatrix}$ | pdu_lod_enabled_flag[p] equal to 1 specifies that the LOD parameters are present for the current patch p. pdu_lod_enabled_flag[p] equal to 0 specifies that no LOD parameters are present for the current patch.

pdu_lod_scale_x_minus1 [p] specifies the LOD scaling factor to be applied to the local x coordinate of a point in a patch with index p of the current atlas tile group, prior to its addition to the patch coordinate Patch3dPosX[p].

pdu_lod_scale_y[p] specifies the LOD scaling factor to be applied to the local y coordinate of a point in a patch with index p of the current atlas tile group, prior to its addition to the patch coordinate Patch3dPosY[p].

The point cloud data transmission device according to the embodiments transmits a V-PCC bitstream of the structure shown in FIGS. 24 to 37, thereby enabling the transmitter to effectively perform multiplexing. Due to this structure, the point cloud data may provide an efficient access to the bitstream in units of V-PCC units for the reception device. In addition, with this configuration, the transmission device may provide an effect of effectively storing and transmitting the atlas stream of the V-PCC bitstream in a track in a file.

SEI messages/information for data processing and rendering in the V-PCC bit stream may be effectively stored and transmitted in a file.

Figure 38:
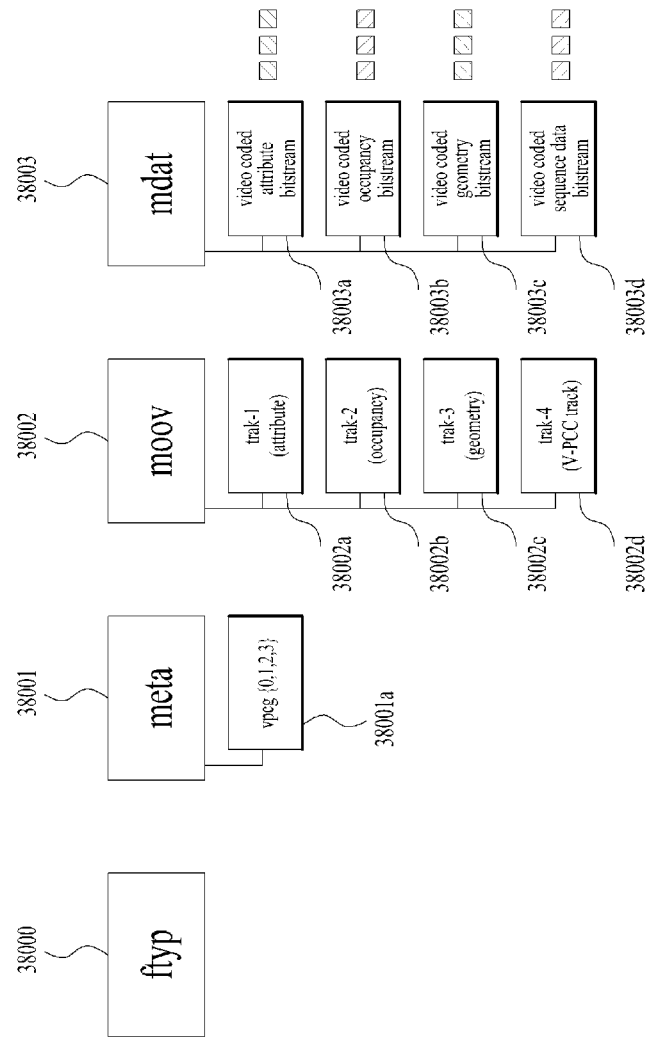
FIG. 38 shows a structure of a file carrying point cloud data according to embodiments.

FIG. 38 shows a structure of a file carrying point cloud data according to embodiments.

The file according to the embodiments shown in FIG. 38 may be, for example, a file according to the ISOBMFF format. The file according to the embodiments may be generated by, for example, the file/segment encapsulation module 10003 of FIG. 1 or the file/segment encapsulator 20004, 21009 of FIGS. 20 and 21. The file according to the embodiments may include a V3C bitstream according to the embodiments shown in FIGS. 24 and/or 25. The file according to the embodiments may include some or all of the parameters shown in FIGS. 26 to 37. The file according to the embodiments contains point cloud data according to embodiments.

Point cloud data according to the embodiments may be in a format of an ISOBMFF file. The ISOBMFF file may be composed of objects called boxes. That is, all data may be contained in one or more boxes.

A box may include a box header, which may include a size and a type of the box. The point cloud data according to the embodiments may include an ftyp box 38000 whose box type is 'ftyp', a meta box 38001 whose box type is 'meta', a moov box 38002 whose box type is 'moov', and an mdat box 38003 whose box type is 'mdat'.

The ftyp box 38000 may contain information indicating the type of the ISOBMFF file according to embodiments.

The meta box 38001 may contain metadata information about the point cloud data according to embodiments.

The moov box 38002 may contain information about one or more tracks in which the point cloud data according to the embodiments is transmitted.

The moov box 38002 according to the embodiments may include a box 38002a containing information about a track for transmitting attribute information of the point cloud data, a box 38002b containing information about a track for transmitting occupancy information of the point cloud data, a box 38002c containing information about a track for transmitting geometry information of the point cloud data, and/or a box 38002d containing information about a track for transmitting V-PCC information of the point cloud data.

The mdat box 38003 may include a point cloud bitstream containing the point cloud data according to embodiments. The point cloud bitstream according to the embodiments may include a video coded attribute bitstream 38003a, a video coded occupancy bitstream 38003b, a video coded geometry bitstream 38003c, and/or a patch sequence data bitstream 38003d.

The video coded attribute bitstream 38003a, the video coded occupancy bitstream 38003b, the video coded geometry bitstream 38003c, and/or the patch sequence data bitstream 38003d according to the embodiments may be carried by one or more video frames.

The video coded attribute bitstream 38003a refers to attribute information of the point cloud data, encoded by the V-PCC encoder according to the embodiments.

The video coded occupancy bitstream 38003b refers to occupancy information of the point cloud data, encoded by the V-PCC encoder according to the embodiments.

The video coded geometry bitstream 38003c refers to geometry information of the point cloud data, encoded by the V-PCC encoder according to the embodiments.

The patch sequence data bitstream 38003d refers to patch sequence data of the point cloud data according to the embodiments.

The 2D video tracks are encoded according to a video encoder according to embodiments.

In the sample entry, an extra box may be inserted which may document the role of the video stream contained in this track, in the V-PCC system.

A track reference may be inserted from the V-PCC patch data track to the video track, to establish the membership of the video track in the specific point cloud based on the patch track.

The track-header flags may be set to 0 to indicate that the track does not contribute directly to the overall layup of the movie, but contributes to the V-PCC system.

Tracks belonging to the same V-PCC sequence are time-aligned. Samples that contribute to the same point cloud frame across the different video-encoded component tracks and the V-PCC track may have the same presentation time.

A V-PCC track may contain sequence parameter sets and samples carrying the payloads of non-video encoded information V-PCC units. Here, the non-video encoded information V-PCC units may mean units whose V-PCC unit types are, for example, VPCC SPS and VPCC_PDG.

This track may also provide track references to other tracks containing samples carrying the payloads of a video compressed V-PCC unit. Here, the other tracks may represent units whose V-PCC unit types are, for example, VPCC_GVD, VPCC_AVD, and VPCC_OVD.

The samples containing video-coded elementary streams for geometry data, which are payloads of V-PCC units of type VPCC_GVD, may be included in one or more video streams.

The samples containing video-coded elementary streams for attribute data, which are payloads of V-PCC units of type VPCC_AVD, may be included in one or more video streams.

The samples containing a video-coded elementary stream for occupancy map data, which are payloads of V-PCC units of type VPCC_OVD, may be included in one or more video streams.

Synchronization between the elementary streams in the component tracks may be handled by the ISO BMFF track timing structures (ctts and cslg, or equivalent mechanisms in movie fragments).

Samples that contribute to the same point cloud frame across different video encoded component tracks and the V-PCC track may have the same composition time. The V-PCC parameter sets used for such samples have a decoding time equal or prior to the composition time of the frame.

Figure 39:
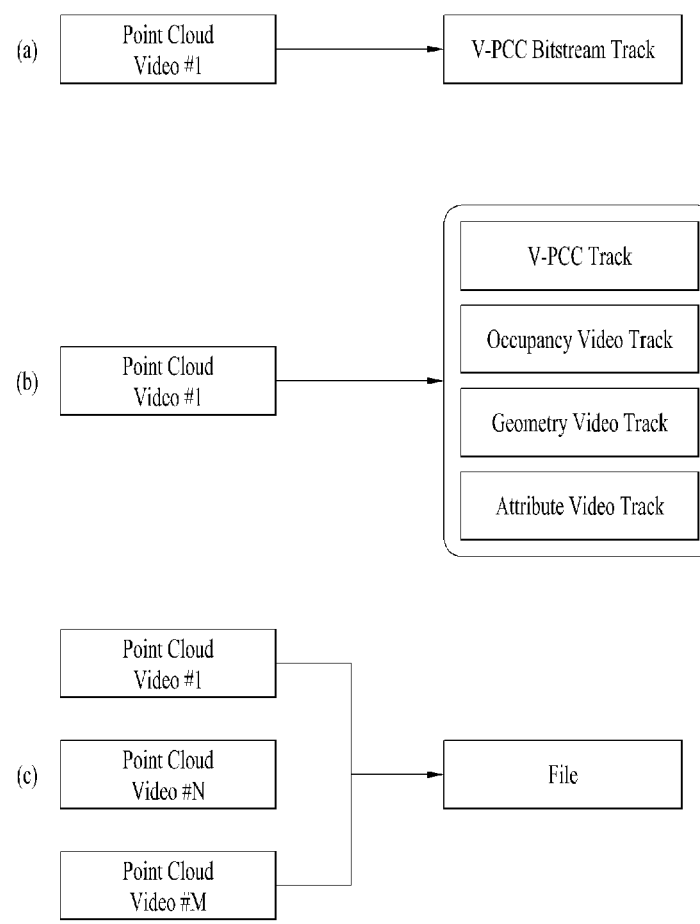
FIG. 39 shows a structure of a file carrying point cloud data according to embodiments.

FIG. 39 shows a structure of a file carrying point cloud data according to embodiments.

The file according to the embodiments shown in FIG. 39 may be, for example, a file according to the ISOBMFF format. The file according to the embodiments may be generated by, for example, the file/segment encapsulation module 10003 of FIG. 1 or the file/segment encapsulator 20004, 21009 of FIGS. 20 and 21. The file according to the embodiments may include a V3C bitstream according to the embodiments shown in FIGS. 24 and/or 25. The file according to the embodiments may include some or all of the parameters shown in FIGS. 26 to 37. The file according to the embodiments contains point cloud data according to embodiments.

FIG. 39(A) illustrates point cloud data carried by one track in a file according to embodiments.

Referring to FIG. 39(A), in the embodiments, the point cloud data (point cloud video #1) may be carried by one V-PCC bitstream track. The V-PCC bitstream track may be referred to as a V3C bitstream track, a V-PCC track, a V3C track, or the like. As shown in FIG. 39(A), encapsulating point cloud data in a single track to be transmitted may be referred to as single-track encapsulation.

Referring to FIG. 39(A), the V3C bitstream according to the embodiments shown in FIGS. 24 and/or 25 may be contained in samples for a single V3C track or in a metadata box or the like for the V3C track.

FIG. 39(B) illustrates point cloud data carried by multiple tracks in a file according to embodiments.

Referring to FIG. 39(B), a single file includes multiple tracks. The multiple tracks may include, for example, a track related to parameters, patches, atlases, and the like of the point cloud data (e.g., a V-PCC track), an occupancy map related track (e.g., an occupancy video track), a geometry video related track (e.g., a geometry video track), and/or an attribute video related track (an attribute video track). That is, one or more point cloud videos or images may be stored in a single file. Encapsulating a file of this structure may be referred to as multi-track encapsulation. For example, the structure of the file shown in FIG. 38 may be a multi-track encapsulated file.

Referring to FIG. 39(C), a file according to the embodiments may contain point cloud videos according to embodiments. The file according to the embodiments may contain a point cloud video and/or one or more point cloud images according to embodiments. The point cloud video (or image) may represent one or more objects constituting point cloud data, or may be a frame constituting point cloud data in a specific time period.

The point cloud data reception device according to embodiments may play back point cloud data in the file. The point cloud data reception device may play back some or all of the point cloud data at the same time. The file according to the embodiments is required to provide grouping information about point cloud videos or images that need to be played at the same time. Accordingly, metadata for the point cloud data according to the embodiments may include grouping information for playback and/or control information for playback. The grouping information for playback and/or the control information for playback may not change within the file and may change over time.

There may be various methods of encapsulating and transmitting (V-PCC) point cloud data according to embodiments, that is, V-PCC systems (V3C systems). Hereinafter, an exemplary method of encapsulating and transmitting (V-PCC) point cloud data, that is, an exemplary V-PCC system (V3C system) will be described.

Video-based point cloud compression (V-PCC) represents the volumetric encoding of point cloud visual information. A V-PCC bitstream (including an encoded point cloud sequence (CPCS)) contains V-PCC units (V3C units) according to embodiments, including V3C parameter set data, a coded atlas bitstream, a 2D video coded occupancy map bitstream, a 2D video encoded geometry bitstream, zero or more 2D encoded attribute bitstreams.

First, a volumetric visual media header according to embodiments will be described.

The volumetric visual track may be, for example, a V-PCC track. The volumetric visual track may be identified by a volumetric visual media handler type 'vole' in a Handler Box in a media box and a volumetric visual media header. Multiple volumetric visual tracks may be present in a file.

Box Type: 'vvhd'
Container: MediaInformationBox
Mandatory: Yes
Quantity: Exactly one Volumetric tracks may use the VolumetricVisualMediaHeaderBox in the MediaInformationBox.

```
aligned(8) class VolumetricVisualMediaHeaderBox extends
FullBox('vvhd', version = 0, 1) {
}
```

"version" is an integer that specifies the version of this box.

A V-PCC track sample entry according to embodiments will be described. The V-PCC track sample entry may be contained in the track box in the V-PCC track in the file.

Sample Entry Type: 'vpc1', 'vpcg'
Container: SampleDescriptionBox ('stsd')
Mandatory: A 'vpc1' or 'vpcg' sample entry is mandatory.
Quantity: One or more sample entries may be present.

V-PCC tracks may use VolumetricVisualSampleEntry having a sample entry type 'vpc1' or 'vpcg'. The V-PCC volumetric sample entry according to the embodiments may include VPCCConfigurationBox defined as follows. The VPCCConfigurationBox may include VPCCDecoderConfigurationRecord (V-PCC configuration record box). All data present at the same time in the array of setup vpcc units may be stored in sample_stream_vpcc_units together with ssvu_vpcc_unit_size by configuring a header provided herein.

Volumetric visual tracks shall use the volumetric visual sample entry. The volumetric visual sample entry may be configured as follows.

```
class VolumetricVisualSampleEntry(codingname) extends
SampleEntry (codingname){
    unsigned int(8)[32] compressor_name;
}
``` compressor_name is a name, for informative purposes. This parameter is formatted in a fixed 32-byte field, with the first byte set to the number of bytes to be displayed, followed by that number of bytes of displayable data encoded using UTF-8, and then padding to complete 32 bytes in total.

Hereinafter, a common data structure contained in a V-PCC track (present in the sample entry) or a video-coded V-PCC component track (present in scheme information) according to embodiments will be described.

An example of the V-PCC unit header box will be described.

Headers of V-PCC units (V3C units) according to the embodiments may be encapsulated into a V-PCC unit header box according to embodiments.

The V-PCC unit header box may be present in both the V-PCC track (in the sample entry) and/or all video-coded V-PCC component tracks (e.g., a geometry video track, an attribute video track, an occupancy video track, etc.) (in the scheme information). The V-PCC unit header box includes a V-PCC unit header ("vpcc_unit_header( ) unit_header;") for data carried by the respective tracks.

```
aligned(8) class VPCCUnitHeaderBox extends
FullBox('vunt', version = 0, 0) {
    vpcc_unit_header( ) unit_header;
}
```

An example of the V-PCC decoder configuration box will be described.

The V-PCC decoder configuration box contains VPCC-DecoderConfigurationRecord. The V-PCC decoder configuration box according to the embodiments may have the following syntax.

```
class VPCCConfigurationBox extends Box('vpcC') {
    VPCCDecoderConfigurationRecord( ) VPCCConfig;
}
```

This record may contain a version field. This specification defines version 1 of this record.

```
aligned(8) class VPCCDecoderConfigurationRecord {
    unsigned int(8) configurationVersion = 1;
    unsigned int(2) lengthSizeMinusOne;
    bit(1) reserved = 1;
    unsigned int(5) numOfVPCCParameterSets;
    for (i=0; i < numOfVPCCParameterSets; i++) {
        unsigned int(16) VPCCParameterSetLength;
        vpcc_unit(VPCCParameterSetLength) vpccParameterSet; // as
    defined in ISO/IEC 23090-5
    }
    unsigned int(8) numOfSetupUnitArrays;
    for (j=0; j < numOfSetupUnitArrays; j++) {
        bit(1) array_completeness;
        bit(1) reserved = 0;
        unsigned int(6) NAL_unit_type;
        unsigned int(8) numNALUnits;
        for (i=0; i < numNALUnits; i++) {
            unsigned int(16) SetupUnitLength;
            nal_unit(SetupUnitLength) setupUnit; // as defined in
        ISO/IEC 23090-5 }
    }
}
``` configurationVersion is a version field.

lengthSizeMinusOne plus 1 indicates the length of the NALUnitLength field in a V-PCC sample in the stream to which this configuration record applies. For example, a size of one byte is indicated with a value of 0. The value of this field may be equal to ssnh_unit_size_precision_bytes_minus1 in sample_stream_nal_header( ) for the atlas sub stream.

numOfVPCCParameterSets specifies the number of V-PCC parameter set units signaled in the decoder configuration record.

VPCCParameterSetLength indicates the size of the vpccParameterSet field.

vpccParameterSet indicates a V-PCC unit of type VPCC_VPS carrying vpcc_parameter_set( ) according to the embodiments. The VPCCParameterSet; array according to the embodiments may include vpccParameterSet described above.

numOfSetupUnitArrays indicates the number of arrays of atlas NAL units of the indicated type(s).

array_completeness equal to 1 indicates that all atlas NAL units of the given type are in the following array and none are in the stream. array_completeness equal to 0 indicates that additional atlas NAL units of the indicated type may be in the stream. The default and permitted values may be constrained by the sample entry name.

NAL_unit_type indicates the type of the atlas NAL units in the following array. It may be restricted to take one of the values indicating a NAL_ASPS, NAL_AFPS, NAL_AAPS, NAL_PREFIX_ESEI, NAL_SUFFIX_ESEI, NAL_PREFIX_NSEI, or NAL_SUFFIX_NSEI atlas NAL unit.

numNALUnits indicates the number of atlas NAL units of the indicated type included in the configuration record for the stream to which this configuration record applies. The SEI array may only contain SEI messages.

SetupUnitLength indicates the size, in bytes, of the setupUnit field. This field includes the size of both the NAL unit header and the NAL unit payload, but does not include the length field itself.

setupUnit may contain a NAL unit of type NAL_ASPS, NAL_AFPS, NAL_AAPS, NAL_PREFIX_ESEI, NAL_PREFIX_NSEI, NAL_SUFFIX_ESEI, or NAL_SUFFIX_NSEI. When this field is present, NAL_PREFIX_ESEI, NAL_PREFIX_NSEI, NAL_SUFFIX_ESEI, or NAL_SUFFIX_NSEI may contain SEI messages that provide information on the entire stream. The SEI message may be, for example, user-data SEI.

The setupUnit array may include atlas parameter sets that are constant for the stream referred to by the sample entry in which the decoder configuration record is present. The atlas parameter set according to the embodiments may represent NAL units (or a NAL unit) with NAL_unit_type having NAL_ASPS, NAL_AFPS, and/or NAL_AAPS.

The V-PCC atlas parameter set may be encapsulated in a sample group description entry and stored in a file.

Track grouping means grouping tracks associated with each other.

An entity may represent, for example, a track (timed track, etc.) and/or non-timed items. Non-timed V-PCC data may be referred to as non-timed volumetric data, non-timed V3C data, or the like.

Multi-Track Container for V-PCC Bitstream

Hereinafter, a process of encapsulating a V-PCC bitstream into a multi-track container according to embodiments will be described.

V-PCC units in a V-PCC bitstream according to the embodiments may be mapped to individual tracks based on the V-PCC container. The V-PCC container may represent a multi-track ISOBMFF V-PCC container. Tracks in a multi-track ISOBMFF V-PCC container may be divided into two types: V-PCC track and V-PCC component track.

V-PCC component tracks are restricted video scheme tracks which carry 2D video encoded data for the occupancy map, geometry, and attribute sub-bitstreams of the V-PCC bitstream. The following conditions may be satisfied for V-PCC component tracks:

a) in the sample entry, a new box is inserted which documents the role of the video stream contained in this track, in the V-PCC system;

b) a track reference may be introduced from the V-PCC track, to the V-PCC component track. The membership of the V-PCC component track in the specific point cloud represented by the V-PCC track may be established by the track reference;

c) the track-header flags may be set to 0 to indicate that this track does not contribute directly to the overall layup of the movie but contributes to the V-PCC system.

Tracks belonging to the same V-PCC sequence may be time-aligned. Samples that contribute to the same point cloud frame across the different video-encoded V-PCC component tracks and the V-PCC track may have the same presentation time. The V-PCC atlas sequence parameter sets and atlas frame parameter sets used for such samples may have a decoding time equal or prior to the composition time of the point cloud frame. All tracks belonging to the same V-PCC sequence may have the same implicit or explicit edit lists.

Synchronization between the elementary streams in the component tracks may be handled by the ISOBMFF track timing structures (stts, ctts, and cslg), or equivalent mechanisms in movie fragments.

The sync samples in the V-PCC track and V-PCC component tracks may or may not be time-aligned.

In the absence of time-alignment, random access may involve pre-rolling the various tracks from different sync start-times, to enable starting at the desired time. In the case of time-alignment (e.g. required by a V-PCC profile such as the basic toolset profile as defined in V-PCC), the sync samples of the V-PCC track should be considered as the random access points for the V-PCC content, and random access may be performed by only referencing the sync sample information of the V-PCC track.

Based on this layout, a V-PCC ISOBMFF container may include the following:

1) A V-PCC track which contains V-PCC parameter sets and atlas sub-bitstream parameter sets (in the sample entry) and samples carrying atlas sub-bitstream NAL units. This track may include track references to other tracks carrying the payloads of video compressed V-PCC units (i.e., units of types VPCC_OVD, VPCC_GVD, and VPCC_AVD);

2) A restricted video scheme track where the samples contain access units of a video-coded elementary stream for occupancy map data (e.g., payloads of V-PCC units of type VPCC_OVD);

3) One or more restricted video scheme tracks where the samples contain access units of video-coded elementary streams for geometry data (i.e., payloads of V-PCC units of type VPCC_GVD); and 4) Zero or more restricted video scheme tracks where the samples contain access units of video-coded elementary streams for attribute data (e.g., payloads of V-PCC units of type VPCC_AVD).

The V-PCC track sample entry will be described.

V-PCC tracks according to the embodiments use VPCCSampleEntry. VPCCSampleEntry may extend VolumetricVisualSampleEntry with a sample entry type of 'vpc1' or 'vpcg'. A VPCC track sample entry may contain a V-PCC Configuration Box (VPCCConfigurationBox).

The V-PCC track sample entry may have the following properties.

Sample Entry Type: 'vpc1', 'vpcg'
Container: SampleDescriptionBox
Mandatory: A 'vpc1' or 'vpcg' sample entry is mandatory.
Quantity: One or more sample entries may be present Under the 'vpc1' sample entry, all atlas sequence parameter sets, atlas frame parameter sets, or V-PCC SEIs (or SEI messages) may be present in the setupUnit array. Under the 'vpcg' sample entry, the atlas sequence parameter sets, atlas frame parameter sets, or V-PCC SEIs may be present in this array, or in the stream. BitRateBox may be present in the V-PCC volumetric sample entry to signal the bit rate information of the V-PCC track.

The VPCCSampleEntry according to the embodiments may include config information indicating VPCCConfigurationBox, and unit_header information indicating VPCCUnitHeaderBox.

Single-Track Container for V-PCC Bitstream

Single-track encapsulation of V-PCC data means encapsulating the V-PCC bitstream and/or V-PCC data in a single track according to embodiments. Here, the encapsulated track may be referred to as a V-PCC bitstream track. Single-track encapsulation of V-PCC data requires the V-PCC encoded elementary bitstream to be represented by a single-track declaration.

Single-track encapsulation of PCC data may be utilized for simple ISOBMFF encapsulation of a V-PCC encoded bitstream. Such a bitstream may be directly stored in a single track without further processing. V-PCC unit header data structures may be stored in the bitstream as it is. A single track container for V-PCC data may be provided to media workflows for further processing (e.g., multi-track file generation, transcoding, DASH segmentation, etc.).

The V-PCC bitstream track will be described.

V-PCC bitstream tracks use VolumetricVisualSampleEntry with a sample entry type of 'vpe1' or 'vpeg'. A VPCC bitstream sample entry contains a VPCCConfigurationBox.

Under the 'vpe1' sample entry, all atlas sequence parameter sets, atlas frame parameter sets, and SEIs may be in the setupUnit array. Under the 'vpeg' sample entry, atlas sequence parameter sets, atlas frame parameter sets, and SEIs may be present in this array, or in the stream.

Samples (i.e., V-PCC bitstream samples) carried based on the V-PCC bitstream track will be described. A V-PCC bitstream sample contains zero or more V-PCC units (e.g., V-PCC access unit) which belong to the same presentation time. A sample may be a sync sample or decoding-wise dependent on other samples of the V-PCC bitstream track.

A V-PCC bitstream sync sample will be described. A V-PCC bitstream sync sample may satisfy all the following conditions: 1) It is independently decodable; 2) None of the samples that come after the sync sample (in decoding order) have any decoding dependency on any sample prior to the sync sample; and 3) All samples that come after the sync sample (in decoding order) are successfully decodable.

A V-PCC bitstream sub-sample will be described. A V-PCC bitstream sub-sample may be a V-PCC unit which is contained in a V-PCC bitstream sample. A V-PCC bitstream track may contain one SubSampleInformationBox in SampleTableBox, or in TrackFragmentBox of each of MovieFragmentBoxes.

The 32-bit unit header of the V-PCC unit which represents the sub-sample may be copied to the 32-bit codec_specific_parameters field of the sub-sample entry in the Sub SampleInformationBox. The V-PCC unit type of each sub-sample is identified by parsing the codec_specific_parameters field of the sub-sample entry in the SubSampleInformationBox.

As the point cloud data transmission device according to the embodiments encapsulates the point cloud data using this method, the reception device may efficiently access the point cloud bitstream. Furthermore, this configuration may allow the reception device to efficiently process the data of a point cloud bitstream and effectively access information necessary for rendering, thereby reducing delays occurring during decoding and rendering of point cloud data.

Figure 40:
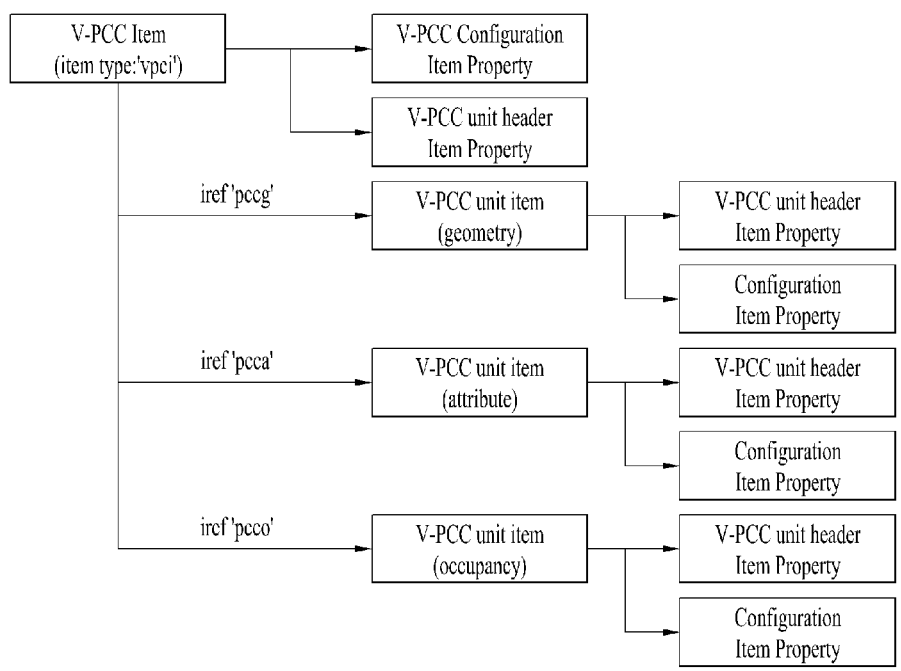
FIG. 40 shows an exemplary operation of encapsulating point cloud data and metadata related to the point cloud data according to embodiments.

FIG. 40 shows an exemplary operation of encapsulating point cloud data and metadata related to the point cloud data according to embodiments.

FIG. 40 shows an exemplary encapsulated file for non-timed V-PCC data (e.g., image data) according to embodiments.

FIG. 40 may show the structure of a file encapsulated when the file/segment encapsulator 20004, 21009 and/or the file/segment decapsulator 22000 according to the embodiments of FIGS. 20 to 22 delivers image data. Even when the image data is delivered, the point cloud data according to the embodiments may be encapsulated as a single item or multiple items.

On the other hand, the example of the encapsulated file shown in FIG. 28 may show the structure of a file encapsulated when the file/segment encapsulation encapsulator 20004, 21009 and/or the file/segment decapsulator 22000 according to the embodiments of FIGS. 20 to 22 delivers video data (e.g., a single track or multiple tracks).

FIG. 40 shows an encapsulation structure of non-timed V-PCC data. Non-timed V-PCC data represents point cloud data that does not move over time. Non-timed V-PCC data may be referred to as non-timed volumetric data, non-timed V3C data, or the like.

The non-timed V-PCC data may be stored in a file as image items. A new handler type 4CC code 'vpcc' may be defined and stored in the HandlerBox of the MetaBox in order to indicate the presence of V-PCC items, V-PCC unit items and other V-PCC encoded content representation information.

A V-PCC item including non-timed V-PCC data according to embodiments will be described.

A V-PCC item is an item which represents an independently decodable V-PCC access unit. A new item type 4CC code 'vpci' may be defined to identify V-PCC items. V-PCC items may be stored in V-PCC unit payload(s) in the atlas sub-bitstream. If PrimaryItemBox is present, item_id in this box shall be set to indicate a V-PCC item. The V-PCC item may be referred to as a V3C item or a visual volumetric video-based coded item.

A V-PCC unit item is an item which represents a V-PCC unit data. V-PCC unit items store V-PCC unit payload(s) of occupancy, geometry, and attribute video data units. A V-PCC unit item shall store only one V-PCC access unit related data. The V-PCC unit item may be referred to as a V3C unit item or a visual volumetric video-based coded unit item.

An item type 4CC code for a V-PCC unit item may be set depending on the codec used to encode corresponding video data units. A V-PCC unit item shall be associated with corresponding V-PCC unit header item property and codec specific configuration item property.

V-PCC unit items are marked as hidden items because it is not meaningful to display independently.

In order to indicate the relationship between a V-PCC item and V-PCC units, three new item reference types with 4CC codes, 'pcco', 'pccg' and 'pcca' are defined. Item reference is defined "from" a V-PCC item "to" the related V-PCC unit items. The 4CC codes of item reference types are:

1) 'pcco' (or v3vo): the referenced V-PCC unit item(s) contain the occupancy video data units;
2) 'pccg' (or v3vg): the referenced V-PCC unit item(s) contain the geometry video data units; and
3) 'pcca' (or v3va): the referenced V-PCC unit item(s) contain the attribute video data units.

V-PCC related item properties will be described. Descriptive item properties are defined to carry the V-PCC parameter set information and V-PCC unit header information, respectively. The V-PCC-related item properties may include, for example, a V-PCC configuration item property, a V-PCC unit header item property, a V-PCC view formation item property, a V-PCC rendering parameter item property, and a V-PCC object rendering information item property.

The V-PCC related item properties may be referred to as V3C related item properties, and the V-PCC unit header information may be referred to as V3C unit header information.

The V-PCC configuration item property will be described.
Box Type: 'vpcp'
Property type: Descriptive item property
Container: ItemPropertyContainerBox
Mandatory (per item): Yes (for a V-PCC item of type 'vpci')
Quantity (per item): One or more (for a V-PCC item of type 'vpci')
V-PCC parameter sets are stored as descriptive item properties and are associated with the V-PCC items.

The V-PCC configuration item property may be referred to as a V3C configuration item property.

The VPCC configuration property (VPCCConfigurationProperty) according to the embodiments may have the following syntax.

```
aligned(8) class vpcc_unit_payload_struct ( ) {
    unsigned int(16) vpcc_unit_payload_size;
    vpcc_unit_payload( );
}
aligned(8) class VPCCConfigurationProperty extends
    ItemProperty('vpcc') {
    vpcc_unit_payload_struct( )[ ];
}
``` vpcc_unit_payload size specifies the size of the vpcc_unit_payload( ).

The V-PCC unit header item property will be described.
Box Types: 'vunt'
Property type: Descriptive item property
Container: ItemPropertyContainerBox
Mandatory (per item): Yes, for a V-PCC item of type 'vpci' and for a V-PCC unit item

```
Quantity (per item): One
    aligned(8) class VPCCUnitHeaderProperty ( ) extends
    ItemFullProperty('vunt', version-0, 0) {
        vpcc_unit_header( );
    }
```

V-PCC unit header is stored as descriptive item properties and is associated with the V-PCC items and the V-PCC unit items.

The V-PCC unit header item property may be referred to as a V3C unit header item property.

As the point cloud data transmission device according to the embodiments encapsulates the point cloud data using this method, the reception device may efficiently access the point cloud bitstream. Furthermore, this configuration may allow the reception device to efficiently process the data of a point cloud bitstream and effectively access information necessary for rendering, thereby reducing delays occurring during decoding and rendering of point cloud data.

FIG. 41 shows an exemplary SEI message structure according to embodiments.

FIG. 41 may show syntax of an SEI message (e.g., the Supplemental Enhancement Information (SEI) message described above in FIGS. 20 to 22, 29, 37, and 39) according to embodiments. Various methods for storing the SEI message described in this figure in a V-PCC track according to the embodiments (e.g., the track for transmitting V-PCC information in FIG. 2, the V-PCC track in FIG. 38) may be presented. For example, the V-PCC track may store the SEI message in a V-PCC configuration record box (e.g., VPCC-DecoderConfigurationRecord in FIG. 39), a sample entry (e.g., the sample entry in FIGS. 38 and 39), and/or a sample (e.g., the sample of FIGS. 28 to 30, 32, and 37 to 39). The position where the SEI message according to the embodiments is stored in the V-PCC track is not limited to the above-described example. The V-PCC track according to the embodiments may be referred to as a track for atlas data, a track for atlas, a V-PCC atlas track, and/or a V3C atlas track.

The SEI message according to the embodiments may be referred to as SEI information. The SEI message according to the embodiments may be used for decoding, reconstruction, display, or other purposes. The SEI message according to the embodiments may represent an essential SEI message or a non-essential SEI message. The non-essential SEI message according to the embodiments may not be used in the above-described decoding process. The essential SEI message according to the embodiments may be essentially included in the VPCC bitstream (e.g., the VPCC bitstream described with reference to FIGS. 24 and 25), and may not be removed from the VPCC bitstream. Essential SEI messages according to the embodiments may be classified into the following two types:

1) Type-A essential SEI message: The Type-A essential SEI message may contain information required to check bitstream conformance and for output timing decoder conformance. Every V-PCC decoder conforming to point A should not discard any relevant Type-A essential SEI messages and may need to consider the same for bitstream conformance and for output timing decoder conformance; and 2) Type-B essential SEI message: V-PCC decoders that intend to conform to a particular reconstruction profile should not discard any relevant Type-B essential SEI messages and may need to be used for 3D point cloud reconstruction and conformance purposes.

As described above with reference to FIG. 29, sei_rbsp ( ) 41000 may include an SEI message according to embodiments.

The SEI message according to the embodiments may contain sei_payload. Part 41001 shows the structure of sei_payload according to the embodiments.

The point cloud data transmission device according to the embodiments may encapsulate the SEI message described in this figure as various positions and transmit the same to the reception device. That is, the transmission device may change the storage position (or encapsulation position) of the SEI message such that the reception device may efficiently access the point cloud data bitstream. This configuration may enable the reception device to efficiently process the point cloud bitstream and effectively access the information necessary for rendering, thereby reducing latency that may occur during decoding and rendering of the point cloud data.

FIG. 42 shows VPCC SEI message structure information and atlas a parameter set structure according to embodiments FIG. 42 shows an example of VPCC SEI message (or SEI information) structure information 42000 and VPCC atlas parameter set structure information 42001 according to embodiments. The VPCC SEI message structure information described with reference to FIG. 42 may represent information on the SEI message described above with reference to FIG. 41 and may contain an SEI message. The VPCC atlas parameter set structure information described with reference to FIG. 42 may represent information on the atlas parameter set described above with reference to FIG. 39 and may contain an atlas parameter set.

The VPCC SEI message structure information and VPCC atlas parameter set structure information described shown in FIG. 42 may be encapsulated in the form of a box. For example, the VPCC SEI message structure information may be encapsulated in a VPCC SEI info box (VPCCSEIInfoBOX), and the VPCC atlas parameter set structure information may be encapsulated in a VPCC atlas parameter set box (VPCCAPSBox).

A file containing point cloud data according to embodiments may store one or more point cloud videos or images. A file may carry the point cloud data based on multiple tracks or image items. For example, a file may have a file structure as shown in FIGS. 39 and 40.

VPCCSEIInfoBOX according to the embodiments may contain VPCC SEI message structure information (VPCCSEIInfoStrct( )). The VPCCSEIInfoStrct( ) according to the embodiments may represent information about an SEI message (e.g., the SEI message described with reference to FIG. 41) contained in the file. The VPCCSEIInfoBOX according to the embodiments may be present at various positons within the file (e.g., the file described with reference to FIGS. 39 to 40). For example, the VPCCSEIInfoBOX may be contained in the metadata box for the VPCC (or V3C) bitstream described with reference to FIGS. 24 and 25. The VPCCSEIInfoBOX according to the embodiments may have the following syntax.

```
aligned(8) class VPCCSEIInfoBox extends Box('vsei') {
    VPCCSEIInfoStruct( );
}
```

As described above, the VPCCSEIInfoBOX according to the embodiments contains VPCCSEIInfoStruct( ). VPCCSEIInfoStruct( ) according to the embodiments represents the above-described VPCC SEI message structure information. VPCCSEIInfoStruct( ) according to the embodiments may contain numEssentialSEIs, ESEI_type, ESEI_length, ESEI_byte, numNonEssentialSEIs, NSEI_type, NSEI_length, and/or NSEI_byte.

numEssentialSEIs may indicate the number of essential SEI messages (e.g., essential SEI messages described with reference to FIG. 41) signaled by the VPCC SEI message structure information according to the embodiments.

VPCCSEIInfoStruct( ) according to the embodiments may further contain ESEI_type, ESEI_length, and ESEI_byte based on the index i. The index i according to the embodiments may be greater than or equal to 0, and may be less than the value indicated by the above-described numEssentialSEIs.

ESEI_type may indicate the type of the essential SEI message signaled by the VPCC SEI message structure information according to the embodiments.

ESEI_length may indicate the byte length of an essential SEI message signaled by VPCCSEIInfoStruct( ) according to the embodiments.

ESEI_byte may contain an essential SEI message signaled by VPCCSEIInfoStruct( ) according to the embodiments, and contain an essential SEI atlas NAL unit that has nal_unit_type (e.g., the NAL unit type described with reference to FIG. 39) equal to NAL_PREFIX_ESEI and/or NAL_SUFFIX_ESEI. The nal_unit_type is the same as or similar to that described with reference to FIG. 39.

numNonEssentialSEIs may indicate the number of non-essential SEI messages (e.g., the non-essential SEI messages described with reference to FIG. 41) signaled by VPCCSEI-InfoStruct( ) according to the embodiments.

VPCCSEIInfoStruct( ) according to the embodiments may further contain NSEI_type, NSEI_length, and/or NSEI_byte based on the index i. The index i according to the embodiments may be greater than or equal to 0, and may be less than the value indicated by the above-described numNonEssentialSEIs.

NSEI_type may indicate the type of a non-essential SEI message signaled by VPCCSEIInfoStruct( ) according to the embodiments.

NSEI_length may indicate the byte length of the non-essential SEI message signaled by VPCCSEIInfoStruct( ) according to the embodiments.

NSEI_byte may contain a non-essential SEI message signaled by VPCCSEIInfoStruct( ) according to the embodiments, and contain an essential SEI atlas NAL that has nal_unit_type (e.g., the NAL unit type described with reference to FIG. 39) equal to NAL_PREFIX_NSEI and/or NAL_SUFFIX_NSEI. nal_unit_type is the same as or similar to that described with reference to FIG. 39.

The VPCCAPSBox according to the embodiments may contain VPCC atlas parameter set structure information (VPCCAPSStruct( )). VPCCAPSStruct( ) according to the embodiments may represent information on a V-PCC atlas parameter set (e.g., the V-PCC atlas parameter set described with reference to FIG. 39) contained in the file. VPCCAPSStruct( ) according to the embodiments may be present at various positions within the file (e.g., the file described with reference to FIGS. 39 and 40). For example, the VPCCAPSBox may be included in the metadata box for the VPCC (or V3C) bitstream described with reference to FIGS. 24 and 25. The VPCCAPSBox according to the embodiments may have the following syntax.

```
aligned(8) class VPCCAPSBox extends Box('vpap') {
  VPCCAPSStruct ( );
}
```

As described above, VPCCAPSBox may contain VPCCAPSStruct( ). VPCCAPSStruct( ) according to embodiments may represent the above-described VPCC atlas parameter set structure information. VPCCAPSStruct( ) according to the embodiments may contain numOfAPSArrays, aps_id, aps_NAL_unit_type, aps_numNALUnits, apsLength, and/or apsUnit.

numOfAPSArrays represents the number of atlas parameter sets signaled by VPCCAPSStruct( ) according to the embodiments.

VPCCAPSStruct( ) according to the embodiments may further contain aps_id, aps_NAL_unit_type, and aps_numNALUnits based on index j. Index j may have a value greater than or equal to 0 and less than the value indicated by numOfAPSArrays.

aps_id indicates an identifier for identifying an atlas parameter set signaled by VPCCAPSStruct( ) according to the embodiments.

aps_NAL_unit_type indicates the type of the NAL units including the atlas parameter set signaled by VPCCAPSStruct( ) according to the embodiments. For example, aps_NAL_unit_type indicates NAL_ASPS, NALS_AFPS, and/or NAL_AAOS described above with reference to FIG. 39.

aps_numNALUnits indicates the number of NAL units of a NAL_unit_type identified by the above-described aps_NAL_unit_type.

VPCCAPSStruct( ) according to the embodiments may further contain apsLength and apsUnit based on index i. Index i according to the embodiments may have a value greater than or equal to 0 and less than the value indicated by aps_numNALUnits.

apsLength indicates the length in bytes of an NAL unit of a NAL_unit_type identified by the above-described aps_NAL_unit_type.

apsUnit may contain an NAL unit of a NAL unit type identified by the above-described aps_NAL_unit_type.

As the point cloud data transmission device according to the embodiments encapsulates the point cloud data using the method described above, the reception device may efficiently access the point cloud bitstream. Furthermore, this configuration may allow the reception device to efficiently process the data of a point cloud bitstream and effectively access information necessary for rendering, thereby reducing delays occurring during decoding and rendering of point cloud data.

FIG. 43 shows VPCC SEI message structure information and atlas a parameter set structure according to embodiments FIG. 43 shows an example in which an SEI message and/or an atlas parameter set according to embodiments is stored in a sample group (e.g., the sample group described above with reference to FIG. 39). As described above, the V-PCC track (e.g., the V-PCC track of FIG. 38, the track for atlas data of FIG. 41) according to the embodiments may contain one or more samples (e.g., the samples described with reference to FIG. 39). The samples according to the embodiments may be grouped into a sample group based on the grouping_type. That is, the grouping_type represents the assignment of samples to a sample group.

Part 4200 shows a case where the above-described grouping type is 'vaps'.

As described above, the sample grouping based on the grouping_type equal to 'vaps' may represent the assignment of samples contained in a track (e.g., the V-PCC track described with reference to FIG. 39) to an atlas parameter set (e.g., the atlas parameter set described above with reference to FIG. 39) carried in the sample group. In addition, the sample grouping based on grouping_type equal to 'vaps' represents the assignment of samples contained in the track to the SEI message (e.g., the SEI message described above with reference to FIGS. 29 and 37) carried in the corresponding sample group. The above-described track may represent an atlas sub-bitstream (e.g., a V-PCC track, a V-PCC bitstream track, and/or a V-PCC component).

When a SampleToGroupBox with grouping_type equal to 'vaps' is present in a track according to embodiments, SampleGroupDescriptionBox with the same grouping type may be present. In addition, the track may contain ID information for identifying the sample group.

The V-PCC track according to the embodiments may include a track containing SampleToGroupBox with grouping_type equal to 'vaps'

Referring to the syntax shown in part 4200, SampleGroupDescriptiopnEntry having grouping_type equal to 'vaps' may contain numOfSetupUnits, setupUnitLength, and/or setupUnit.

numOfSetupUnits specifies the number of setup units signaled in the sample group description described above.

SampleGroupDescriptiopnEntry may further contain setupUnitLength and/or setupUnit based on index i. Index i may have a value greater than or equal to 0 and less than the value indicated by numOfSetupUnits.

setupUnitLength may indicate the size, in bytes, of the setupUnit field. This field may indicate the size of both the NAL unit header and the NAL unit payload, but may not include the information about the size of the field itself.

setupUnit may indicate a NAL unit of type NAL_ASPS, NAL_AFPS, NAL_AAPS, NAL_PREFIX_ESEI, NAL_PREFIX_NSEI, NAL_SUFFIX_ESEI, and/or NAL_SUFFIX_NSEI. The NAL unit indicated by setupUnit may carry data associated with this group of samples. That is, a sample group having grouping_type equal to 'vaps' according to the embodiments may contain at least one of an atlas parameter set or an SEI message.

SampleGroupDescriptiopnEntry may be expressed through the following syntax instead of the syntax shown in part 4200.

```
aligned(8) class VPCCAtlasParamSampleGroupDescriptionEntry( )
extends SampleGroupDescriptionEntry('vaps') {
    VPCCAPSStruct( );
}
```

VPCCAPSStruct( ) may contain atlas NAL units carrying atlas parameter sets (e.g., atlas sequence parameter sets, atlas frame parameter sets, and/or atlas adaptation parameter sets).

As described above, the sample grouping based on grouping_type equal to 'vaps' represents the assignment of samples contained in the track to the SEI message carried in the corresponding sample group. The above-described track may represent an atlas sub-bitstream (e.g., a V-PCC track, a V-PCC bitstream track, and/or a V-PCC component).

When a SampleToGroupBox with grouping_type equal to 'vsei' is present in a track according to embodiments, SampleGroupDescriptionBox with the same grouping type may be present. In addition, the track may contain ID information for identifying the sample group.

The V-PCC track according to the embodiments may include a track containing SampleToGroupBox with grouping_type equal to 'vsei'

Referring to the syntax shown in part 4201, SampleGroupDescriptiopnEntry having grouping_type equal to 'vsei' may contain VPCCSEIInfoStruct( ).

VPCCSEIInfoStruct( ) may contain atlas NAL units carrying an essential SEI message and/or a non-essential SEI message that are applied to this sample group.

As the point cloud data transmission device according to the embodiments encapsulates the point cloud data using the method described above, the reception device may efficiently access the point cloud bitstream. Furthermore, this configuration may allow the reception device to efficiently process the data of a point cloud bitstream and effectively access information necessary for rendering, thereby reducing delays occurring during decoding and rendering of point cloud data.

FIG. 44 illustrates a method for an SEI track group and SEI entity grouping according to embodiments.

FIG. 44 shows exemplary syntax of SpatialRegionGroupBox 43000 required to apply SEI track grouping and exemplary syntax of PlayoutEntityGroupBox 43001 required to apply SEI entity grouping in track grouping according to embodiments. SpatialRegionGroupBox and/or PlayoutEntityGroupBox described with reference to FIG. 44 may be encapsulated in a file or in a V-PCC track (e.g., the V-PCC track in FIG. 38).

Track grouping according to the embodiments is grouping tracks associated with each other. That is, one or more tracks included in a single track group are tracks associated with each other.

VPCCSEIInfoStruct( ) shown in FIG. 44 may represent the VPCCSEIInfoStruct( ) described above with reference to FIG. 42. VPCCSEIInfoStruct( ) shown in FIG. 44 may contain the data structure shown in FIG. 41. VPCCSEIInfoStruct( ) shown in FIG. 44 may contain atlas NAL units (e.g., the essential SEI message and/or non-essential SEI described with reference to FIGS. 41 and 42) carrying an essential SEI message and/or a non-essential SEI message applied to tracks of a track group.

Part 43000 shows exemplary syntax of SpatialRegionGroupBox according to the embodiments. Part 43001 shows exemplary syntax of PlayoutEntityGroupBox according to the embodiments.

SEI track grouping (or SEI track group) according to embodiments will be described.

TrackGroupTypeBox with track_group_type equal to 'vpse' may indicate that the corresponding track belongs to a group of tracks that are associated with SEI messages. Tracks associated with the same SEI messages may have the same value of track_group_id for track_group_type 'vpse'.

TrackGroupTypeBox with track_group_type equal to 'vpse' according to the embodiments may be encapsulated (or stored) in a file in the form of SpatialRegionGroupBox 43000 described above.

SEI entity grouping according to embodiments will be described.

EntityToGroupBox with track_group_type equal to 'vpse' may indicate that tracks or items belong to the group associated with SEI messages. The EntityToGroupTypeBox according to the embodiments may group timed tracks or non-timed items associated with the same SEI message.

EntityToGroupBox with track_group_type equal to 'vpse' according to the embodiments may be encapsulated (or stored) in a file in the form of PlayoutEntityGroupBox. EntityToGroupBox according to the embodiments may have the following properties.

Box Types: 'vpse'
Container: GroupsListBox
Mandatory: No
Quantity: Zero or more

EntityToGroupBox with track_group_type equal to 'vpse' according to the embodiments may contain num_entities_in_group and VPCCSEIInfoStruct( ). VPCCSEIInfoStruct( ) is the same as that described above. num_entities_in_group according to the embodiments indicates the number of entities included in (corresponding to) the entity group.

The above-described SpatialRegionGroupBox and PlayoutEntityGroupBox may further contain an atlas parameter set in addition to the SEI message.

The point cloud data transmission device according to the embodiments may transmit the VPCCSEIInfoStruct( ) to the reception device using the above-described method, thereby allowing the reception device to effectively play back point cloud videos or images and enabling users to interact with the point cloud videos or images.

With this configuration, the point cloud data transmission device according to the embodiments may efficiently store and signal a V-PCC bitstream by dividing the same into one or more tracks in a file, and efficiently signal the relationship between multiple tracks for the stored V-PCC bitstream. In addition, it may efficiently store and transmit a file of a point cloud bitstream through identification of an alternative V-PCC track stored in the file.

FIG. 45 illustrates a method for atlas parameter set track grouping (SEI track group) and atlas parameter set entity grouping (SEI entity grouping) according to embodiments.

FIG. 45 shows exemplary syntax of SpatialRegionGroupBox 44000 required to apply atlas parameter set (or APS) track grouping and exemplary syntax of PlayoutEntityGroupBox 44001 required to apply APS entity grouping in track grouping according to embodiments. SpatialRegionGroupBox and/or PlayoutEntityGroupBox described with reference to FIG. 45 may be encapsulated in a file or in a V-PCC track (e.g., the V-PCC track in FIG. 38).

The track grouping according to the embodiments is the same as or similar to that described above with reference to FIG. 42.

VPCCAPSStruct( ) shown in FIG. 45 may represent the VPCCAPSStruct( ) described above with reference to FIG. 42. VPCCAPSStruct( ) shown in FIG. 45 may contain atlas NAL units including an atlas parameter set applied to the tracks of the track group (e.g., the atlas sequence parameter set of FIG. 30, the atlas frame parameter set of FIG. 31 and/or the atlas adaptation parameter set of FIG. 33).

Part 44000 shows exemplary syntax of SpatialRegionGroupBox according to the embodiments. Part 44001 shows exemplary syntax of PlayoutEntityGroupBox according to the embodiments.

Atlas parameter set track grouping according to the embodiments will be described.

TrackGroupTypeBox with track_group_type equal to 'vpap' according to the embodiments indicates that the corresponding track belongs to a group of tracks that are associated with atlas parameter sets. Tracks associated with the same atlas parameter sets have the same value of track_group_id for track_group_type 'vpap'. track_group_id according to the embodiments may be an identifier for identifying a track group.

TrackGroupTypeBox with track_group_type equal to 'vpap' according to the embodiments may be encapsulated (or stored) in a file in the form of SpatialRegionGroupBox 44000 described above.

Atlas parameter set entity grouping according to the embodiments will be described.

EntityToGroupBox with track_group_type equal to 'vpap' may indicate that tracks or items belong to the group associated with atlas parameter sets. The EntityToGroupTypeBox according to the embodiments may group timed tracks or non-timed items associated with the same atlas parameter set.

EntityToGroupBox with track_group_type equal to 'vpap' according to the embodiments may be encapsulated (or stored) in a file in the form of PlayoutEntityGroupBox. EntityToGroupBox according to the embodiments may have the following properties.

Box Types: 'vpap'
Container: GroupsListBox
Mandatory: No
Quantity: Zero or more

EntityToGroupBox with track_group_type equal to 'vpap' according to the embodiments may contain num_entities_in_group and VPCCAPSStruct( ). VPCCAPSStruct( ) is the same as that described above. num_entities_in_group according to the embodiments indicates the number of entities included in (corresponding to) the entity group.

The above-described SpatialRegionGroupBox and PlayoutEntityGroupBox may further contain an SEI message in addition to the atlas parameter set.

The point cloud data transmission device according to the embodiments may transmit the VPCCAPSStruct( ) to the reception device using the above-described method, thereby allowing the reception device to effectively play back point cloud videos or images and enabling users to interact with the point cloud videos or images.

With this configuration, the point cloud data transmission device according to the embodiments may efficiently store and signal a V-PCC bitstream by dividing the same into one or more tracks in a file, and efficiently signal the relationship between multiple tracks for the stored V-PCC bitstream. In addition, it may efficiently store and transmit a file of a point cloud bitstream through identification of an alternative V-PCC track stored in the file.

FIG. 46 shows an example of a V-PCC sample entry and a V-PCC bitstream sample entry (VPCCBitstreamSampleEntry) according to embodiments.

FIG. 46 illustrates an exemplary method of storing an SEI message and an atlas parameter set in a sample entry (e.g., the sample entry described above with reference to FIGS. 38, 39, and 41) according to embodiments. Part 45000 shows exemplary syntax of a V-PCC sample entry according to the embodiments. Part 45001 shows exemplary syntax of the V-PCC bitstream sample entry (VPCCBitstreamSampleEntry) according to the embodiments. The V-PCC sample entry and the V-PCC bitstream sample entry are the same as or similar to those described with reference to FIG. 39.

The V-PCC sample entry according to the embodiments may have the syntax structure shown in part 45000 by, for example, a multi-track container based encapsulation (e.g., encapsulation based on the multi-track container shown in FIG. 39).

Referring to the syntax structure shown in part 45000, VPCCSampleEntry according to the embodiments may contain includes config indicating VPCCConfigurationBox, unit_header indicating VPCCUnitHeaderBox.

The VPCCSampleEntry 45000 according to the embodiments may further contain VPCCSEIInfoBox and/or VPCCAPSBox. The VPCCSEIInfoBox according to the embodiments may contain information on NAL units carrying an essential SEI message and/or a non-essential SEI message applied to samples referenced by a V-PCC sample entry. The essential SEI message and/or non-essential SEI message are the same as or similar to those described above with reference to FIGS. 39 and 41. The VPCCAPSBox according to the embodiments may contain information on NAL units carrying an atlas parameter set (e.g., an atlas sequence parameter set, an atlas frame parameter set, and/or an atlas adaptation_parameter set) applied to samples referenced by the V-PCC sample entry). The atlas parameter set is the same as or similar to that described with reference to FIGS. 39 and 45.

That is, the VPCCSampleEntry 45000 may further contain VPCCSEIInfoBox and/or VPCCAPSBox to indicate an SEI message atlas parameter set for V-PCC content corresponding to (i.e., being a target of) VPCCSampleEntry.

The V-VPCCSampleEntry according to the embodiments may have the syntax structure shown in 45001 by, for example, single-track container based encapsulation (e.g., the single-track container based encapsulation shown in FIG. 39).

Referring to the syntax structure shown in part 45001, VPCCSampleEntry according to the embodiments may contain only config information indicating VPCCConfigurationBox. The VPCCSampleEntry may be referred to as VPCCBitstreamSampleEntry.

The VPCCBitstreamSampleEntry 45001 according to the embodiments may further contain VPCCSEIInfoBox and/or VPCCAPSBox. The VPCCSEIInfoBox and/or VPCCAPS-Box are the same as or similar to those described above.

That is, the VPCCSampleEntry 45001 may further contain VPCCSEIInfoBox and/or VPCCAPSBox. That is, the sample entry described in this drawing may contain at least one of an SEI message or an atlas parameter set according to the embodiments.

As the point cloud data transmission device according to the embodiments encapsulates the point cloud data using the method described above, the reception device may efficiently access the point cloud bitstream. Furthermore, this configuration may allow the reception device to efficiently process the data of a point cloud bitstream and effectively access information necessary for rendering, thereby reducing delays occurring during decoding and rendering of point cloud data.

FIG. 47 shows syntax of a V-PCC SEI sample and/or a V-PCC APS sample by a timed metadata track according to embodiments.

FIG. 47 illustrates an exemplary method of storing an SEI message and an atlas parameter set in a timed metadata track according to embodiments. Part 46000*a* shows exemplary syntax of a V-PCC SEI sample entry carried by a timed metadata track according to embodiments. Part 46001*a* shows exemplary syntax of a V-PCC APS sample entry carried by a timed metadata track according to the embodiments. Part 46000*b* shows exemplary syntax of a V-PCC SEI sample contained in a timed metadata track according to the embodiments. Part 46001*b* shows exemplary syntax of a V-PCC APS sample contained in a timed metadata track according to the embodiments. The purpose for the timed metadata track may be indicated by the track sample entry type.

The VPCC SEI timed metadata track will be described.

The dynamic VPCC SEI timed metadata track according to the embodiments may indicate whether an essential SEI message and/or a non-essential SEI message (e.g., the essential SEI message and/or non-essential SEI message described with reference to FIG. 41) dynamically changes over time. The dynamic VPCC SEI timed metadata track according to the embodiments may be linked to the respective tracks (e.g., a VPCC track, a VPCC bitstream track, and/or a VPCC component track) through the 'cdsc' track reference.

Referring to the syntax structure shown in part 46000*a*, the V-PCC SEI sample entry carried by the VPCC SEI timed metadata track may contain VPCCSEIInfoStruct( ). The VPCCSEIInfoStruct( ) according to the embodiments may be the same as or similar to the VPCCSEIInfoStrct( ) described with reference to FIGS. 42 and 43. The VPCCSEIInfoStrct( ) according to the embodiments may contain information on an SEI message applied to VPCC content corresponding to the above-described VPCC SEI timed metadata track.

The syntax shown in part 46000*b* represents the syntax of the VPCC SEI sample carried by the VPCC SEI timed metadata track. That is, the syntax of a sample described in part 46000*b* may represent the syntax of a sample contained in the VPCC SEI timed metadata track.

The syntax of the VPCC SEI sample according to the embodiments may include num_active_sei, addl_active_sei, essential_flag, active_sei_type, and/or VPCCSEIInfoStrct ( ).

num_active_sei) specifies the number of SEI messages (or active SEI messages) of VPCCSEIInfoStrct( ) according to the embodiments signaled in the VPCCSEISampleEntry. The value of this parameter equal to 0 indicates that no SEI message of the sample entry is active.

addl_active_sei equal to 1 specifies that an additionally active SEI message is directly signaled in the sample through VPCCSEIInfoStrct( ). The value of this parameter equal to 0 specifies that no additional active SEI messages are signaled in the sample directly.

The syntax of the VPCC SEI sample according to the embodiments may further contain essential_flag and/or active_sei_type based on index i. Index i may be greater than or equal to 0, and may be less than the value indicated by num_active_sei.

essential_flag equal to 1 indicates that the SEI message is an essential SEI message (e.g., the essential SEI message described with reference to FIG. 41). essential_flag equal to 0 indicates that the SEI message is a non-essential SEI message (e.g., the non-essential SEI message described with reference to FIG. 41).

active_sei_type indicates the type of the active SEI message. active_sei_type indicates the type of an essential SEI message and/or non-essential SEI message that is signaled from the VPCCSEISampleEntry and is currently active.

The syntax of the VPCC SEI sample according to the embodiments may further contain VPCCSEIInfoStrct( ) corresponding to addl_active_sei indicating 1.

VPCCSEIInfoStrct( ) indicates information on an additional active SEI message signaled directly in the sample.

The VPCC APS timed metadata track will be described.

The dynamic VPCC APS timed metadata track according to the embodiments may indicate whether the atlas parameter set according to the embodiments dynamically changes over time. The dynamic VPCC APS timed metadata track according to the embodiments may be linked to the respective tracks (e.g., a VPCC track, a VPCC bitstream track, and/or a VPCC component track) through the 'cdsc' track reference.

Referring to the syntax structure shown in part 46001*a*, the VPCCAPSSampleEntry carried by the VPCC APS timed metadata track may contain VPCCAPSStruct( ). VPCCAPSStruct( ) according to the embodiments may be the same as or similar to VPCCAPSStruct( ) described with reference to FIGS. 42 and 45. VPCCAPSStruct( ) according to the embodiments may include information on an atlas parameter set applied to VPCC content corresponding to the above-described VPCC APS timed metadata track.

The syntax shown in part 46001*b* represents the syntax of VPCCAPSSample carried by the VPCC APS timed metadata track. That is, the syntax of the sample shown in part 46001*b* may represent the syntax of the sample contained in the VPCC APS timed metadata track.

The syntax of the VPCCAPSSample according to the embodiments may contain num_active_aps, addl_active_aps, active_aps_id, active_aps_type, and/or VPCCAPSStruct( ).

num_active_aps specifies the number of active atlas parameter sets of VPCCAPSStruct( ) according to embodiments signaled in VPCCAPSSampleEntry. When this parameter has a value of 0, it indicates that no atlas parameter sets of the sample entry is active.

addl_active_sei equal to 1 specifies that additional active SEI messages are signaled in the sample directly through VPCCAPSStruct( ). addl_active_sei equal to 0 indicates that specifies that no additional active SEI messages are directly signaled in the sample.

The syntax of the VPCCAPSSample according to the embodiments may further contain active_aps_id and/or active_aps_type based on index i. Index i may be greater than or equal to 0, and may be less than the value indicated by num_active_aps.

active_aps_id indicates the identifier of an active atlas parameter set of VPCCAPSStruct( ) according to the embodiments signaled in the active VPCCAPSSampleEntry.

active_sei_type indicates the type of the active SEI message. This parameter indicates the type of the atlas parameter set that is signaled in the VPCCAPSSampleEntry and is currently active.

The syntax of the VPCCAPSSample according to the embodiments may further contain VPCCAPSStruct( ) corresponding to addl_active_aps indicating 1.

VPCCAPSStruct( ) indicates information on an additional active atlas parameter set signaled directly in the sample.

The timed metadata track described in this drawing may contain at least one of an atlas parameter set or an SEI message according to embodiments.

With this configuration, the point cloud data transmission device according to the embodiments may efficiently store and signal a V-PCC bitstream by dividing the same into one or more tracks in a file, and efficiently signal the relationship between multiple tracks for the stored V-PCC bitstream. In addition, it may efficiently store and transmit a file of a point cloud bitstream through identification of an alternative V-PCC track stored in the file.

As the point cloud data transmission device according to the embodiments encapsulates the point cloud data using the method described above, the reception device may efficiently access the point cloud bitstream. Furthermore, this configuration may allow the reception device to efficiently process the data of a point cloud bitstream and effectively access information necessary for rendering, thereby reducing delays occurring during decoding and rendering of point cloud data.

FIG. 48 shows exemplary syntax of a V-PCC SEI item property and a V-PCC APS item property according to embodiments.

FIG. 48 illustrates an exemplary method of storing an SEI message and an atlas parameter set in an item property according to embodiments. VPCCSEIItemProperty 47000 and VPCCAPSItemProperty, 47001 according to the embodiments shown in FIG. 48 may be contained in the item described with reference to FIG. 21 and/or the V-PCC item described with reference to FIG. 40.

VPCCSEIItemProperty may be defined to store static metadata of the SEI message of the associated V-PCC item. The VPCCSEIItemProperty may have the following properties.

Box Types: 'vpc1'
Property Type: Descriptive item property
Container: ItemPropertyContainerBox
Mandatory (per item): No
Quantity (per item): One VPCCSEIInfoStuct( ) shown in part 47000 may indicate information on an essential SEI message and/or non-essential SEI message associated with the V-PCC item (e.g., the essential SEI message and/or non-essential SEI message described with reference to FIG. 41). VPCCSEIInfoStuct( ) may be the same as or similar to the VPCCSEIInfoStrct( ) described with reference to FIGS. 42 to 44. VPCCSEIItemProperty according to the embodiments may further contain an atlas parameter set in addition to the SEI message.

The VPCCAPSItemProperty may be defined to store static metadata of the atlas parameter set of the associated V-PCC item. The VPCCAPSItemProperty may have the following properties.

Box Type: 'vpap'
Property Type: Descriptive item property
Container: ItemPropertyContainerBox
Mandatory (per item): No
Quantity (per item): One VPCCAPSStruct( ) shown in part 47001 may indicate information on a VPCC atlas parameter set (e.g., an atlas sequence parameter set, an atlas frame parameter set, and/or an atlas adaptation parameter set) associated with the V-PCC item. VPCCAPSStruct( ) may be the same as or similar to the VPCCAPSStruct( ) described with reference to FIGS. 42 and 44. The VPCCAPSItemProperty according to the embodiments may further contain an SEI message according to the embodiments in addition to the atlas parameter set.

As the point cloud data transmission device according to the embodiments encapsulates the point cloud data using the method described above, the reception device may efficiently access the point cloud bitstream. Furthermore, this configuration may allow the reception device to efficiently process the data of a point cloud bitstream and effectively access information necessary for rendering, thereby reducing delays occurring during decoding and rendering of point cloud data.

Figure 49:
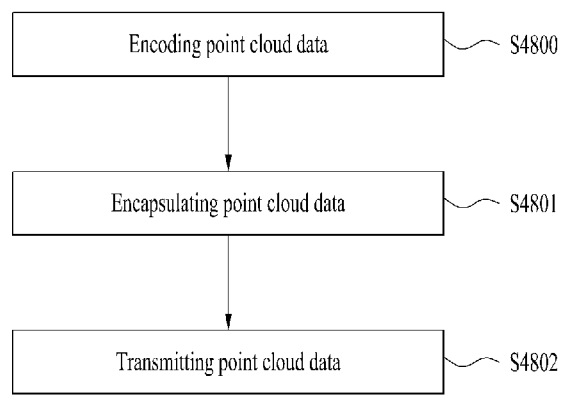
FIG. 49 is a flowchart illustrating a method of transmitting point cloud data according to embodiments.

FIG. 49 is a flowchart illustrating a method of transmitting point cloud data according to embodiments.

FIG. 49 is a flowchart illustrating a method of transmitting point cloud data by a point cloud data transmission device according to embodiments (e.g., the transmission device described above with reference to FIGS. 1, 18, 20 to 22, 24, 37, and 39 to 48). The transmission device according to the embodiments may further perform operations other than the operations described with reference to FIG. 49.

The point cloud data transmission method according to the embodiments may include encoding point cloud data (S4800), encapsulating the point cloud data (S4801), and/or transmitting the point cloud data (S4802).

In operation S4800, the point cloud data is encoded. In operation S4800, the point cloud data according to the embodiments is encoded. For example, in operation S4801, some or all of the operations of the point cloud video encoder 10002 of FIG. 1, the operations shown in FIG. 4, the operations of the encoding device 100 of FIG. 15, the operations of FIG. 18, and the video encoding 20002 and/or image encoding 20003 of FIGS. 20 and 21 may be performed.

In operation S4801, the point cloud data is encapsulated. Operation S4801 may be performed based on a file. The file according to the embodiments is the same as or similar to the file described with reference to FIGS. 1, 2, and 18 to 48. That is, the transmission device according to the embodiments may encapsulate the point cloud data based on the file.

The file according to the embodiments may contain a track for atlas data for the point cloud data (e.g., the track for atlas data in FIGS. 41 and 43, the V-PCC track described with reference to FIGS. 38 to 45). The track (or V-PCC track) for atlas data according to the embodiments may be a track that carries metadata for the point cloud data.

A sample group (e.g., the sample group of FIG. 43) contained in the track according to embodiments may include at least one of an atlas parameter set and/or an SEI message for the atlas data. A sample entry (e.g., the sample entry of FIG. 46) contained in the track according to the embodiments may include at least one of an atlas parameter set and/or an SEI message for the atlas data. The atlas parameter set and the SEI message according to the embodiments are the same as or similar to those described above with reference to FIGS. 38 to 48.

As the sample group contained in the track according to the embodiments includes at least one of the atlas parameter set or the SEI message, grouping type information for the sample group may indicate that at least one of the atlas parameter set or the SEI message is included in the sample group. The sample group and grouping type information are the same as or similar to those described above with reference to FIG. 43. The grouping type information indicating that at least one of the atlas parameter set or the SEI message is included in the sample group according to the embodiments may indicate 'vaps' and/or 'vsei' described above with reference to FIG. 43. As the sample entry included in the track according to the embodiments includes at least one of the atlas parameter set or the SEI message, the information indicating the type of the sample entry may indicate that at least one of the atlas parameter set or the SEI message is included in the sample entry. The information indicating the type of the sample entry according to embodiments may indicate the sample entry type described above with reference to FIGS. 39 and 46. The information indicating the type of the sample entry indicating that at least one of the atlas parameter set or the SEI message is included in the sample entry according to the embodiments may indicate 'vpc1' or 'vpcg' described above in FIG. 39, or 'vpe1' described above with reference to FIG. 46. Here, 'vpc1', 'vpcg', and 'vpe1' may be referred to as 'v3c1', 'v3cg' and 'v3e1'.

The SEI message according to the embodiments may include at least one of an essential SEI message or a non-essential SEI message. The essential SEI message or the non-essential SEI message is the same as or similar to those described above with reference to FIGS. 41 to 49. The file according to the embodiments may further contain VPCC SEI message structure information for the SEI message (e.g., the VPCC SEI message structure information of FIG. 42). The VPCC SEI message structure information according to the embodiments may include at least one of information indicating the number of essential SEI messages (e.g., numEssentialSEIs in FIG. 42), information indicating the type of the essential SEI message (e.g., ESEI_type in FIG. 42), information indicating the number of non-essential SEI messages (e.g., numNonEssentialSEIs in FIG. 42), or information indicating the type of the non-essential SEI message (e.g., NSEI_type in FIG. 42).

The file according to the embodiments may further contain VPCC atlas parameter set structure information for the atlas parameter set. The VPCC atlas parameter set structure information is the same as or similar to that described above with reference to FIG. 42. The VPCC atlas parameter set structure information according to the embodiments may include information about the number of atlas parameters (e.g., numOfAPSArrays in FIG. 42) and/or information for identifying the atlas parameter set (e.g. aps_id in FIG. 42).

In the operation of transmitting the point cloud data (S4802), the encapsulated file according to the embodiments is transmitted to the point cloud data reception device.

As the point cloud data transmission device according to the embodiments transmits the point cloud data using the method described above, the reception device may efficiently access the point cloud bitstream. Furthermore, this configuration may allow the reception device to efficiently process the data of a point cloud bitstream and effectively access information necessary for rendering, thereby reducing delays occurring during decoding and rendering of point cloud data.

Figure 50:
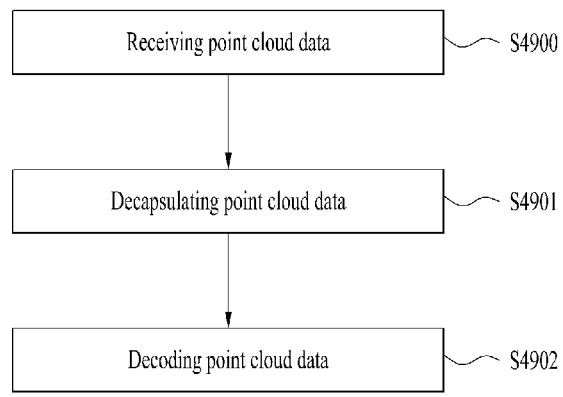
FIG. 50 is a flowchart illustrating a method of receiving point cloud data according to embodiments.

FIG. 50 is a flowchart illustrating a method of receiving point cloud data according to embodiments.

FIG. 50 is a flowchart illustrating a method of receiving point cloud data by a point cloud data reception device according to embodiments (e.g., the reception device described in FIGS. 1, 3, 19 to 23 and 37 to 48). The reception device according to the embodiments may further perform operations other than the operations described with reference to FIG. 50.

The point cloud data reception method according to the embodiments may include receiving point cloud data (S4900), decapsulating the point cloud data (S4901), and/or decoding the point cloud data (S4902).

In operation S4900, the point cloud data is received. In operation S4900, the file described with reference to FIG. 47 is received. In operation S4900, may perform some or all of the operations of the receiver 10006 of FIG. 1, the receiver of FIG. 19, and the delivery of FIG. 20 or 22.

In operation S4901, the point cloud data is decapsulated. In operation S4801, some or all of the operations of the file/segment decapsulation module 10007 of FIG. 1 and the file/segment decapsulators 20005 and 22000 of FIGS. 20 and 22 may be performed. Operation S4901 may be performed based on a file. The file according to the embodiments is the same as or similar to the file described with reference to FIGS. 1, 2, and 18 to 48. That is, the reception device according to the embodiments may decapsulate the point cloud data based on the file.

The file according to the embodiments may contain a track for atlas data for the point cloud data (e.g., the track for atlas data in FIGS. 41 and 43, the V-PCC track described with reference to FIGS. 38 to 45). The track (or V-PCC track) for atlas data according to the embodiments may be a track that carries metadata for the point cloud data.

A sample group (e.g., the sample group of FIG. 43) contained in the track according to embodiments may include at least one of an atlas parameter set and/or an SEI message for the atlas data. A sample entry (e.g., the sample entry of FIG. 46) contained in the track according to the embodiments may include at least one of an atlas parameter set and/or an SEI message for the atlas data. The atlas parameter set and the SEI message according to the embodiments are the same as or similar to those described above with reference to FIGS. 38 to 48.

As the sample group contained in the track according to the embodiments includes at least one of the atlas parameter set or the SEI message, grouping type information for the sample group may indicate that at least one of the atlas parameter set or the SEI message is included in the sample group. The sample group and grouping type information are the same as or similar to those described above with reference to FIG. 43. The grouping type information indicating that at least one of the atlas parameter set or the SEI message is included in the sample group according to the embodiments may indicate 'vaps' and/or 'vsei' described above with reference to FIG. 43. As the sample entry included in the track according to the embodiments includes at least one of the atlas parameter set or the SEI message, the information indicating the type of the sample entry may indicate that at least one of the atlas parameter set or the SEI message is included in the sample entry. The information indicating the type of the sample entry according to embodiments may indicate the sample entry type described above with reference to FIGS. 39 and 46. The information indicating the type of the sample entry indicating that at least one of the atlas parameter set or the SEI message is included in the sample entry according to the embodiments may indicate 'vpc1' or 'vpcg' described above in FIG. 39, or 'vpe1' described above with reference to FIG. 46. Here, 'vpc1', 'vpcg', and 'vpe1' may be referred to as 'v3c1', 'v3cg' and 'v3e1'.

The SEI message according to the embodiments may include at least one of an essential SEI message or a non-essential SEI message. The essential SEI message or the non-essential SEI message is the same as or similar to those described above with reference to FIGS. 41 to 49. The file according to the embodiments may further contain VPCC SEI message structure information for the SEI message (e.g., the VPCC SEI message structure information of FIG. 42). The VPCC SEI message structure information according to the embodiments may include at least one of information indicating the number of essential SEI messages (e.g., numEssentialSEIs in FIG. 42), information indicating the type of the essential SEI message (e.g., ESEI_type in FIG. 42), information indicating the number of non-essential SEI messages (e.g., numNonEssentialSEIs in FIG. 42), or information indicating the type of the non-essential SEI message (e.g., NSEI_type in FIG. 42).

The file according to the embodiments may further contain VPCC atlas parameter set structure information for the atlas parameter set. The VPCC atlas parameter set structure information is the same as or similar to that described above with reference to FIG. 42. The VPCC atlas parameter set structure information according to the embodiments may include information about the number of atlas parameters (e.g., numOfAPSArrays in FIG. 42) and/or information for identifying the atlas parameter set (e.g. aps_id in FIG. 42).

In operation S4902, the point cloud data is decoded. In operation S4902, some or all of the operations of the point cloud video decoder 10008 of FIG. 1, the V-PCC decoding operations of FIG. 16, the operations of FIG. 19, the video decoding and image decoding 20006 of FIG. 20, the video decoding 22001 of FIG. 22, or the image decoding 22002.

The embodiments have been described in terms of a method and/or a device. The description of the method and the description of the device may complement each other.

Although embodiments have been described with reference to each of the accompanying drawings for simplicity, it is possible to design new embodiments by merging the embodiments illustrated in the accompanying drawings. If a recording medium readable by a computer, in which programs for executing the embodiments mentioned in the foregoing description are recorded, is designed by those skilled in the art, it may also fall within the scope of the appended claims and their equivalents. The devices and methods may not be limited by the configurations and methods of the embodiments described above. The embodiments described above may be configured by being selectively combined with one another entirely or in part to enable various modifications. Although preferred embodiments have been described with reference to the drawings, those skilled in the art will appreciate that various modifications and variations may be made in the embodiments without departing from the spirit or scope of the disclosure described in the appended claims. Such modifications are not to be understood individually from the technical idea or perspective of the embodiments.

Various elements of the devices of the embodiments may be implemented by hardware, software, firmware, or a combination thereof. Various elements in the embodiments may be implemented by a single chip, for example, a single hardware circuit. According to embodiments, the components according to the embodiments may be implemented as separate chips, respectively. According to embodiments, at least one or more of the components of the device according to the embodiments may include one or more processors capable of executing one or more programs. The one or more programs may perform any one or more of the operations/methods according to the embodiments or include instructions for performing the same. Executable instructions for performing the method/operations of the device according to the embodiments may be stored in a non-transitory CRM or other computer program products configured to be executed by one or more processors, or may be stored in a transitory CRM or other computer program products configured to be executed by one or more processors. In addition, the memory according to the embodiments may be used as a concept covering not only volatile memories (e.g., RAM) but also nonvolatile memories, flash memories, and PROMs. In addition, it may also be implemented in the form of a carrier wave, such as transmission over the Internet. In addition, the processor-readable recording medium may be distributed to computer systems connected over a network such that the processor-readable code may be stored and executed in a distributed fashion.

In this document, the term "/" and "," should be interpreted as indicating "and/or." For instance, the expression "A/B" may mean "A and/or B." Further, "A, B" may mean "A and/or B." Further, "AB/C" may mean "at least one of A, B, and/or C." "A, B, C" may also mean "at least one of A, B, and/or C." Further, in the document, the term "or" should be interpreted as "and/or." For instance, the expression "A or B" may mean 1) only A, 2) only B, and/or 3) both A and B. In other words, the term "or" in this document should be interpreted as "additionally or alternatively."

Terms such as first and second may be used to describe various elements of the embodiments. However, various components according to the embodiments should not be limited by the above terms. These terms are only used to distinguish one element from another. For example, a first user input signal may be referred to as a second user input signal. Similarly, the second user input signal may be referred to as a first user input signal. Use of these terms should be construed as not departing from the scope of the various embodiments. The first user input signal and the second user input signal are both user input signals, but do not mean the same user input signal unless context clearly dictates otherwise.

The terminology used to describe the embodiments is used for the purpose of describing particular embodiments only and is not intended to be limiting of the embodiments. As used in the description of the embodiments and in the claims, the singular forms "a", "an", and "the" include plural referents unless the context clearly dictates otherwise. The expression "and/or" is used to include all possible combinations of terms. The terms such as "includes" or "has" are intended to indicate existence of figures, numbers, steps, elements, and/or components and should be understood as not precluding possibility of existence of additional existence of figures, numbers, steps, elements, and/or components. As used herein, conditional expressions such as "if" and "when" are not limited to an optional case and are intended to be interpreted, when a specific condition is satisfied, to perform the related operation or interpret the related definition according to the specific condition.

Operations according to the embodiments described in this specification may be performed by a transmission/reception device including a memory and/or a processor according to embodiments. The memory may store programs for processing/controlling the operations according to the embodiments, and the processor may control various operations described in this specification. The processor may be referred to as a controller or the like. In embodiments, operations may be performed by firmware, software, and/or combinations thereof. The firmware, software, and/or combinations thereof may be stored in the processor or the memory.

The operations according to the above-described embodiments may be performed by the transmission device and/or the reception device according to the embodiments. The transmission/reception device may include a transmitter/receiver configured to transmit and receive media data, a memory configured to store instructions (program code, algorithms, flowcharts and/or data) for the processes according to the embodiments, and a processor configured to control the operations of the transmission/reception device.

The processor may be referred to as a controller or the like, and may correspond to, for example, hardware, software, and/or a combination thereof. The operations according to the above-described embodiments may be performed by the processor. In addition, the processor may be implemented as an encoder/decoder for the operations of the above-described embodiments.

Mode for the Disclosure

As described above, related details have been described in the best mode for carrying out the embodiments.

INDUSTRIAL APPLICABILITY

As described above, the embodiments are fully or partially applicable to a point cloud data transmission/reception device and system.

Those skilled in the art may change or modify the embodiments in various ways within the scope of the embodiments.

Embodiments may include variations/modifications within the scope of the claims and their equivalents.

What is claimed is:

1. A method for transmitting point cloud data, the method comprising:
   encoding point cloud data;
   encapsulating the point cloud data based on a file; and
   transmitting the point cloud data,
   wherein the file includes a track for atlas data for the point cloud data and a component track including the point cloud data,
   wherein the track includes atlas parameter sample group information including one or more units including the atlas data and Supplemental Enhancement Information (SEI) messages for a sample group,
   wherein the atlas parameter sample group information has a grouping type,
   wherein the SEI messages include an essential SEI message and a non-essential SEI message,
   wherein the file further includes information for a type of at least one of the essential SEI message or the non-essential SEI message,
   wherein the atlas parameter sample group information further includes information related to a number of the essential SEI message or a number of the non-essential SEI message, and
   wherein the atlas parameter sample group information is identified based on the grouping type.

2. An apparatus for transmitting point cloud data, the apparatus comprising:
   an encoder configured to encode point cloud data;
   an encapsulator configured to encapsulate the point cloud data based on a file; and
   a transmitter configured to transmit the point cloud data,
   wherein the file includes a track for atlas data for the point cloud data and a component track including the point cloud data,
   wherein the track includes atlas parameter sample group information including one or more units including the atlas data and Supplemental Enhancement Information (SEI) messages for a sample group,
   wherein the atlas parameter sample group information has a grouping type,
   wherein the SEI messages include an essential SEI message and a non-essential SEI message,
   wherein the file further includes information for a type of at least one of the essential SEI message or the non-essential SEI message,
   wherein the atlas parameter sample group information further includes information related to a number of the essential SEI message or a number of the non-essential SEI message, and
   wherein the atlas parameter sample group information is identified based on the grouping type.

3. A method for receiving point cloud data, the method comprising:
   receiving a file including point cloud data;
   decapsulating the file;
   decoding the point cloud data; and
   wherein the file includes a track for atlas data for the point cloud data and a component track including the point cloud data,
   wherein the track includes atlas parameter sample group information including one or more units including the atlas data and Supplemental Enhancement Information (SEI) messages for a sample group,
   wherein the atlas parameter sample group information has a grouping type,
   wherein the SEI messages include an essential SEI message and a non-essential SEI message,
   wherein the file further includes information for a type of at least one of the essential SEI message or the non-essential SEI message,
   wherein the atlas parameter sample group information further includes information related to a number of the essential SEI message or a number of the non-essential SEI message, and
   wherein the atlas parameter sample group information is identified based on the grouping type.

4. An apparatus for receiving point cloud data, the apparatus comprising:
   a receiver configured to receive a file including point cloud data;
   a decapsulator configured to decapsulate the file;
   a decoder configured to decode the point cloud data; and
   wherein the file includes a track for atlas data for the point cloud data and a component track including the point cloud data,
   wherein the track includes atlas parameter sample group information including one or more units including the atlas data and Supplemental Enhancement Information (SEI) messages for a sample group,
   wherein the atlas parameter sample group information has a grouping type,
   wherein the SEI messages include an essential SEI message and a non-essential SEI message,
   wherein the file further includes information for a type of at least one of the essential SEI message or the non-essential SEI message, wherein the atlas parameter sample group information further includes information related to a number of the essential SEI message or a number of the non-essential SEI message, and wherein the atlas parameter sample group information is identified based on the grouping type.

\* \* \* \* \*